United States Patent
Baron et al.

(10) Patent No.: US 9,922,437 B1
(45) Date of Patent: Mar. 20, 2018

(54) PROCESS FOR CREATING AN AUGMENTED IMAGE

(71) Applicants: William S. Baron, Menlo Park, CA (US); Sandra F. Baron, Menlo Park, CA (US)

(72) Inventors: William S. Baron, Menlo Park, CA (US); Sandra F. Baron, Menlo Park, CA (US)

( * ) Notice: Subject to any disclaimer, the term of this patent is extended or adjusted under 35 U.S.C. 154(b) by 0 days.

(21) Appl. No.: 14/214,687

(22) Filed: Mar. 15, 2014

Related U.S. Application Data

(60) Provisional application No. 61/802,041, filed on Mar. 15, 2013.

(51) Int. Cl.
*G06T 15/10* (2011.01)
*G06T 15/20* (2011.01)
*G06T 11/60* (2006.01)
*G06T 19/00* (2011.01)

(52) U.S. Cl.
CPC ............ *G06T 11/60* (2013.01); *G06T 19/006* (2013.01); *G06T 2219/2004* (2013.01)

(58) Field of Classification Search
CPC combination set(s) only.
See application file for complete search history.

(56) References Cited

U.S. PATENT DOCUMENTS

| | | |
|---|---|---|
| 4,761,071 A | 8/1988 | Baron |
| 5,867,250 A | 2/1999 | Baron |
| 5,986,670 A | 11/1999 | Dries et al. |
| 6,791,563 B2 * | 9/2004 | Bragg et al. .................. 345/582 |
| 8,259,101 B2 | 9/2012 | Shimada et al. |
| 8,638,986 B2 | 1/2014 | Jiang et al. |
| 9,129,438 B2 | 9/2015 | Aarts et al. |
| 2012/0120113 A1 | 5/2012 | Hueso |
| 2013/0335575 A1 | 12/2013 | Tsin et al. |
| 2014/0092132 A1 | 4/2014 | Issa et al. |
| 2014/0229143 A1 | 8/2014 | Cohen-Or et al. |

OTHER PUBLICATIONS

Guillou et al, Using vanishing points for camera calibration and coarse 3D reconstruction from a single image, Dec. 2000, The Visual Computer, 16, 396-410.*

Bae et al., Computational Re-Photography, Computer Science and Artificial Intelligence Laboratory Technical Report, MIT, MIT-CSAIL-TR-2010-016, CBCL-287, 2010,1-15, Massachusetts Institute of Technology, Cambridge, MA.

Beardsley et al., Camera Calibration using Vanishing Points, British Machine Vision Conference—BMVC, 1992, 416-425.

(Continued)

*Primary Examiner* — Robert Craddock

(57) ABSTRACT

Embodiments described herein provide a process and method running on a computer for creating an augmented image. According to an embodiment, a graphical user interface gathers data that is programmatically analyzed to obtain photographic properties from a first image. Photographic properties are provided to a user for obtaining a second image containing a fiducial mark. The second image is programmatically analyzed to obtain photographic properties. The first image and the second image are programmatically analyzed and processed to produce an augmented image.

16 Claims, 38 Drawing Sheets

(56) References Cited

OTHER PUBLICATIONS

Caprile et al., Using Vanishing Points for Camera Calibration, International Journal of Computer Vision, 1990, 127-140, 4, Klower Academic Publishers, The Netherlands.
Chen et al., Full Camera Calibration from a Single View of Planar Scene, International Symposium on Visual computing, 2008, Bebis et al. (Eds.) ISVC 2008, 815-824, Part I, LNCS 5358. Springer-Verlag Berlin Heidelberg.
DeMenthon et al. "Model-Based Object Pose in 25 Lines of Code", International Journal of Computer Vision, Jun. 1995, 123-141, 15, Kluwer Academic Publishers, Boston. Manufactured in The Netherlands.
Lalonde et al., Photo clip art., ACM SIGGRAPH 2007, Computer Graphics Proceedings, Annual Conference Series, 2007, San Diego, CA, 1-10, ACM SIGGRAPH 2007, San Diego, CA.
Zheng, et al., Interactive Images: Cuboid Proxies for Smart Image Manipulation, ACM Transactions on Graphics (TOG), 1999, 31, 4.
Baron et al., Topographic Mapping of Biological Specimens: Flexure and Curvature Characterization. Laser Interaction with Tissue and Cells XV, Proc. of SPIE vol. 5319, SPIE, Bellingham, WA. 2004, 15-25.
Baron et al., Data acquisition time constraints in elevation mapping corneal topography, in Ophthalmic Technologies VII, Pascal O. Rol, Karen M. Joos, Fabrice Manns, Editors, Proc. SPIE 2971, 1997, 20-29.
Baron et al., Video Shape and Strain Mapping of Biological Specimens—Precise, Fast, Thorough, and Convenient 2005 Annual Fall Meeting of the Biomedical Engineering Society Sep. 28-Oct. 1, 2005, Baltimore, Maryland, 872. P4.120.

* cited by examiner

| Table 1. Correspondence between the vertices of the theoretical rectangular cuboid 100 and the vertices shown in the two dimensional views 410, 420, 430, 440, 450, and 460. |||||||
|---|---|---|---|---|---|---|
| | View ||||||
| Cuboid 100 | 410 | 420 | 430 | 440 | 450 | 460 |
| 102 | 411 | 421 | 431 | 441 | 451 | 461 |
| 104 | 412 | 422 | 432 | 442 | 452 | 462 |
| 106 | 413 | 423 | 433 | 443 | 453 | 463 |
| 108 | 414 | 424 | 434 | 444 | 454 | 464 |
| 114 | 415 | 425 | 435 | 445 | 455 | 465 |
| 116 | 416 | 426 | 436 | 446 | 456 | 466 |
| 110 | 417 | 427 | | | | |
FIG. 5
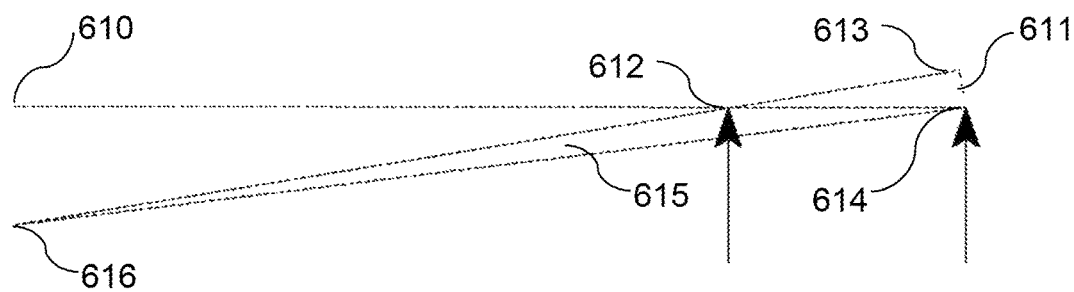
FIG. 6A
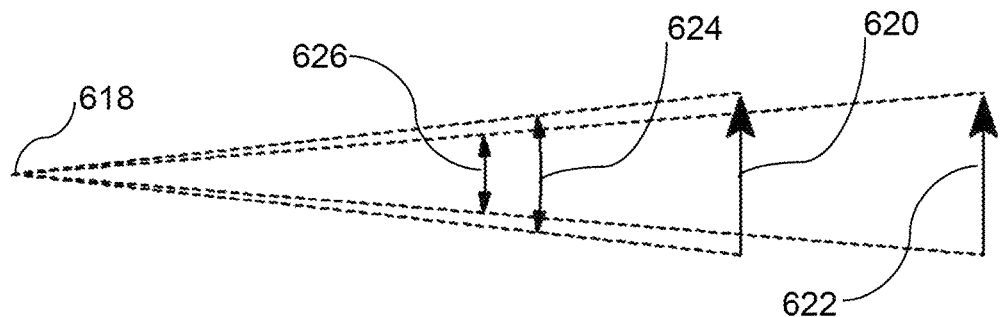
FIG. 6B

| Table 2. | | | |
|---|---|---|---|
| Cuboid 100 Vertex | Image Vertex Symbol | Vertex Coordinate | |
| | | X | Y |
| 102 | K | KX | KY |
| 104 | L | LX | LY |
| 106 | C | CX | CY |
| 108 | D | DX | DY |
| 114 | A | AX | AY |
| 116 | B | BX | BY |

© 2012 William S. Baron

FIG. 35C   © 2012 William S. Baron

© 2012 William S. Baron

PROCESS FOR CREATING AN AUGMENTED IMAGE

FEDERALLY SPONSORED RESEARCH

None

SEQUENCE LISTING

None

BACKGROUND

When a two dimensional first image of one or more physical objects is superimposed on a two dimensional second image of a locale to form a two dimensional third image, the third image is an augmented image. For said third image to be a photorealistic augmented image, when the content of the first image appears to be situated in the third image in a manner that replicates the appearance of a hypothetical fourth image, where said hypothetical fourth image is of a physical scene comprised of all of the physical objects pictured in the first image and all of the physical objects pictured in the second image, with all the objects in the third image and hypothetical fourth image appearing to be positioned in an identical fashion. A plurality of first images may be used to augment a plurality of second images to form a plurality of third images. Each said photorealistic third image has only one corresponding said hypothetical fourth image.

In commercial use of photorealistic image augmentation, said first image is often of one or more objects and said second image is often of a locale. Said augmented third image is then used to evaluate the utility, functionality, aesthetics, or appearance of the object or objects of the first image within the locale of the second image or of the utility, functionality, aesthetics, or appearance of the locale of the second image when containing the object or objects of the first image.

The photorealistic quality of an augmented image depends on how well the photographic properties of said first image match the photographic properties of said second image. Photographic properties include: viewpoint, placement, resolution and scale, lighting and white balance, camera orientation, and the camera's optics.

The viewpoint defines the position and orientation of a camera relative to the subject matter of an image. A requirement for photorealistic image augmentation is that the first image's viewpoint matches the second image's viewpoint.

Digital cameras have an electronic sensor that converts an optical image formed by a camera's optics into an array of pixels to form a digital image which can be stored as an electronic file and manipulated by a computer. In the array of pixels, each pixel has a value that designates a chromaticity, for color images, or a monochrome intensity, for gray scale images. The density of the electronic sensor's array in conjunction with the size of the optical image determines the digital image's resolution and the digital image's scale relative to the physical dimensions of the object. A digital image's resolution, and hence also scale, can be altered by software programs running on a computer. Photorealistic image augmentation depends on the accuracy with which the first image's resolution and image scale matches the second image's resolution and scale at the physical position within the hypothetical fourth image that is occupied by the object of said first image.

Lighting influences the colorimetric appearance of an image as well as the distribution of highlights and shadows within a scene. A camera's white balance setting is used to normalize the colorimetric effects produced by a light source's spectral properties. Post exposure, image editing software can be used to adjust an image's colorimetric properties to approximate the effect of a camera's white balance adjustment. The distribution of shadows in an image is determined by the location of the light source(s) relative to the physical objects in the scene. Photorealistic image augmentation depends on the accuracy with which the first image's light source's(s') properties and camera's white balance settings match the second image's light source's(s') properties and camera's white balance settings.

Photorealistic image augmentation depends on the accuracy with which the first image's vanishing points match the second image's vanishing points.

Skew, pitch, yaw, and rotation differences between the camera orientation used to obtain the first image and the camera orientation used to obtain the second image, will adversely affect the photorealistic appearance of the augmented third image and cause the third image to deviate from the hypothetical fourth image.

In many instances in which photorealistic image augmentation is of commercial value, the first image and the second image are not acquired: by the same person, with the same camera equipment, with the same camera settings, or under the same lighting conditions. Thus, to achieve photorealistic image augmentation, methods are needed to either quantify the salient photographic parameters of the preexisting first image and use said photographic parameters to define the acquisition of the second image or quantify the salient photographic parameters of the preexisting second image and use said photographic parameters to define the acquisition of the first image. Or, to use said photographic parameters to use computer means to adjust the properties of said first image or said second image, after the acquisition of the picture, such that the salient properties are made to more closely match.

Three dimensional computer aided design (3DCAD) models of physical objects are called avatars. Avatars used in conjunction with 3DCAD software running on a computer provide a means of envisioning objects and the arrangement of objects within a specified space. The creation of avatars is time consuming and requires specialized computational tools, and may not portray the object or the setting in a photorealistic fashion. Attempts to blend 3DCAD models with two dimensional photographs of environments in order to reduce the time and skill associated with building 3DCAD environments within which avatars are viewed have limitations. Thus, there is need for an alternative means for readily augmenting an image of a space with an image of an object.

There is also a derived need for bridging the gap between two dimensional photography and three dimensional virtual modeling so that two dimensional views of 3DCAD objects can be used to augment two dimensional images of physical space and photographs of physical objects can be merged into 3DCAD views.

Accordingly, means are needed for quantitatively matching the photographic properties of a predetermined image to the photographic properties of a newly acquired image.

Drawings

The means and processes are illustrated by way of example, and not by way of limitation in the figures of the accompanying drawings in which like reference numerals are used to refer to similar elements.

FIG. 5 shows Table 1: Correspondence between the vertices of the theoretical rectangular cuboid 100 and the vertices shown in the two dimensional views.

FIG. 6A shows parallax effect.

FIG. 6B shows the inverse relationship between image size and viewpoint distance.

Figures 6C, 7A:
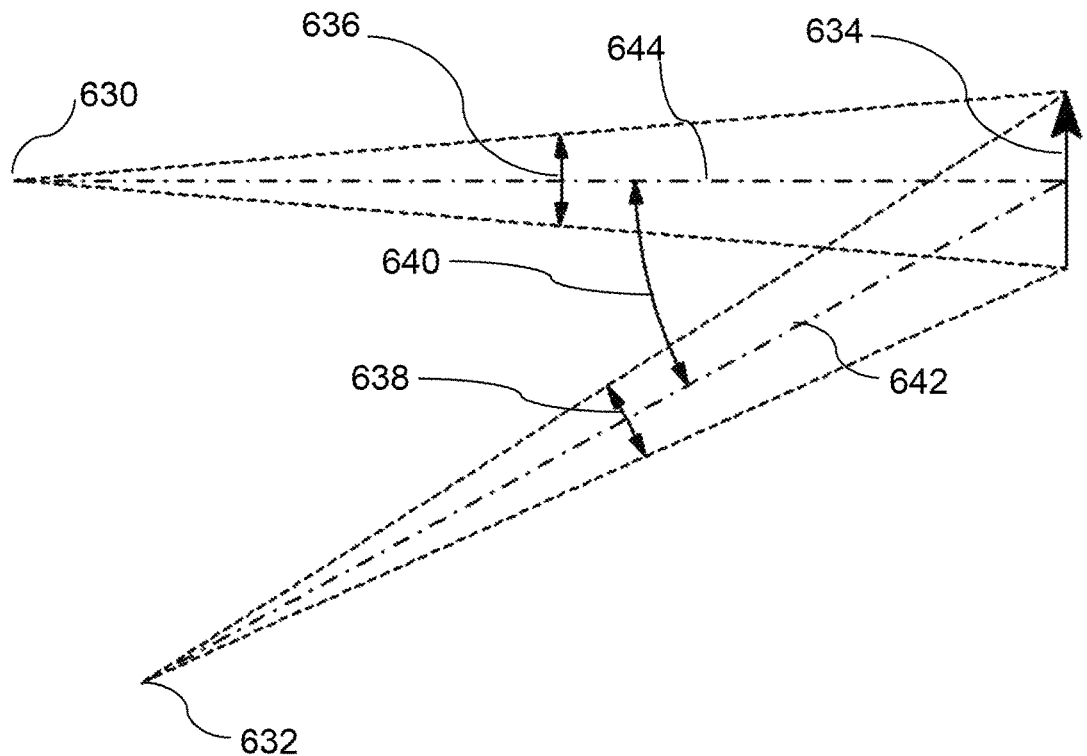
FIG. 6C shows how the angle of view affects an object's image size.

FIG. 7A contains Table 2 which shows the correspondence between the relative positions of the physical vertices of the rectangular cuboid 100 and their corresponding image vertices.

Figure 7B:
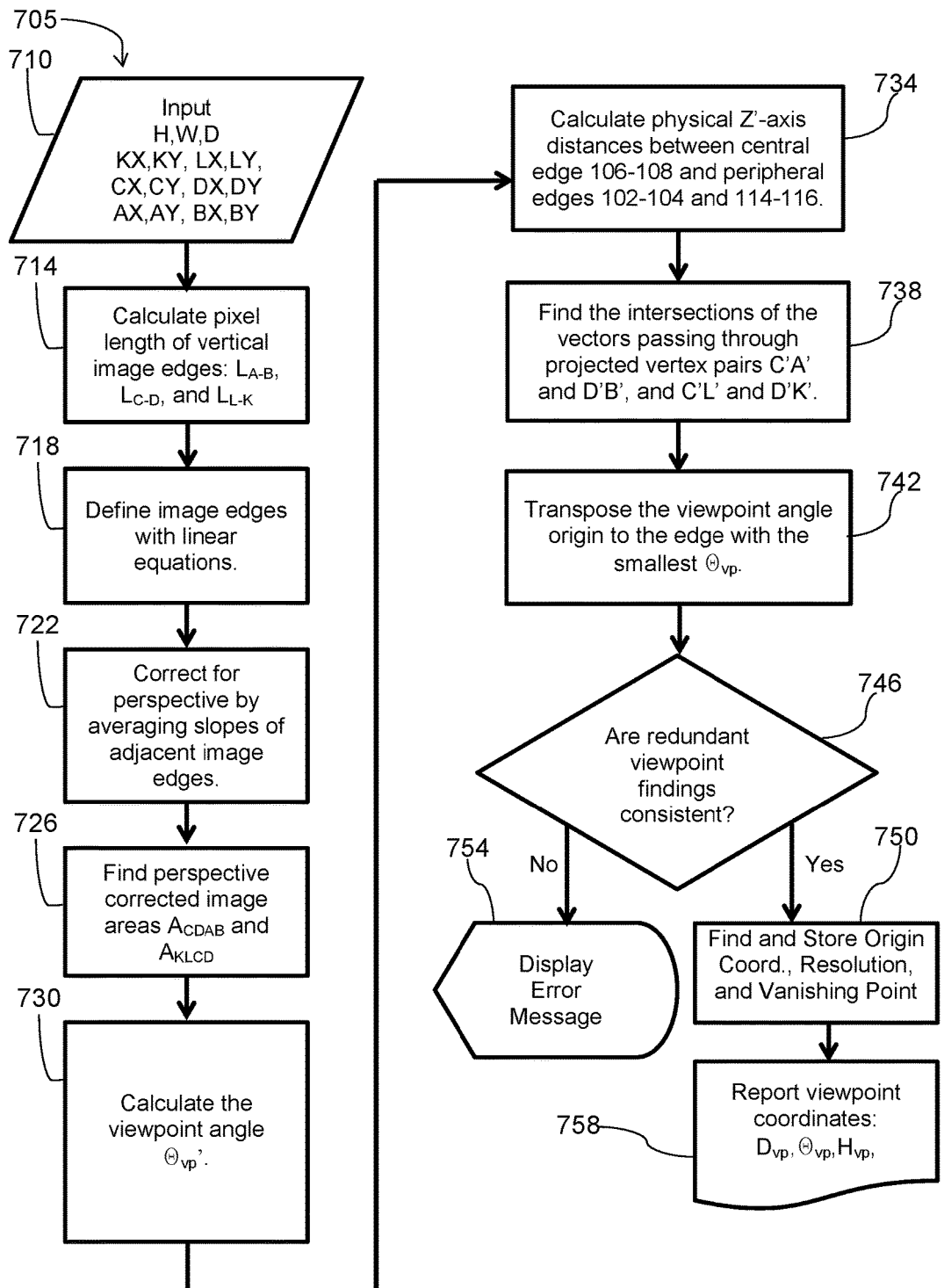

FIG. 7B shows a flow diagram for a first software algorithm for finding the object centric viewpoint of an enclosing rectangular cuboid.

Figure 8:
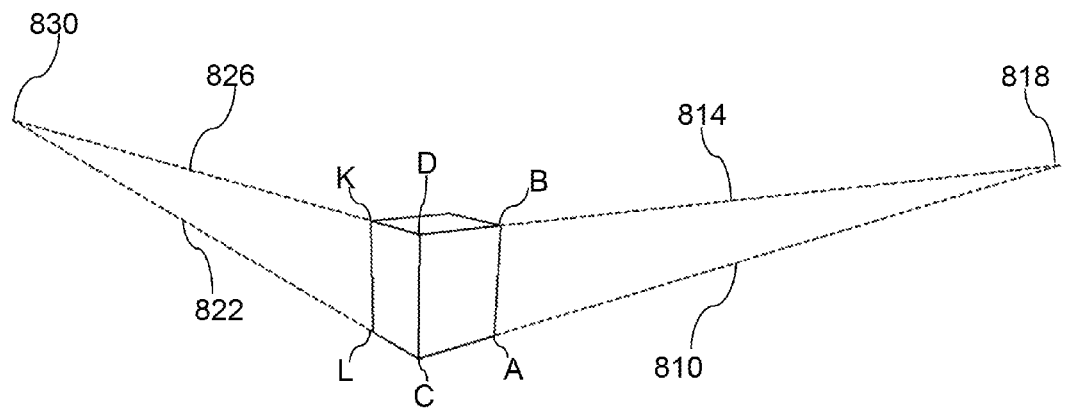

FIG. 8 shows the vanishing points of sides of the image of a rectangular cuboid.

Figure 9:
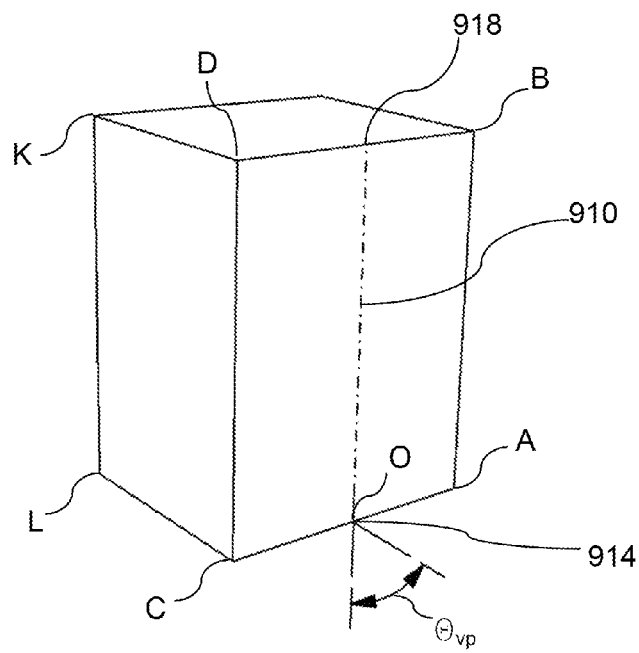

FIG. 9 shows the construction for defining an image reference vector at the object centric viewpoint origin.

Figure 10:
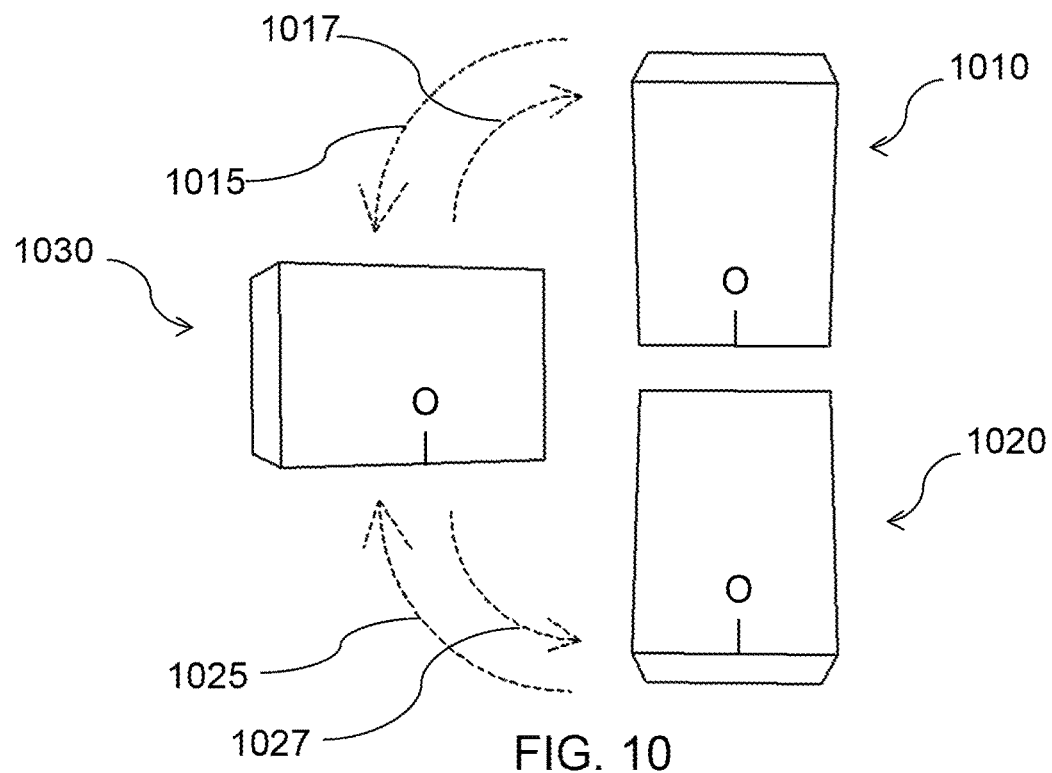

FIG. 10 shows that a class 1S1T image can be made equivalent to a class 1S1S rectangular cuboid image and that a class 1S1B image can be made equivalent to a class 1S1S rectangular cuboid image.

Figure 11:
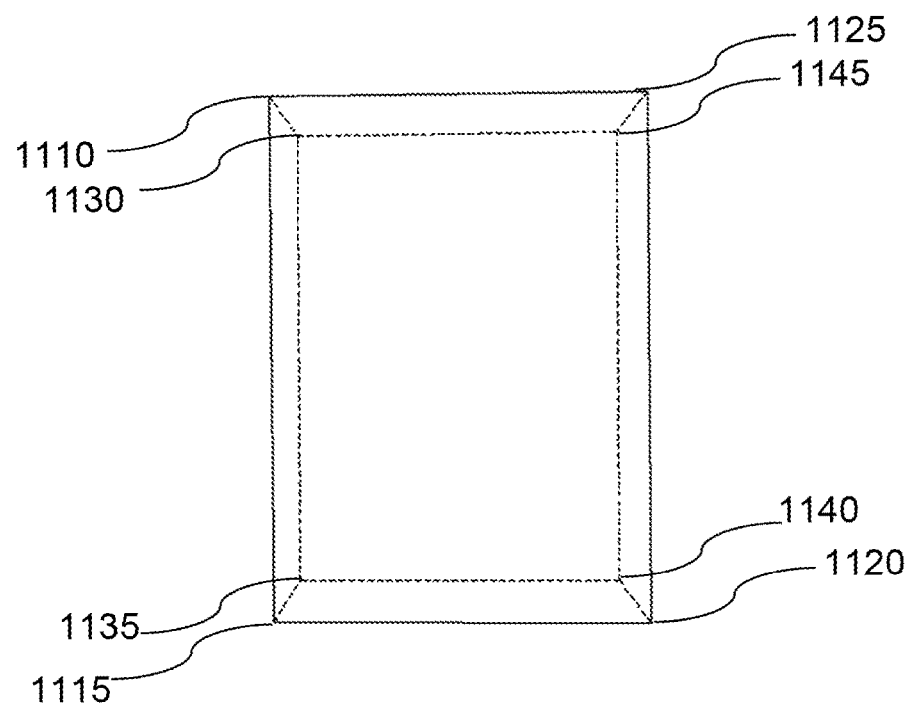

FIG. 11 shows that for class 1S0S views, which have only one visible side, the bounding vertices of one or more additional sides of the theoretical rectangular cuboid may be known.

Figure 12:
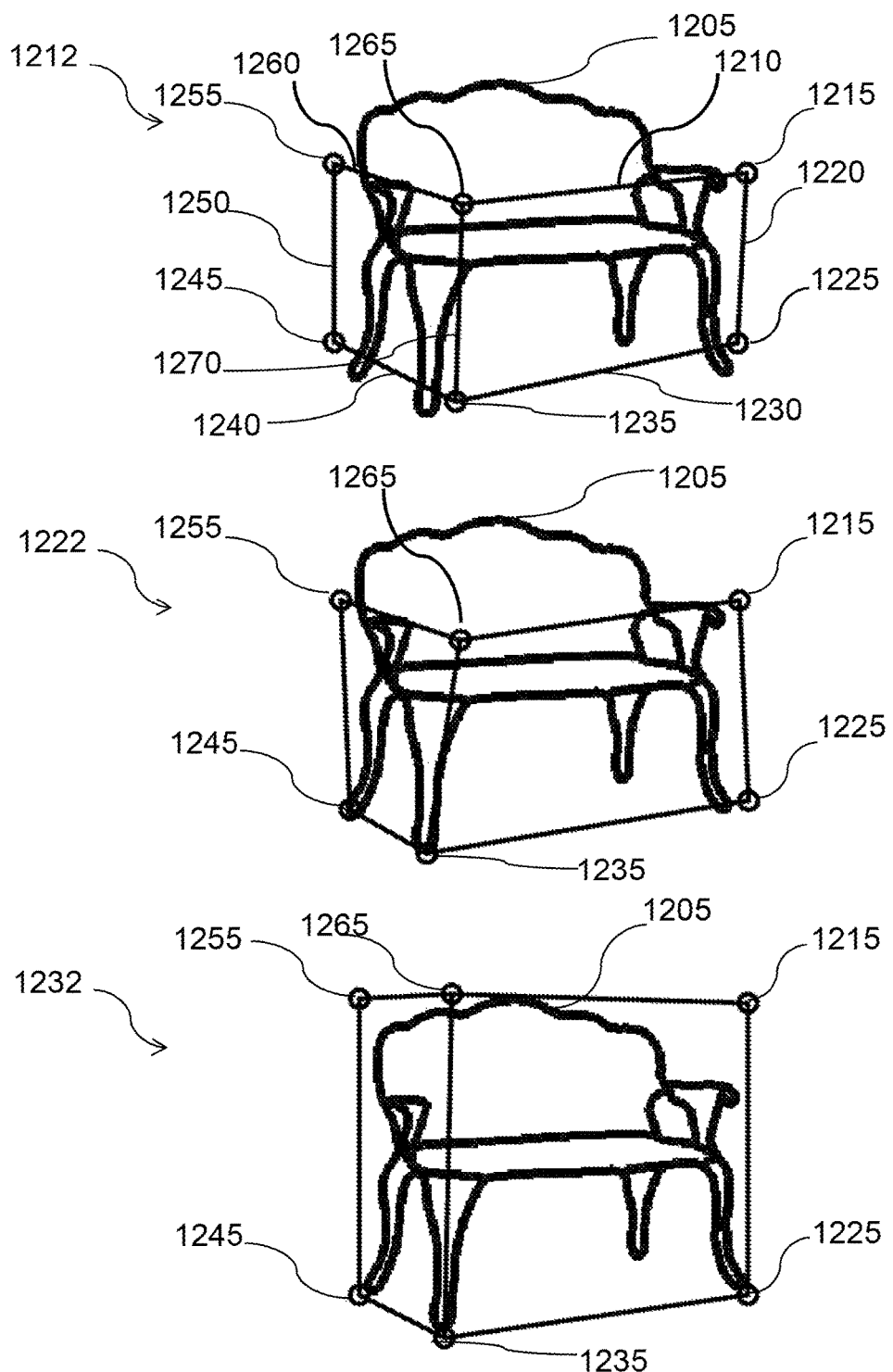

FIG. 12 shows screen shots of an example of a first embodiment of a computer user interface for defining vertices of the enclosing rectangular cuboid of an object using a predetermined two dimensional image of the object.

Figure 13:
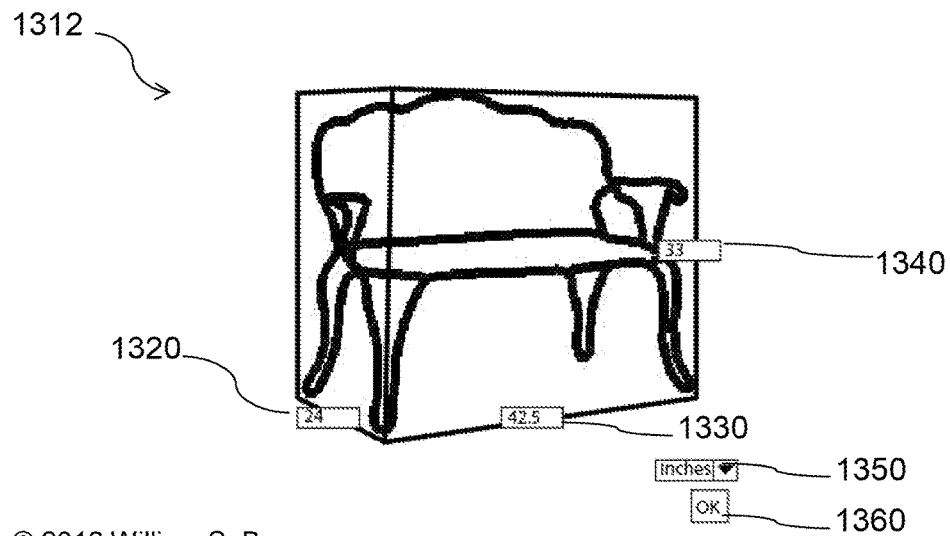

FIG. 13 shows a representative embodiment of the dimensioning computer user interface means.

Figure 14A:
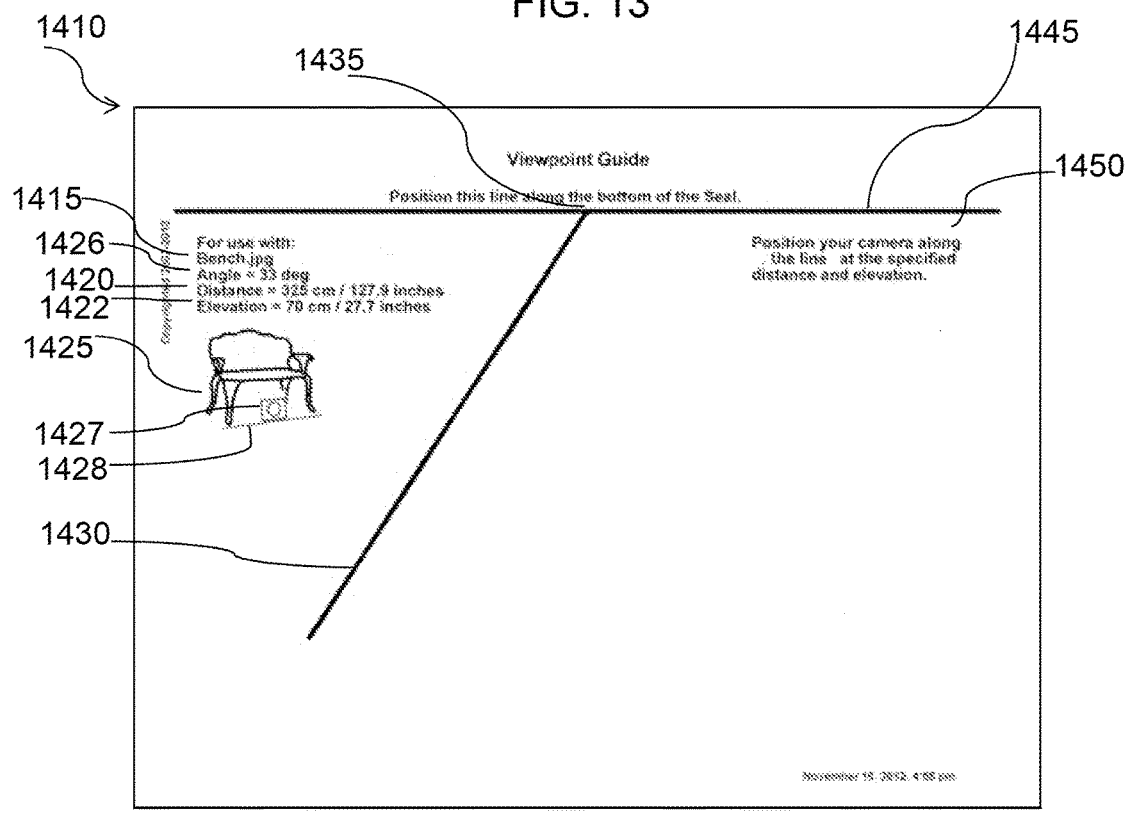

FIG. 14A shows an example first embodiment of the computer viewpoint parameter output means.

Figure 14B:
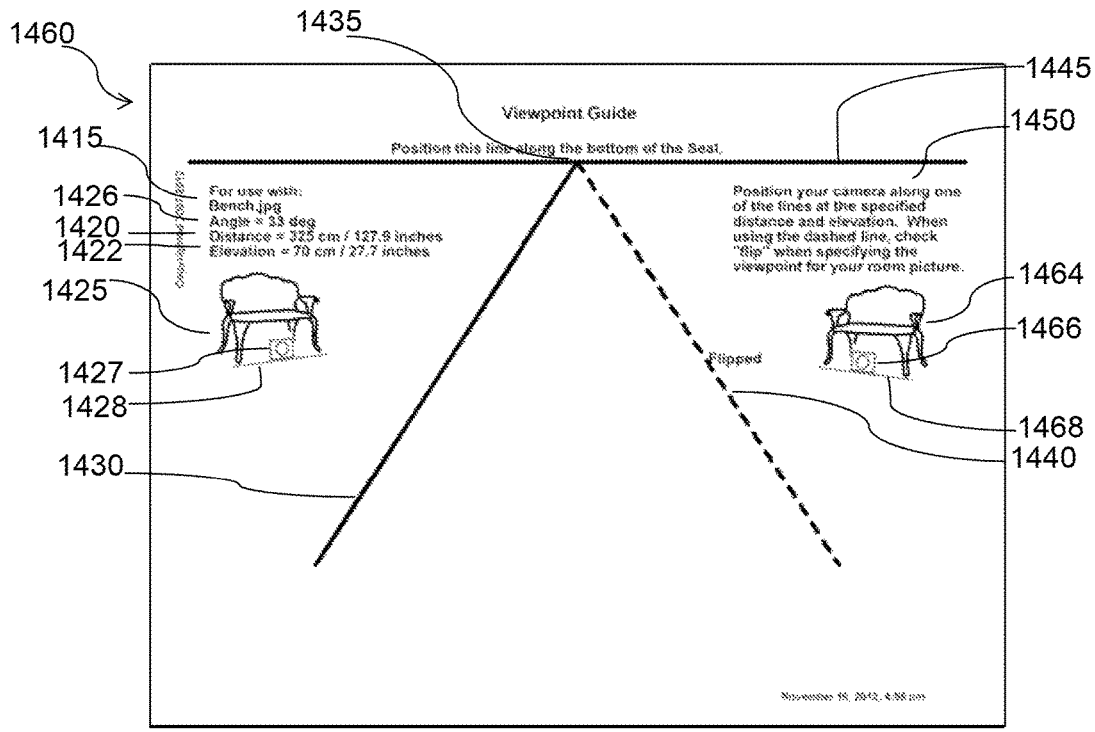

FIG. 14B shows a second example embodiment of the positioning guide.

Figure 14C:
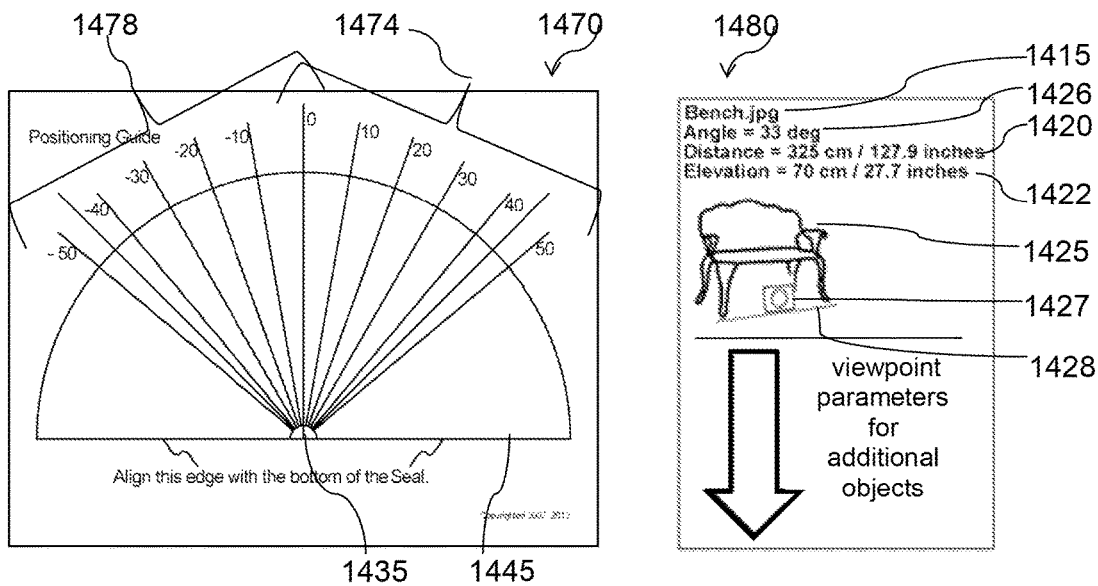

FIG. 14C shows a third example embodiment of the positioning guide.

Figure 15A:
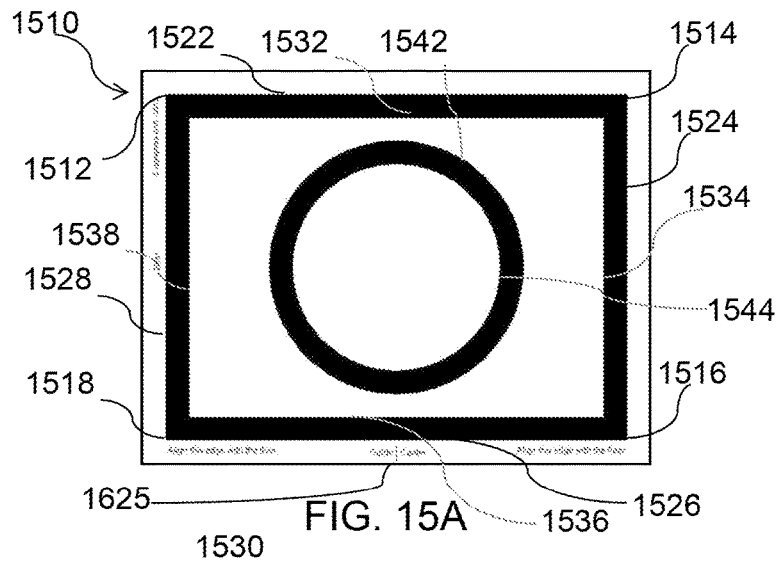

FIG. 15A shows a first fiducial mark embodiment.

Figure 15B:
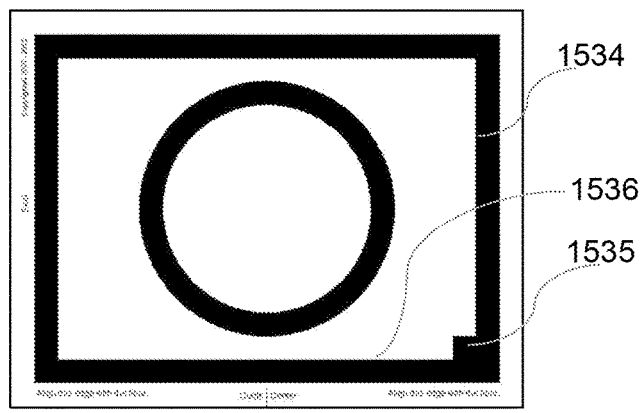

FIG. 15B shows a second fiducial mark embodiment.

Figure 15C:
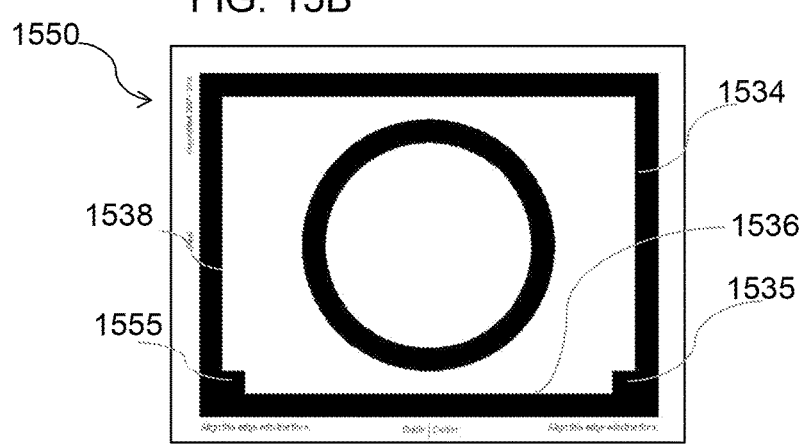

FIG. 15C shows a third fiducial mark embodiment.

Figure 16:
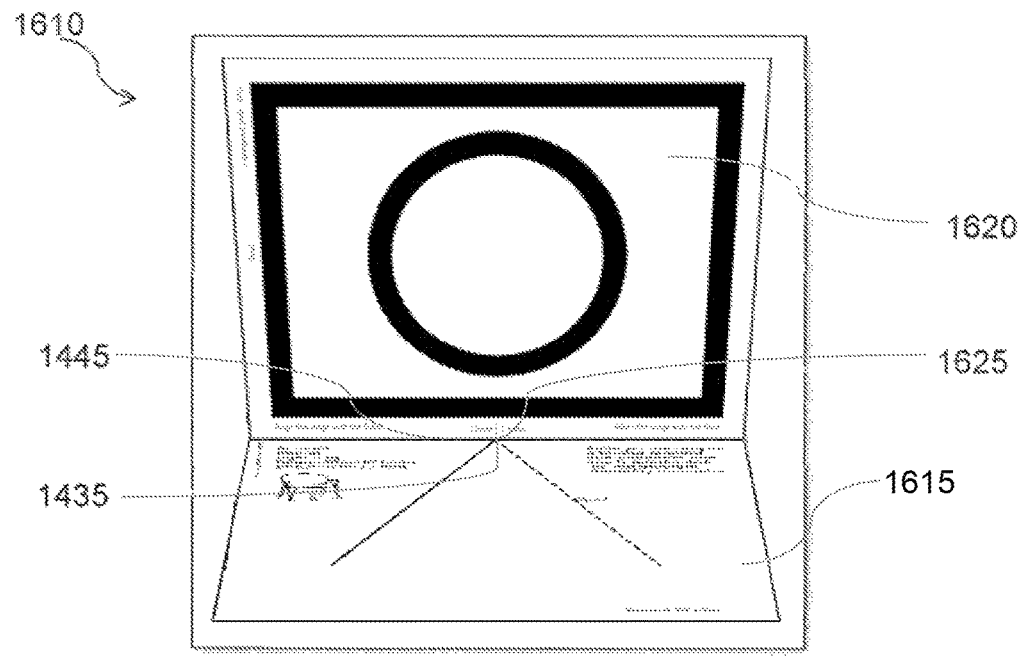

FIG. 16 shows a picture of a positioning guide embodiment and a fiducial mark embodiment.

Figure 17:
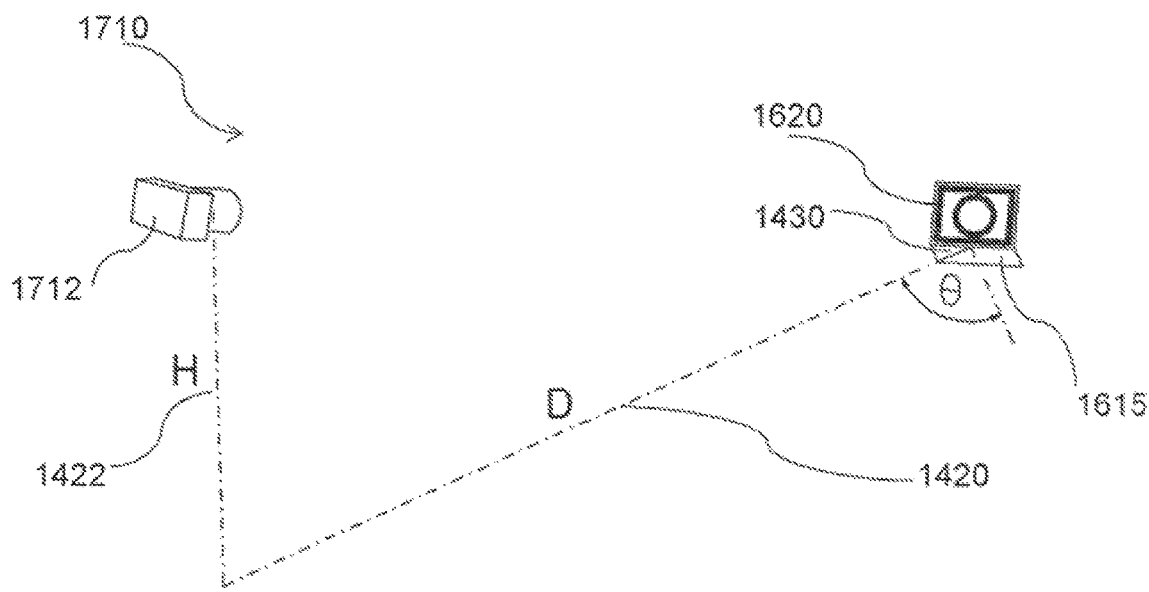

FIG. 17 shows the positioning of a fiducial mark, a positioning guide, and a camera.

Figure 18A:
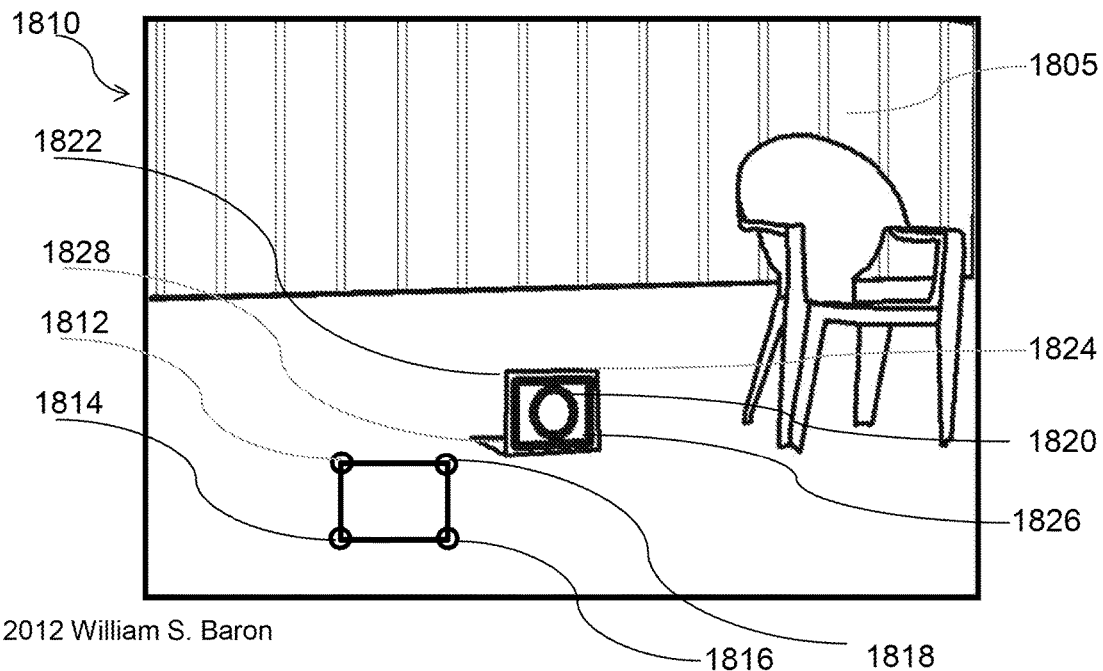
Figure 18A:
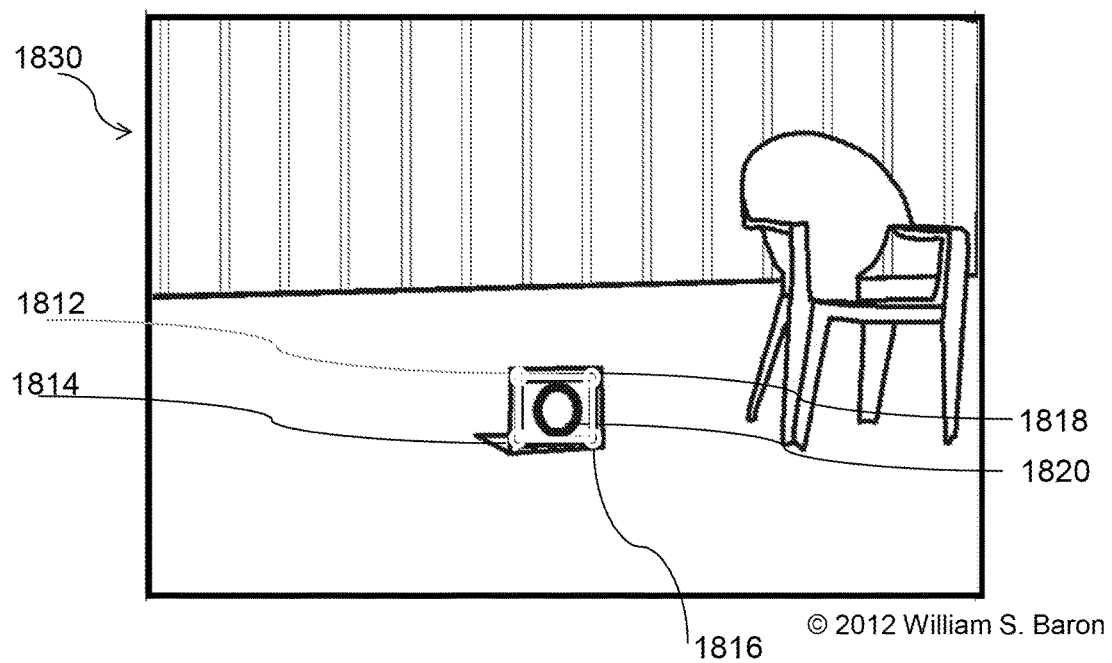

FIG. 18A shows screen shots showing the use of a first fiducial mark locating means embodiment.

Figure 18B:
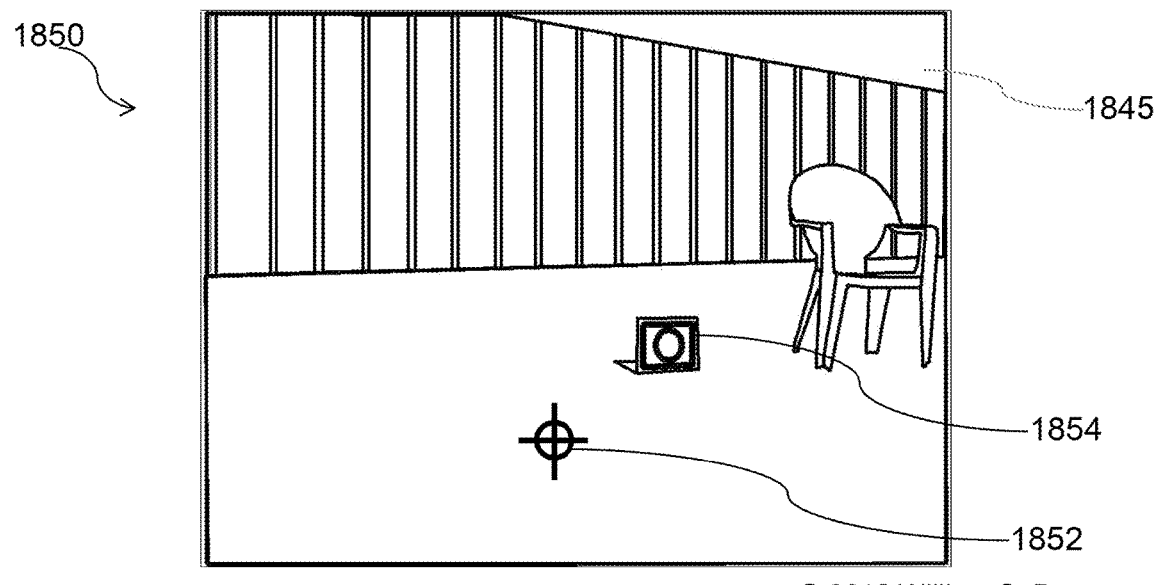
Figure 18B:
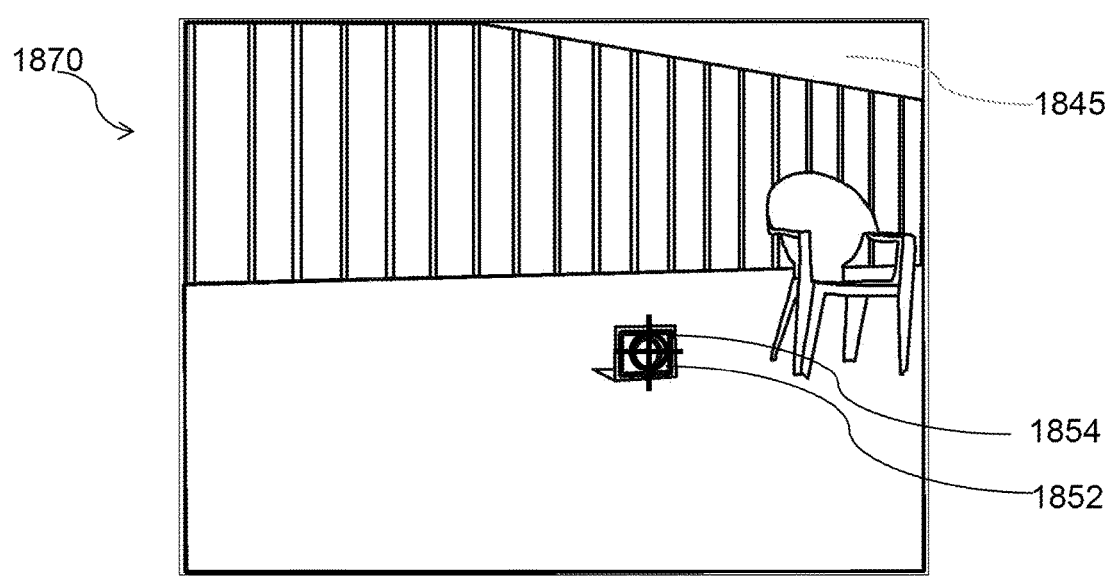

FIG. 18B shows screen shots showing the use of a second fiducial mark locating means embodiment.

Figure 19:
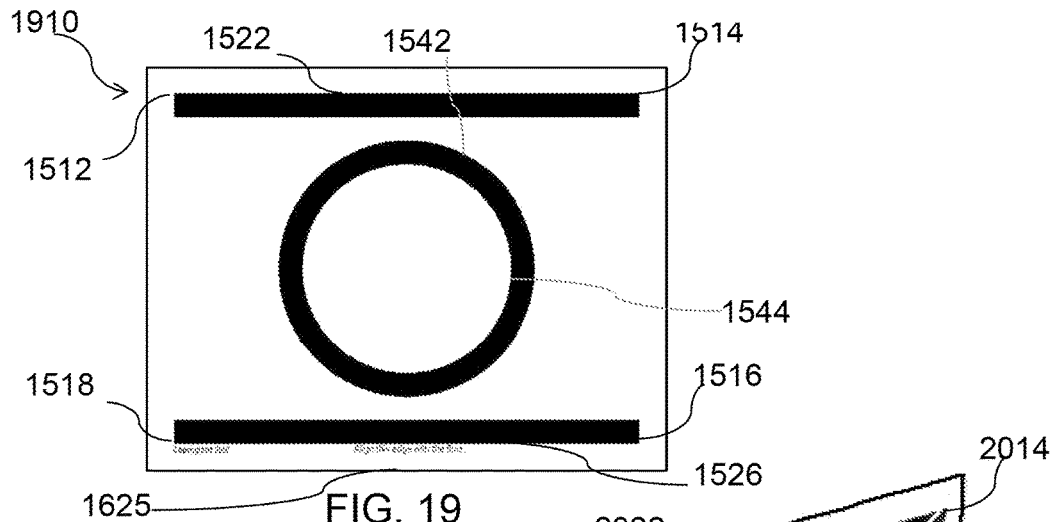

FIG. 19 shows a fourth fiducial mark embodiment.

Figure 20A:
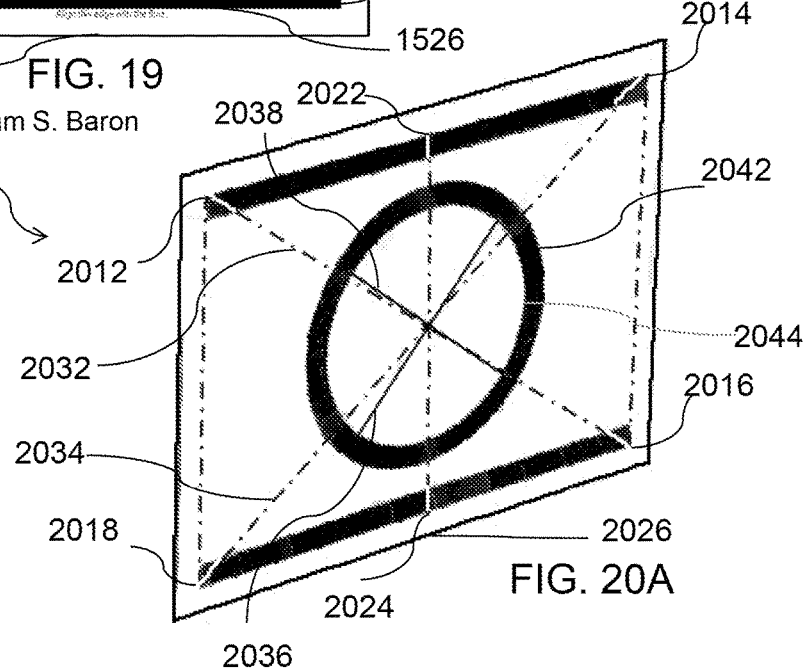

FIG. 20A shows an image of a fiducial mark embodiment with construction lines demonstrating calculations.

Figure 20B:
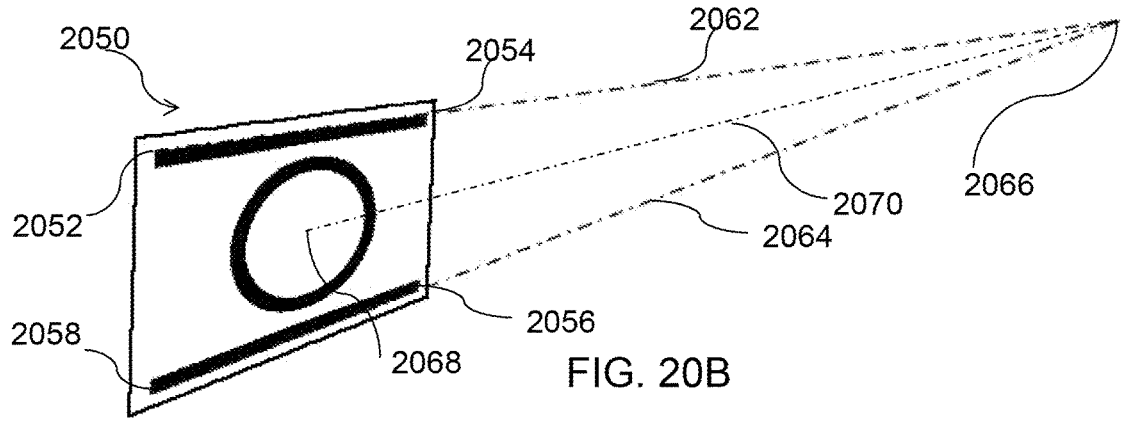

FIG. 20B shows an image of a fiducial mark embodiment and the intersection of vectors defining the vanishing point of the fiducial mark image.

Figure 21A:
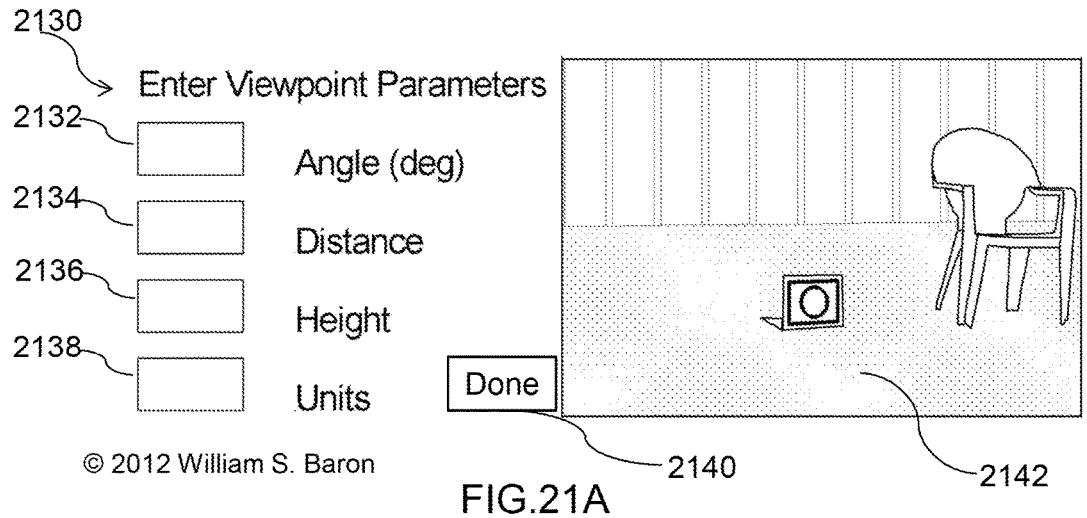

FIG. 21A shows a first embodiment of an optional viewpoint parameter assignment user interface.

Figure 21B:
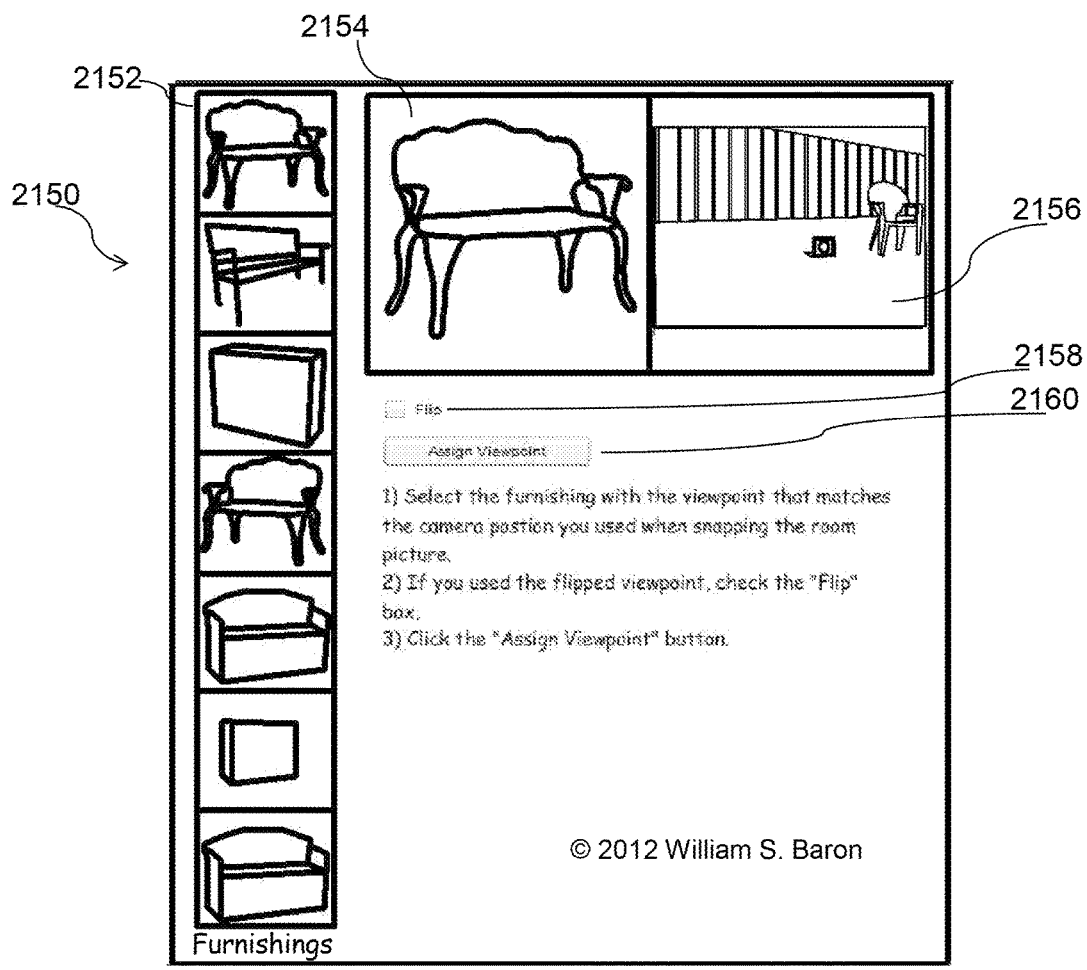

FIG. 21B shows a second embodiment of an optional viewpoint parameter assignment user interface.

Figure 22:
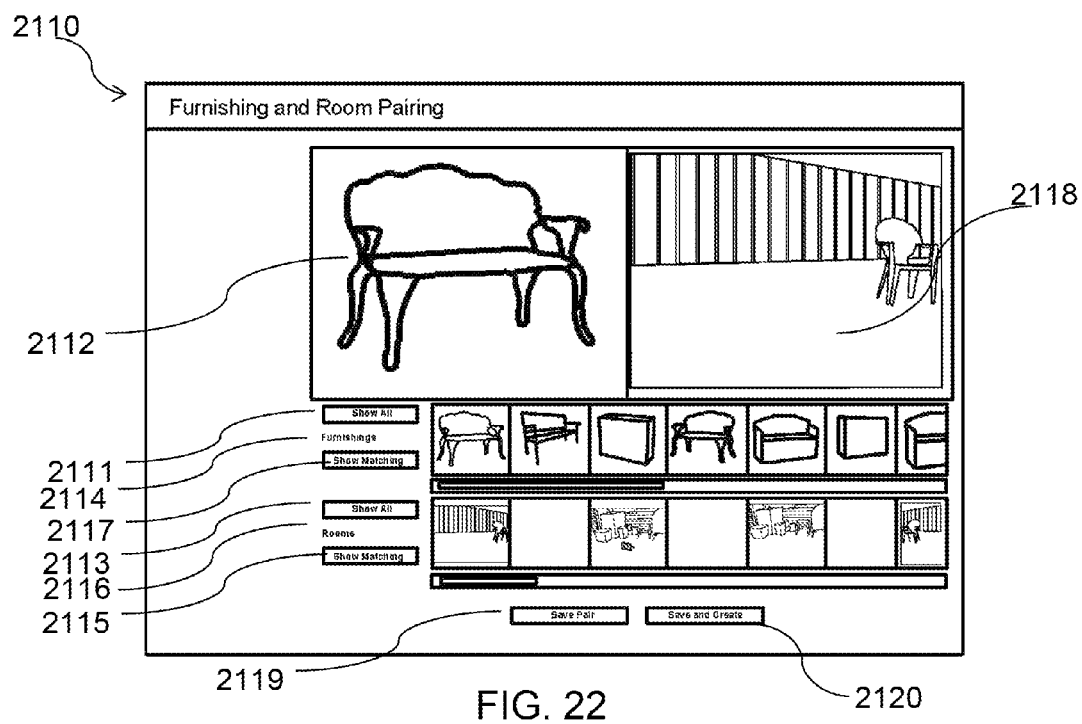

FIG. 22 shows a screen shot of an embodiment of an object image and locale image paring means.

Figure 23:
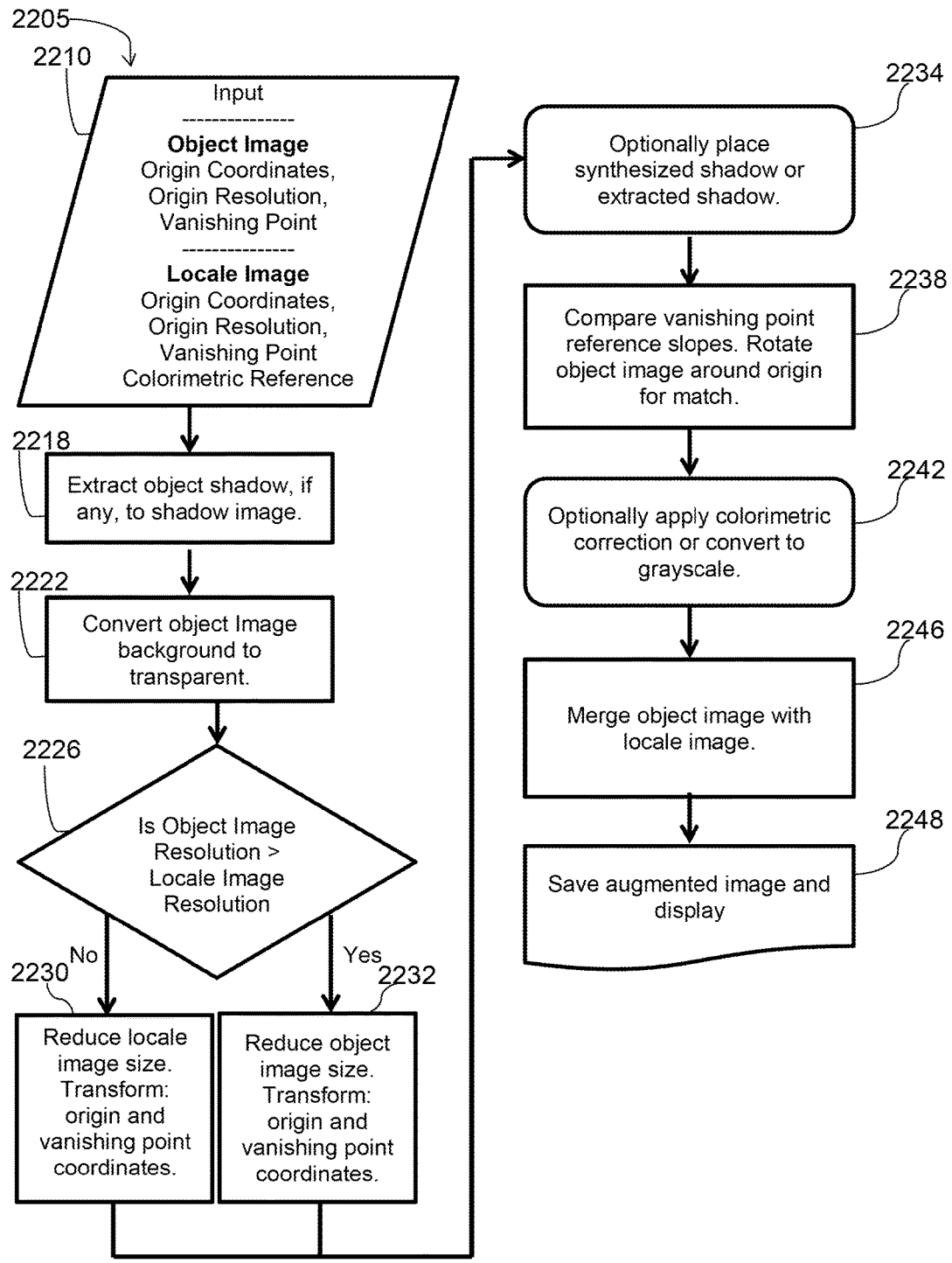

FIG. 23 shows a flow diagram for an example image augmentation software algorithm embodiment.

Figure 24:
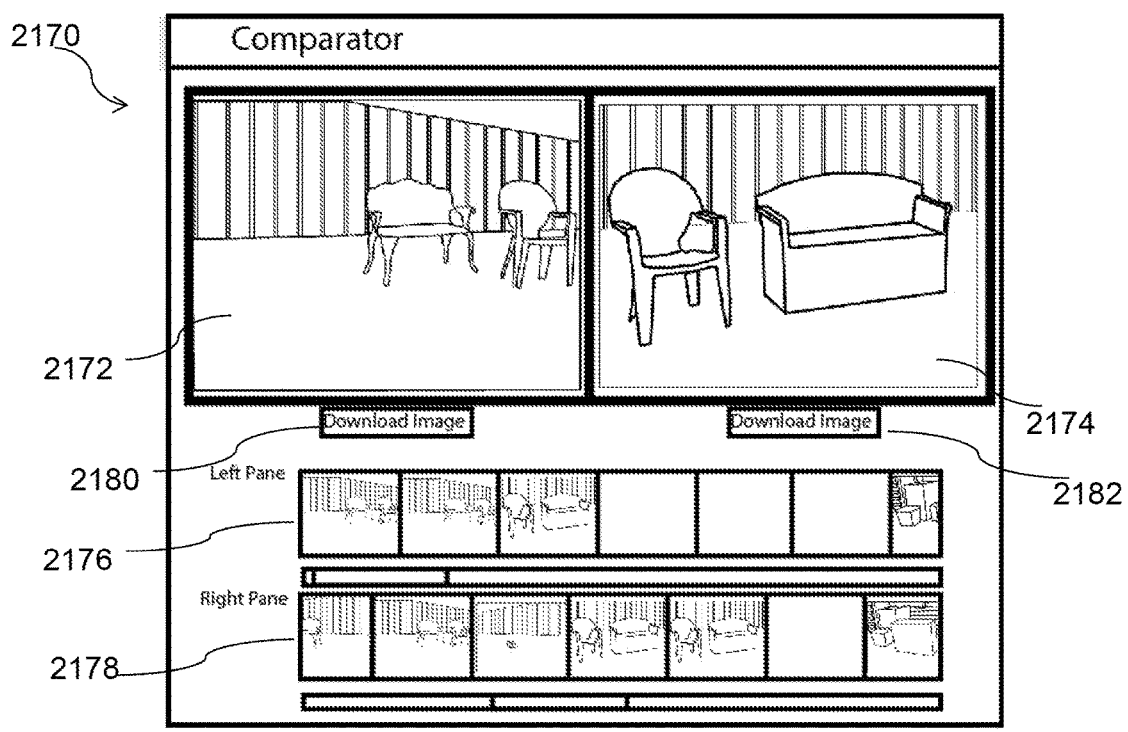

FIG. 24 shows an embodiment of means for viewing and comparing augmented images.

Figure 25:
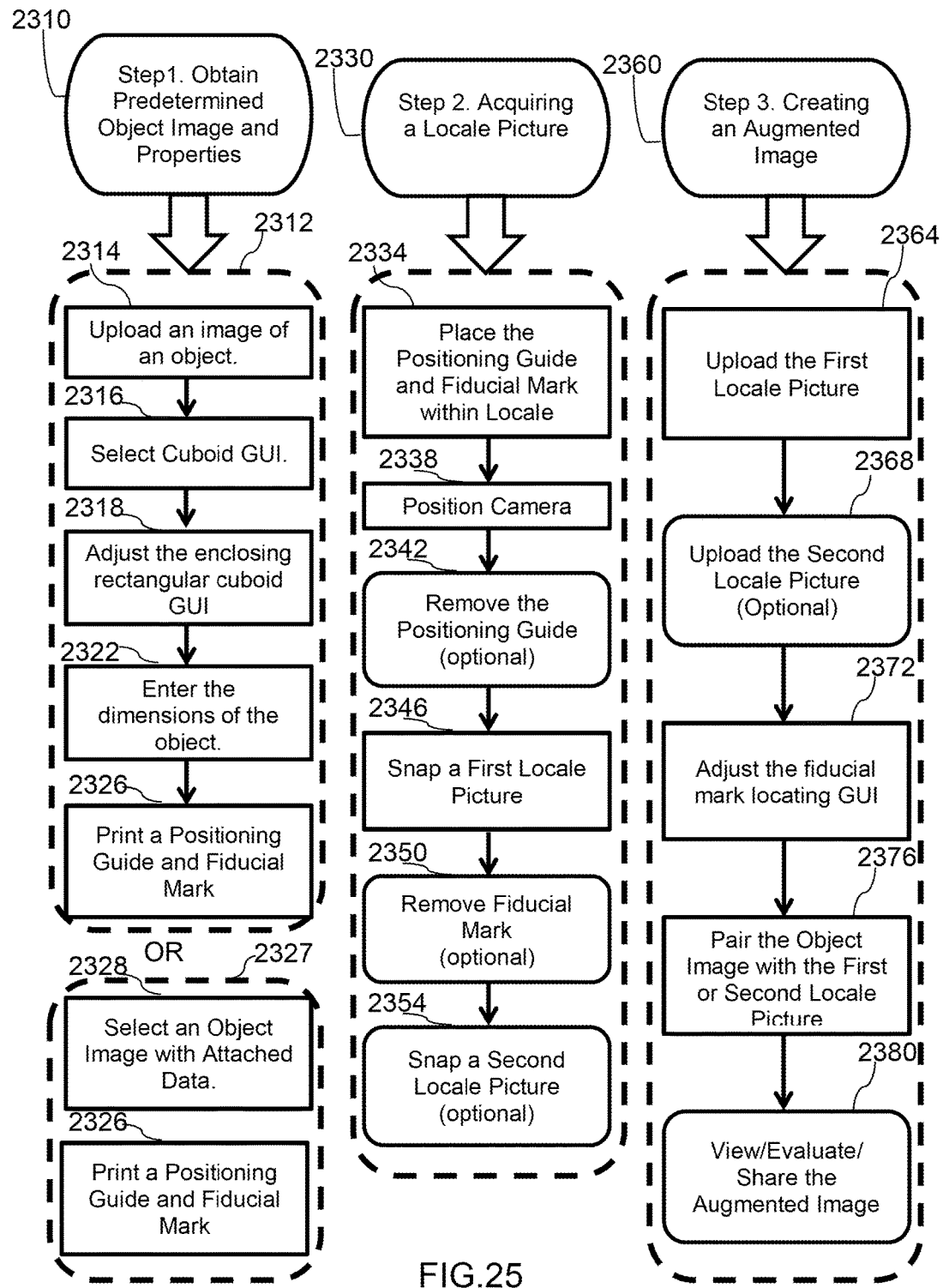

FIG. 25 shows an example embodiment of a process for using a predetermined object image to augment a locale image.

Figure 26:
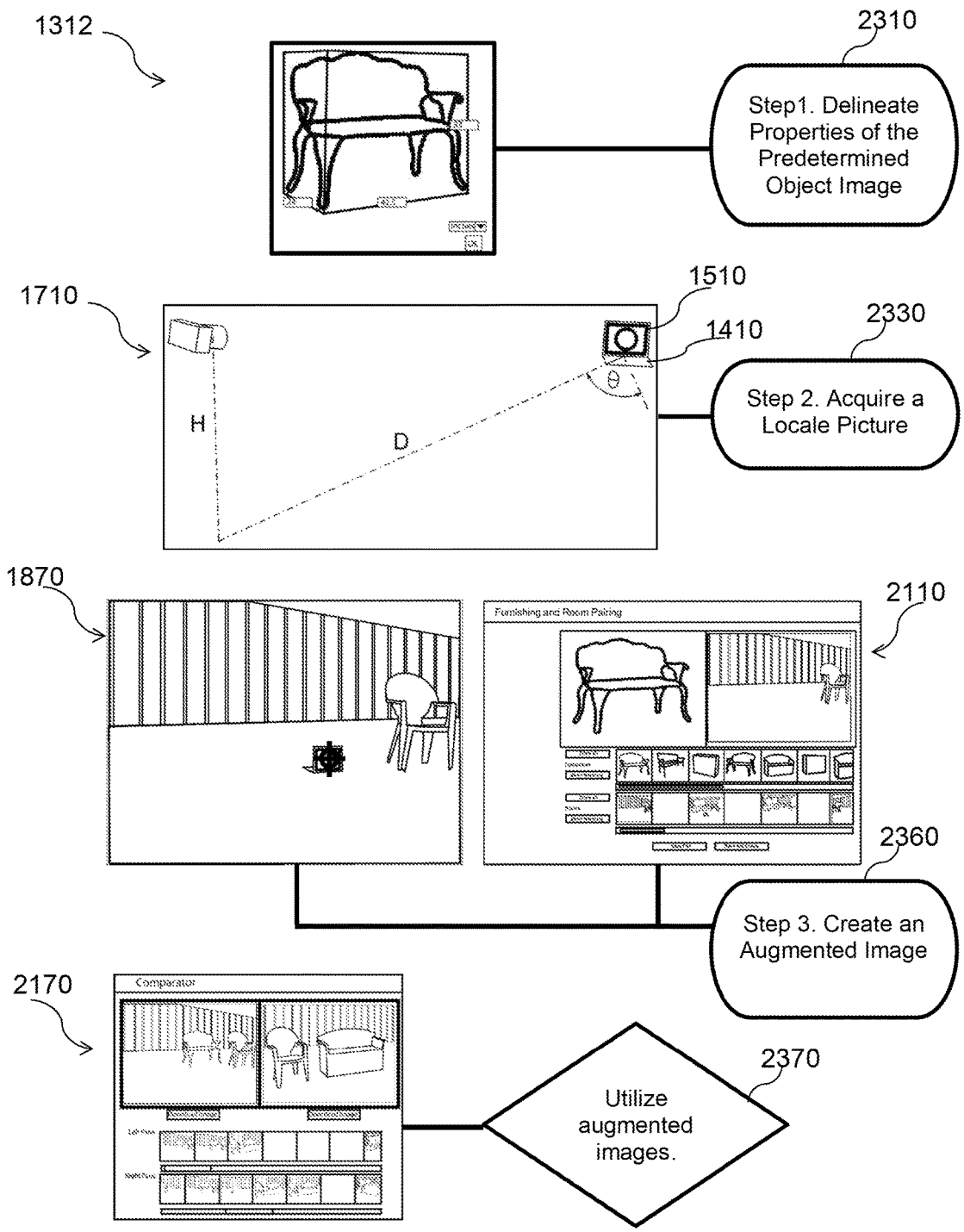

FIG. 26 shows a pictorial representation of aspects of FIG. 25.

Figure 27A:
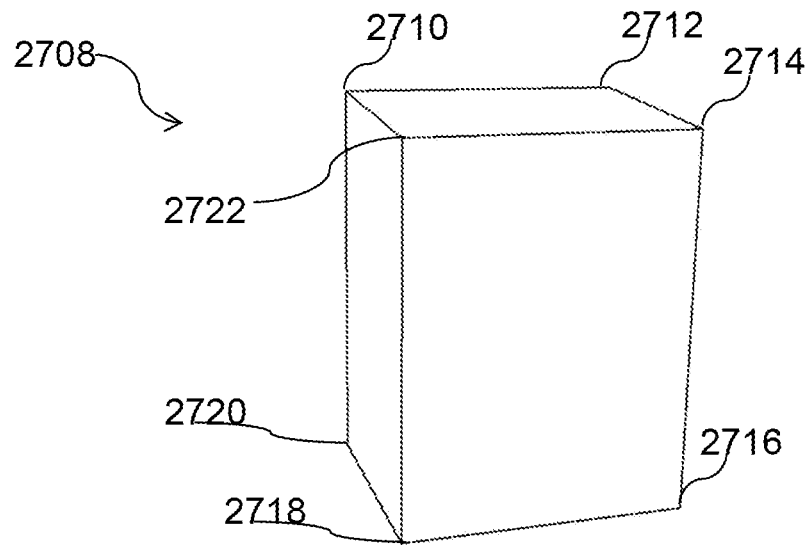

FIG. 27A shows an example first embodiment of a rectangular cuboid phantom.

Figure 27B:
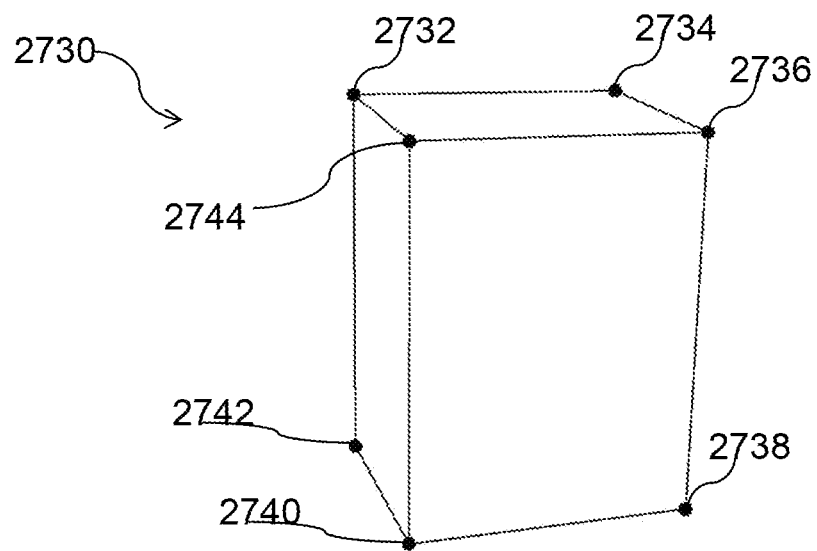

FIG. 27B shows an embodiment of a computer vision readable rectangular cuboid phantom.

Figure 28:
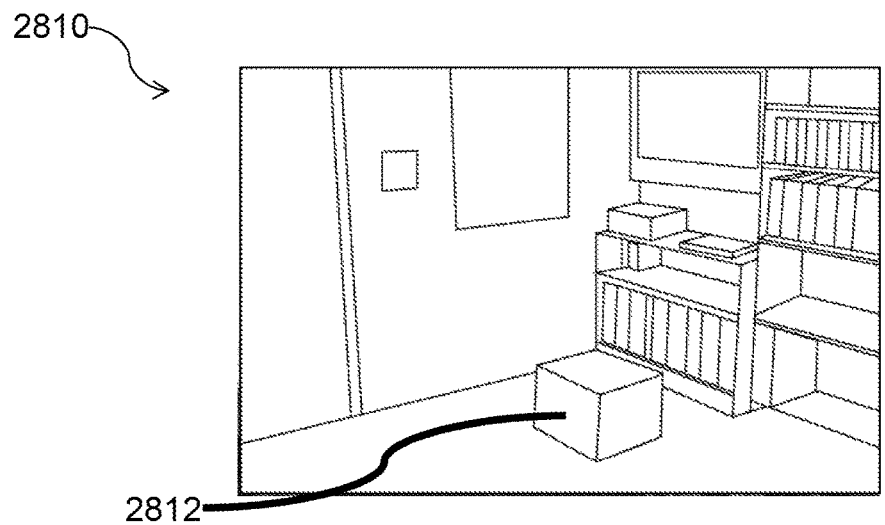

FIG. 28 shows a picture with a version of the first embodiment of a rectangular cuboid phantom within a locale.

Figure 29:
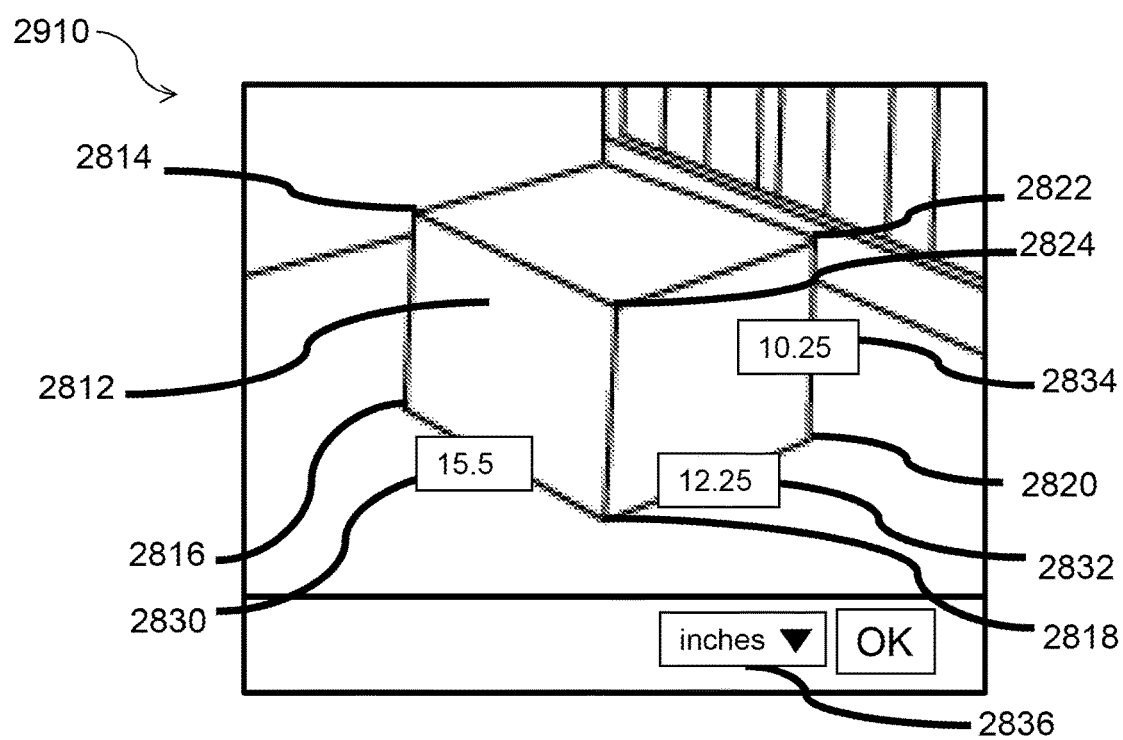

FIG. 29 shows a computer user interface used to define the enclosing rectangular cuboid of an object with an image of a rectangular cuboid phantom.

Figure 30:
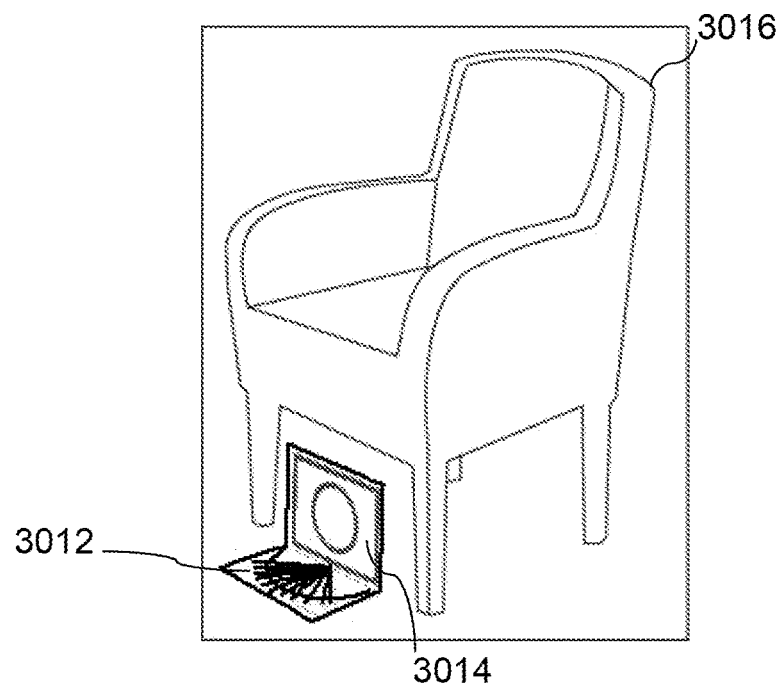

FIG. 30 shows an object with a positioning guide juxtaposed to a fiducial mark.

Figure 31:
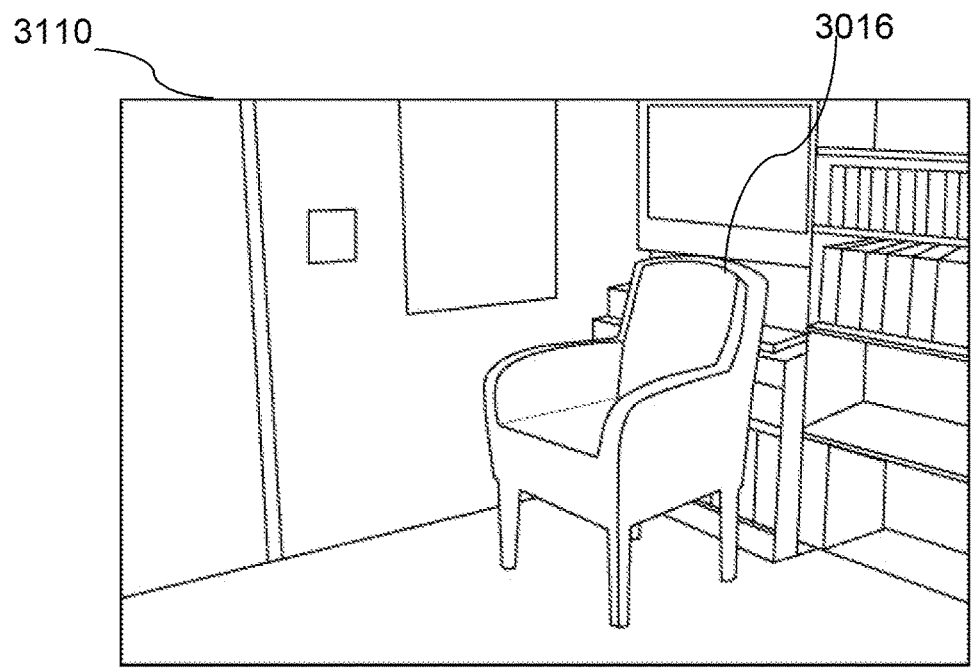

FIG. 31 shows an augmented image.

Figure 32A:
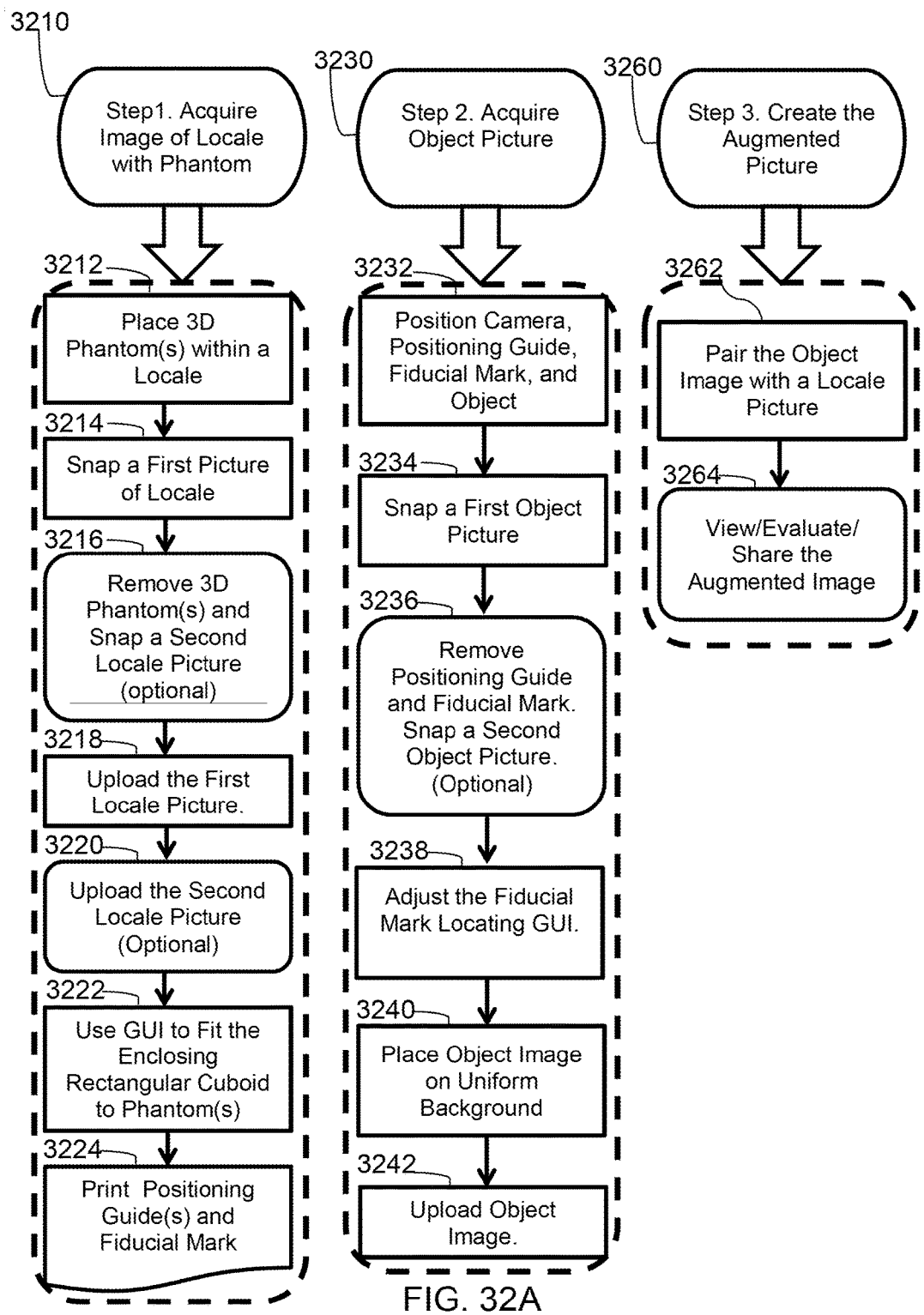

FIG. 32A shows an example first embodiment of a process for using a rectangular cuboid phantom to augment a locale image with an object image.

Figure 32B:
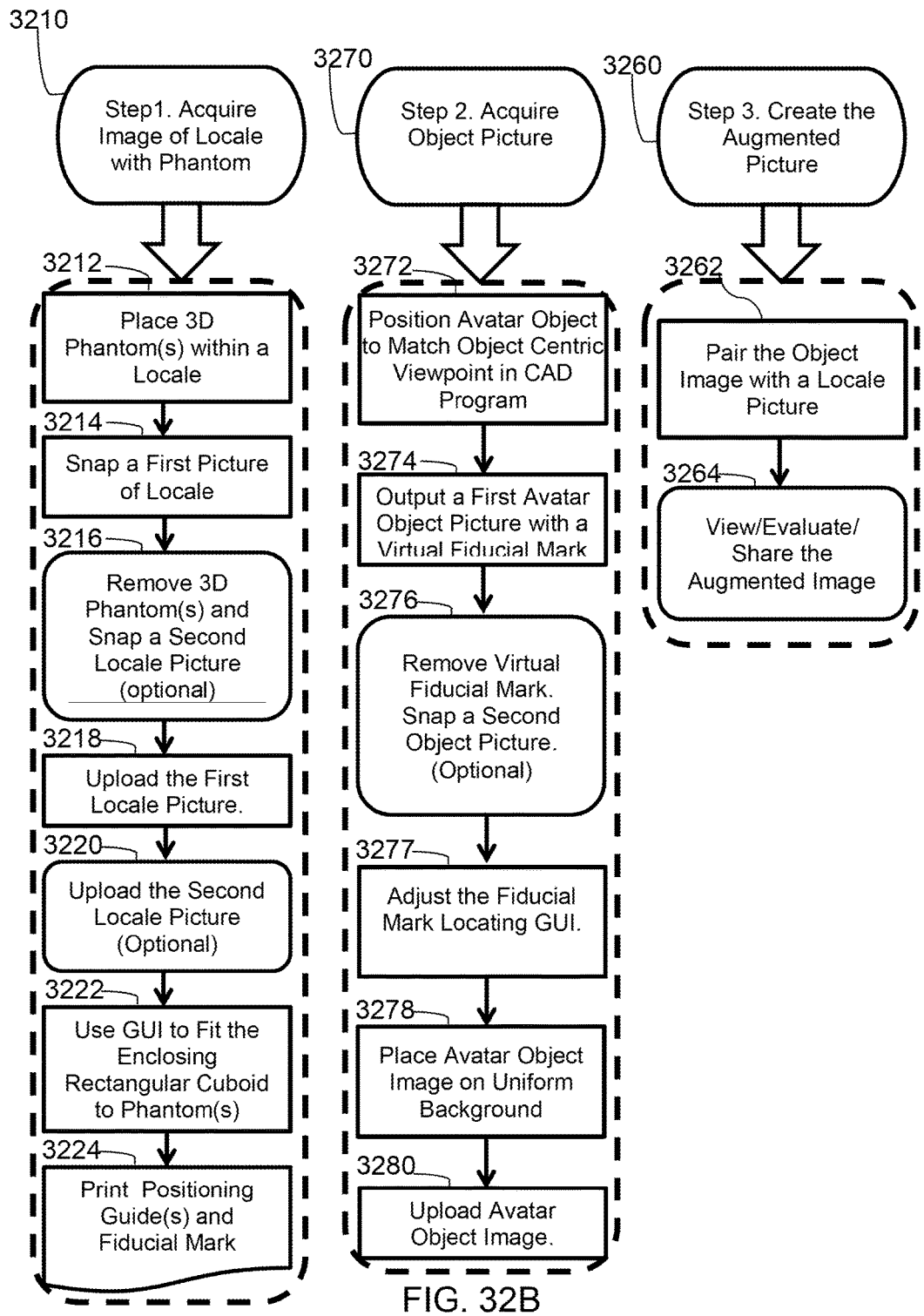

FIG. 32B shows a second embodiment of a process for using a rectangular cuboid phantom to augment a locale image with an avatar object image.

Figure 33A:
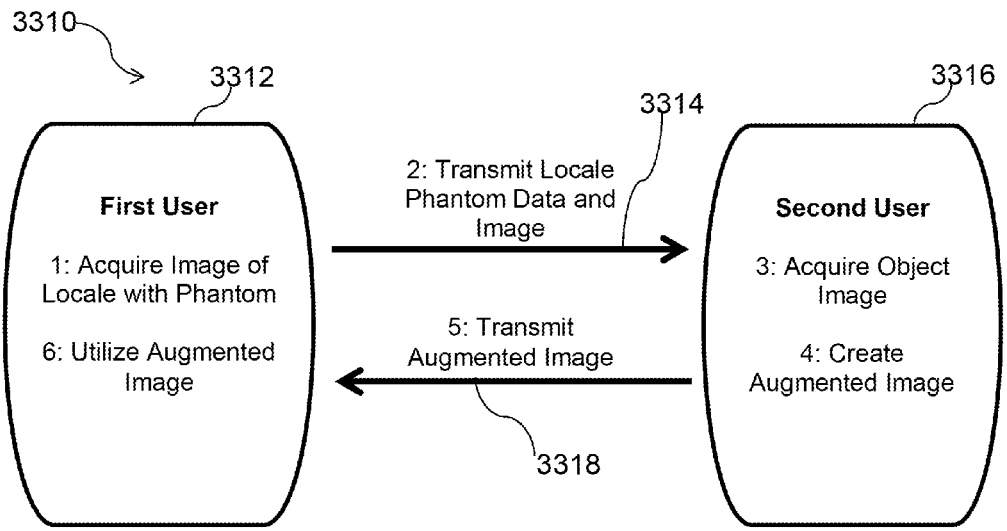

FIG. 33A shows the data flow for a first embodiment of a telecommunication exchange between a first user and a second user.

Figure 33B:
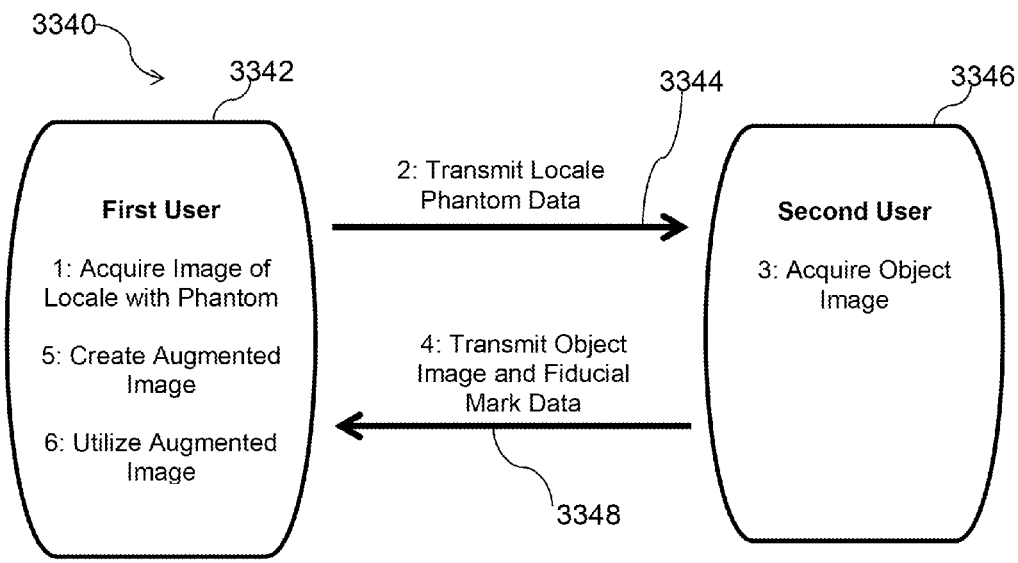

FIG. 33B shows the data flow for a second embodiment of a telecommunication exchange between a first user and a second user.

Figure 34:
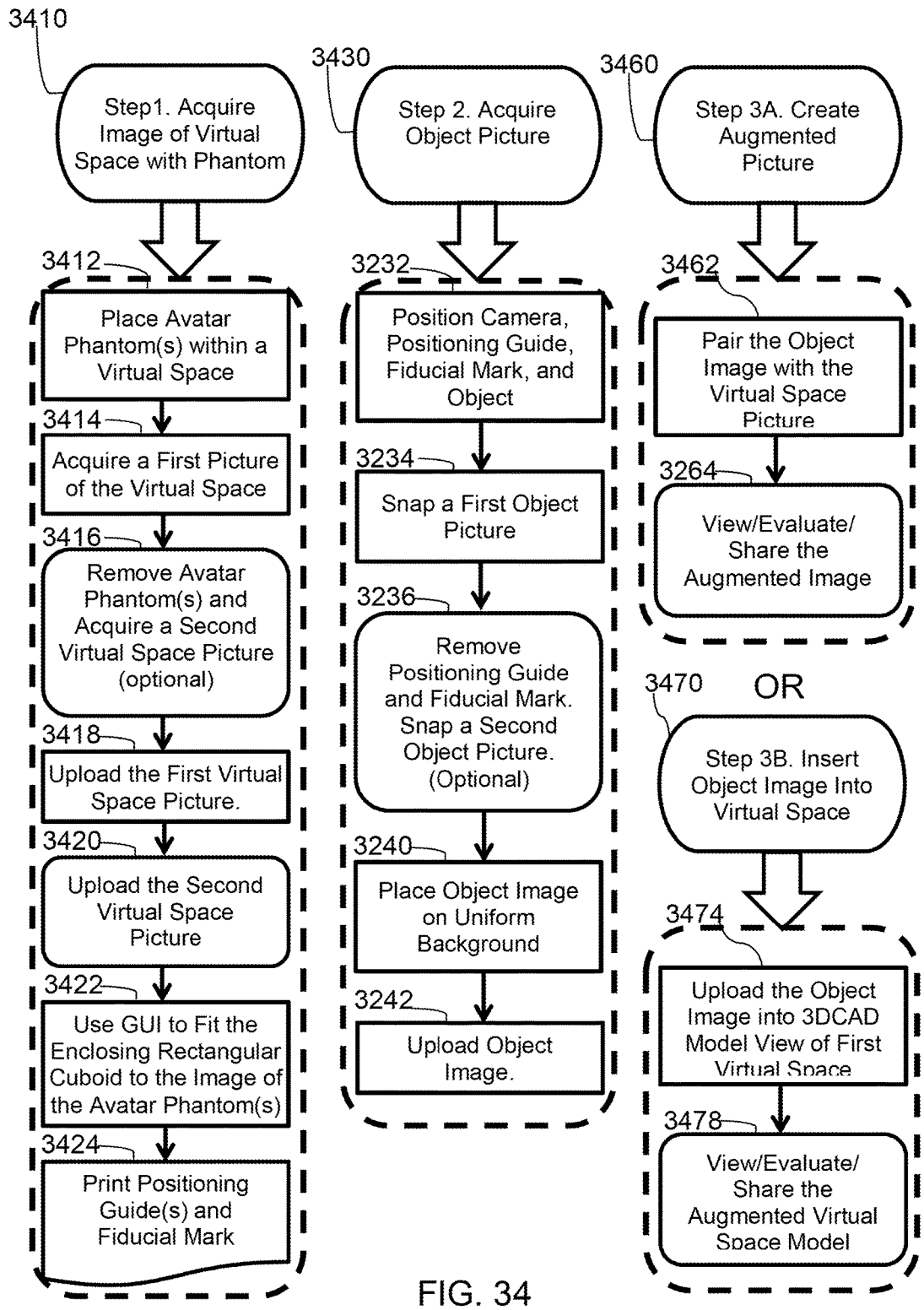

FIG. 34 shows an example embodiment of a process for using a rectangular cuboid phantom avatar to augment a virtual locale image with an object image.

Figure 35A:
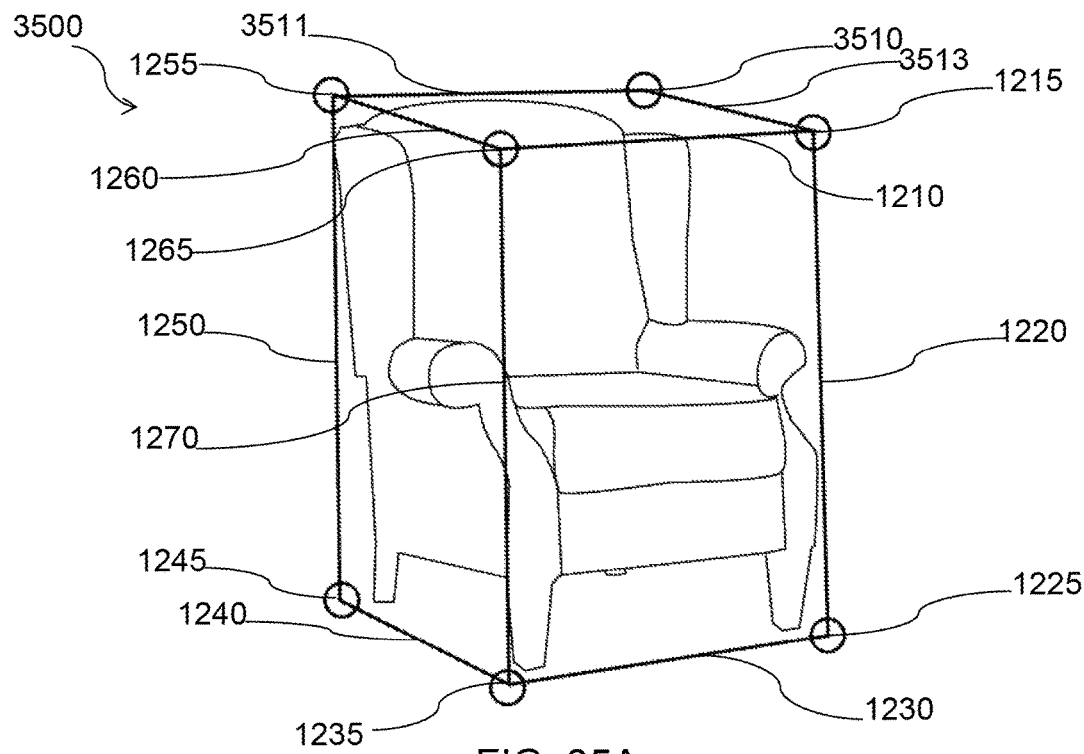

FIG. 35A shows a screen shot of an example second embodiment of a computer user interface for defining vertices.

Figure 35B:
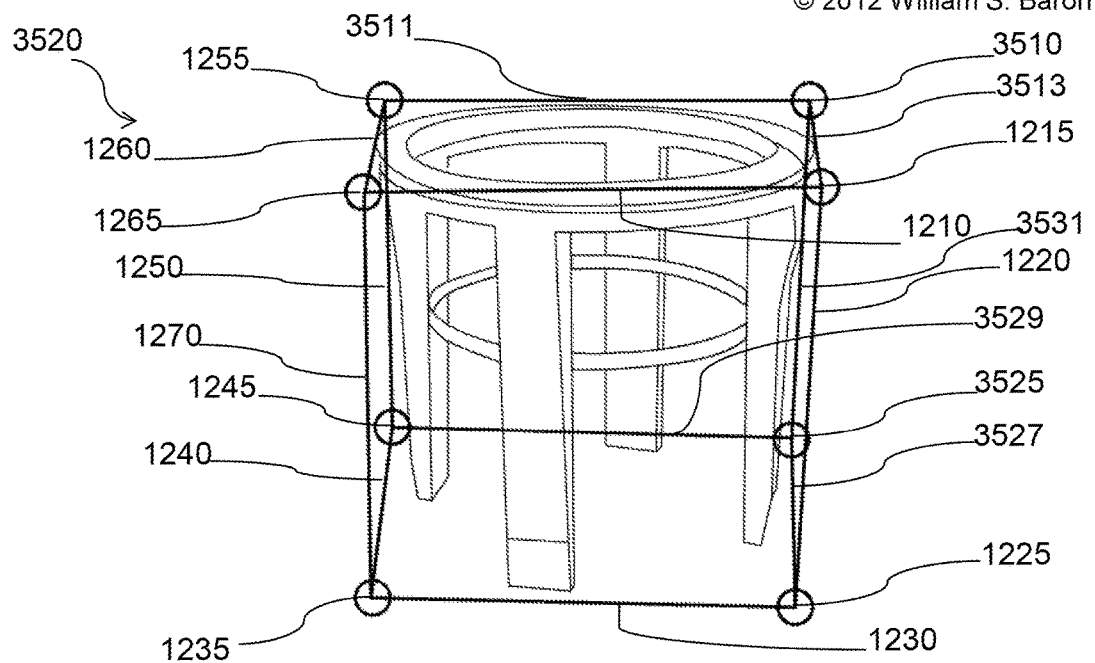

FIG. 35B shows a screen shot of an example third embodiment of a computer user interface for defining vertices.

FIG. 35C shows a screen shot of an example fourth embodiment of a computer user interface for defining vertices.

Figure 35D:
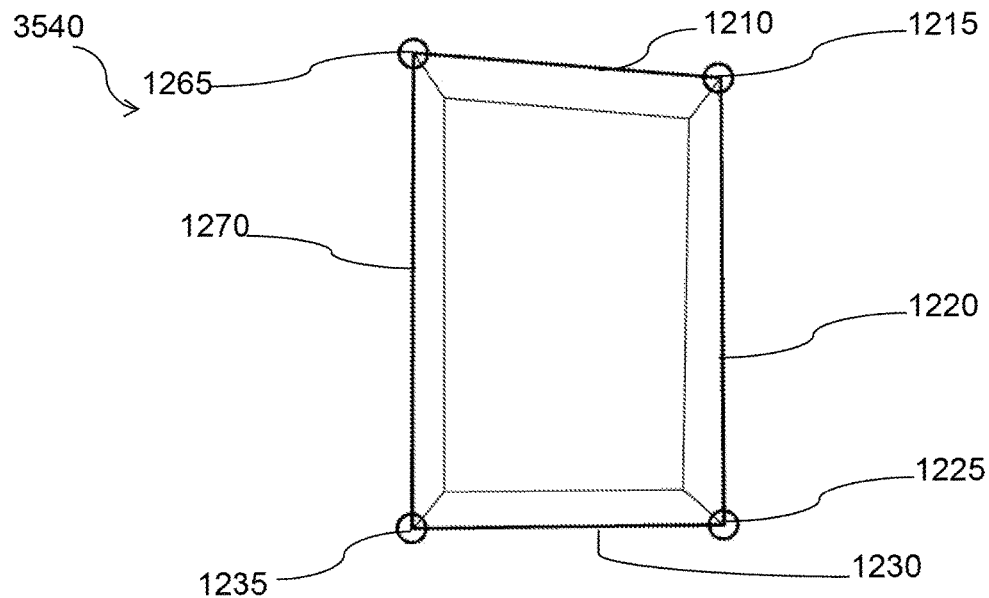
Figure 35D:
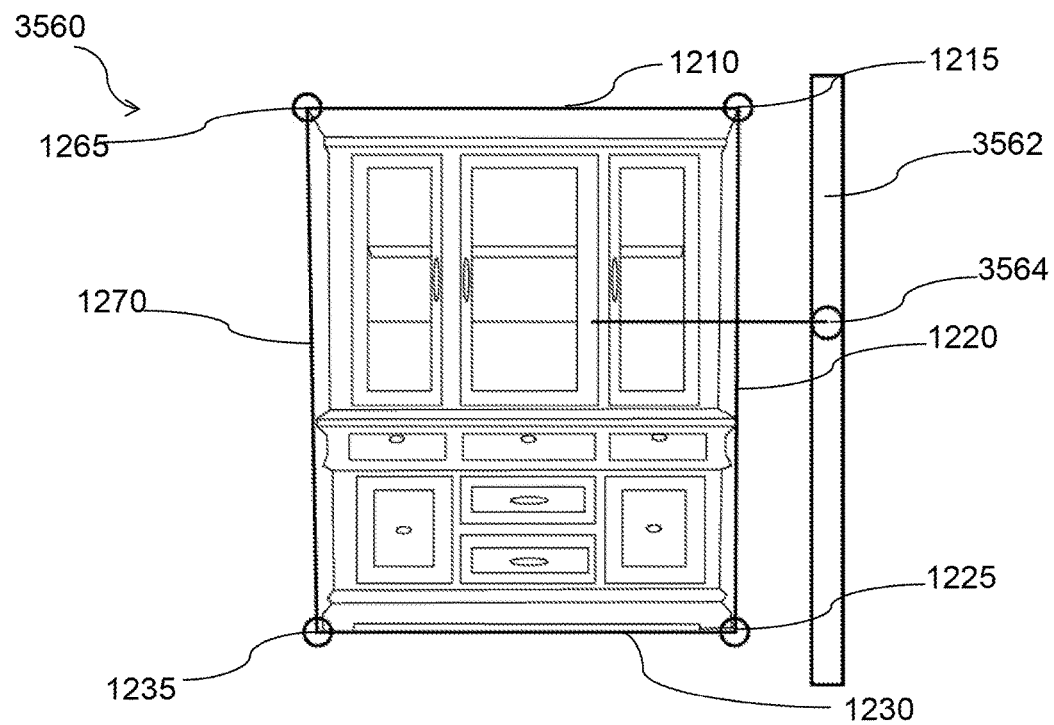

FIG. 35D shows a screen shot of an example fifth embodiment of a computer user interface.

Figure 36:
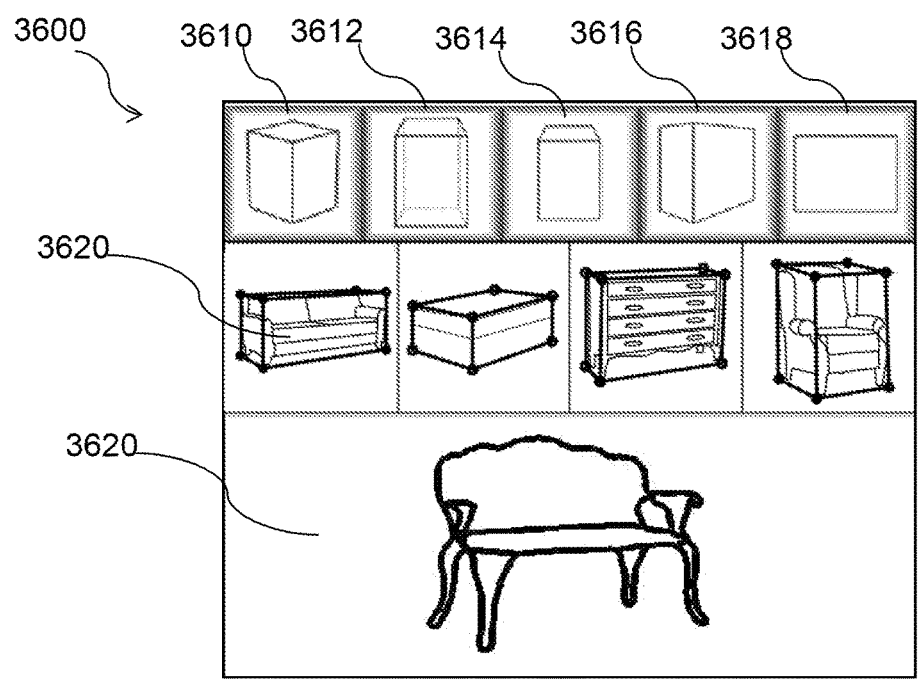

FIG. 36 shows a screen shot of an embodiment of a means for selecting a computer user interface.

Figure 37:
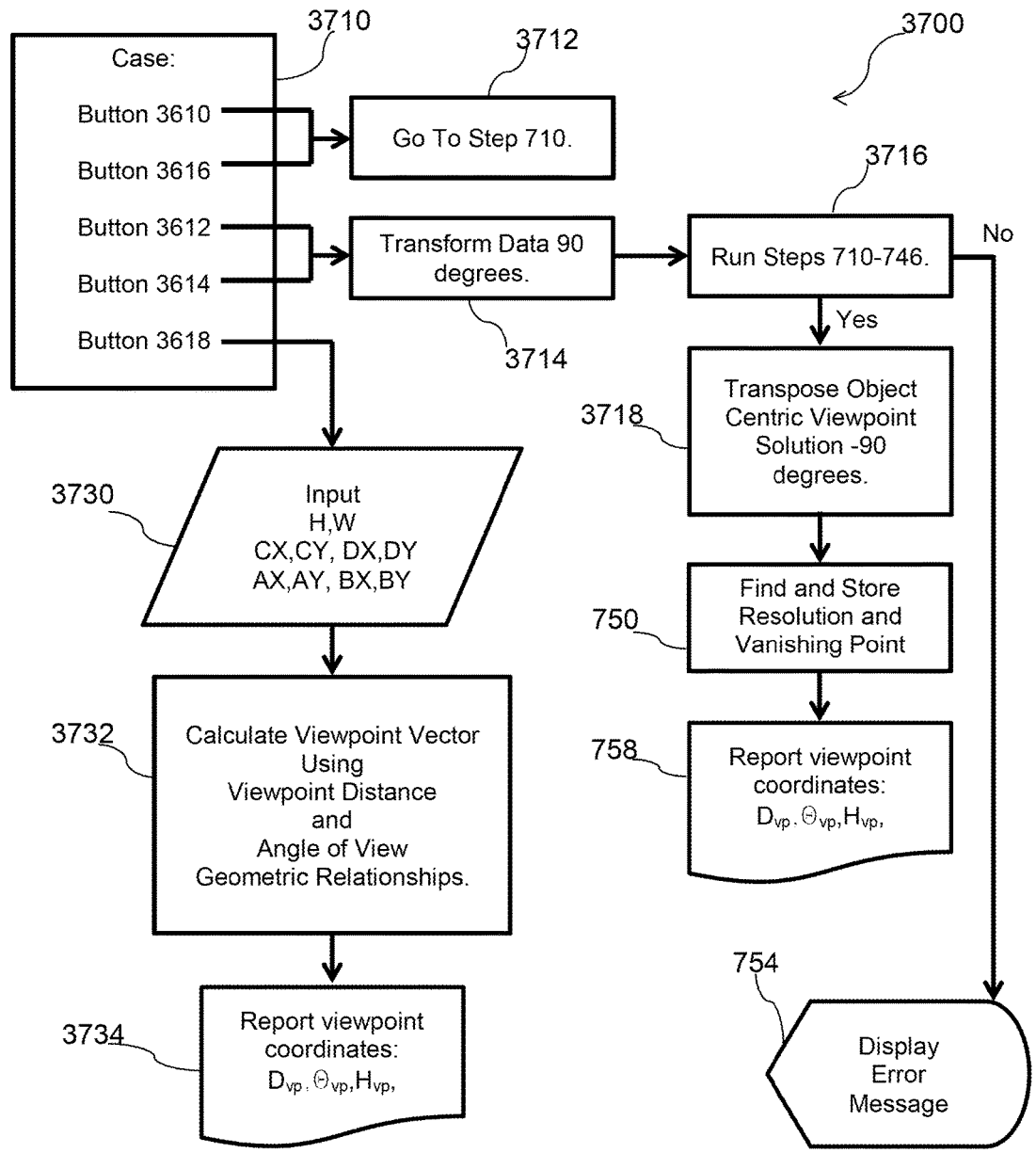

FIG. 37 shows a flow diagram for an embodiment of a switching software algorithm.

Figure 38:
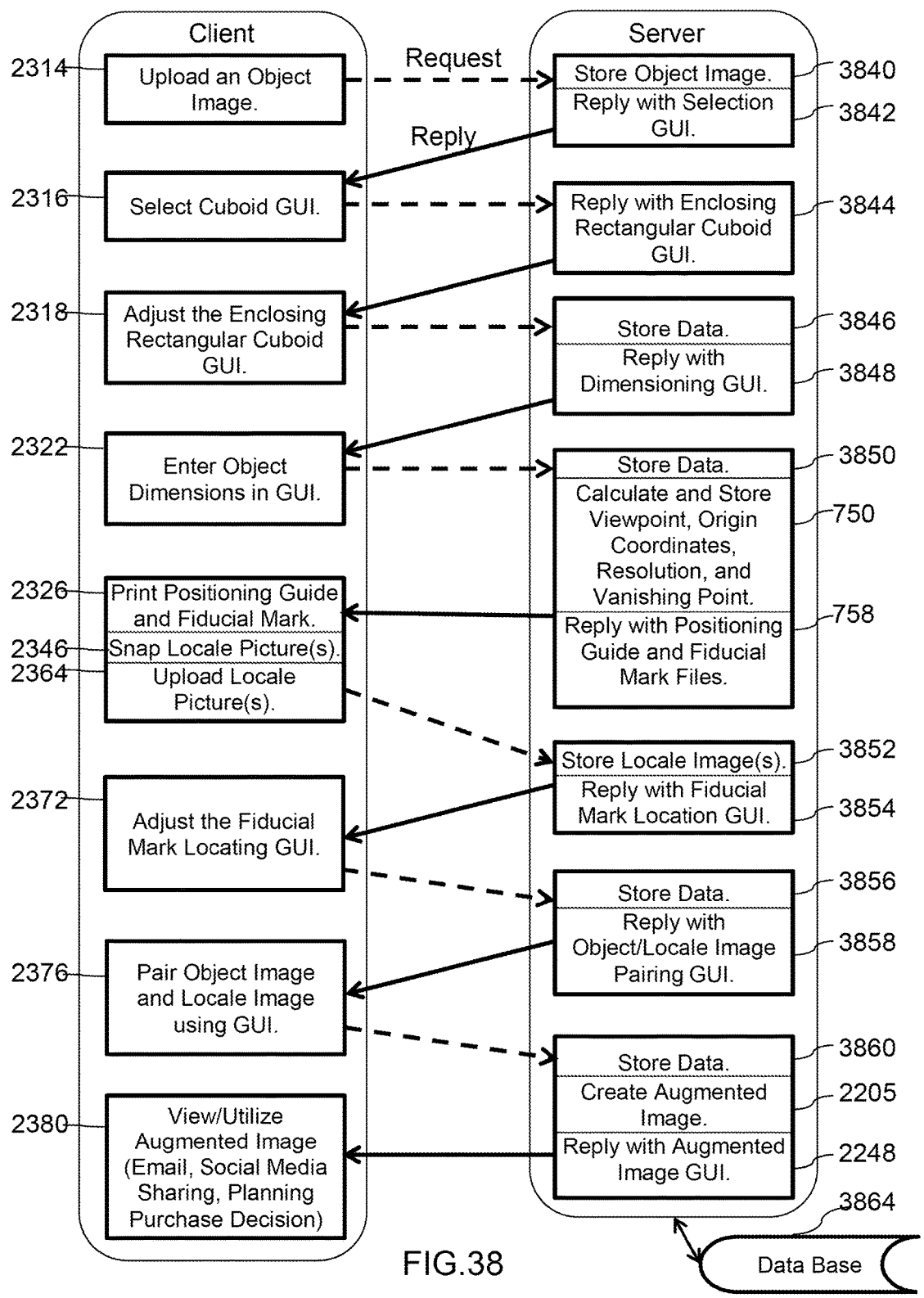

FIG. 38 shows an overview of client side and server side components for an example internet embodiment of a process for augmenting a locale image with a predetermined object image.

Figure 39:
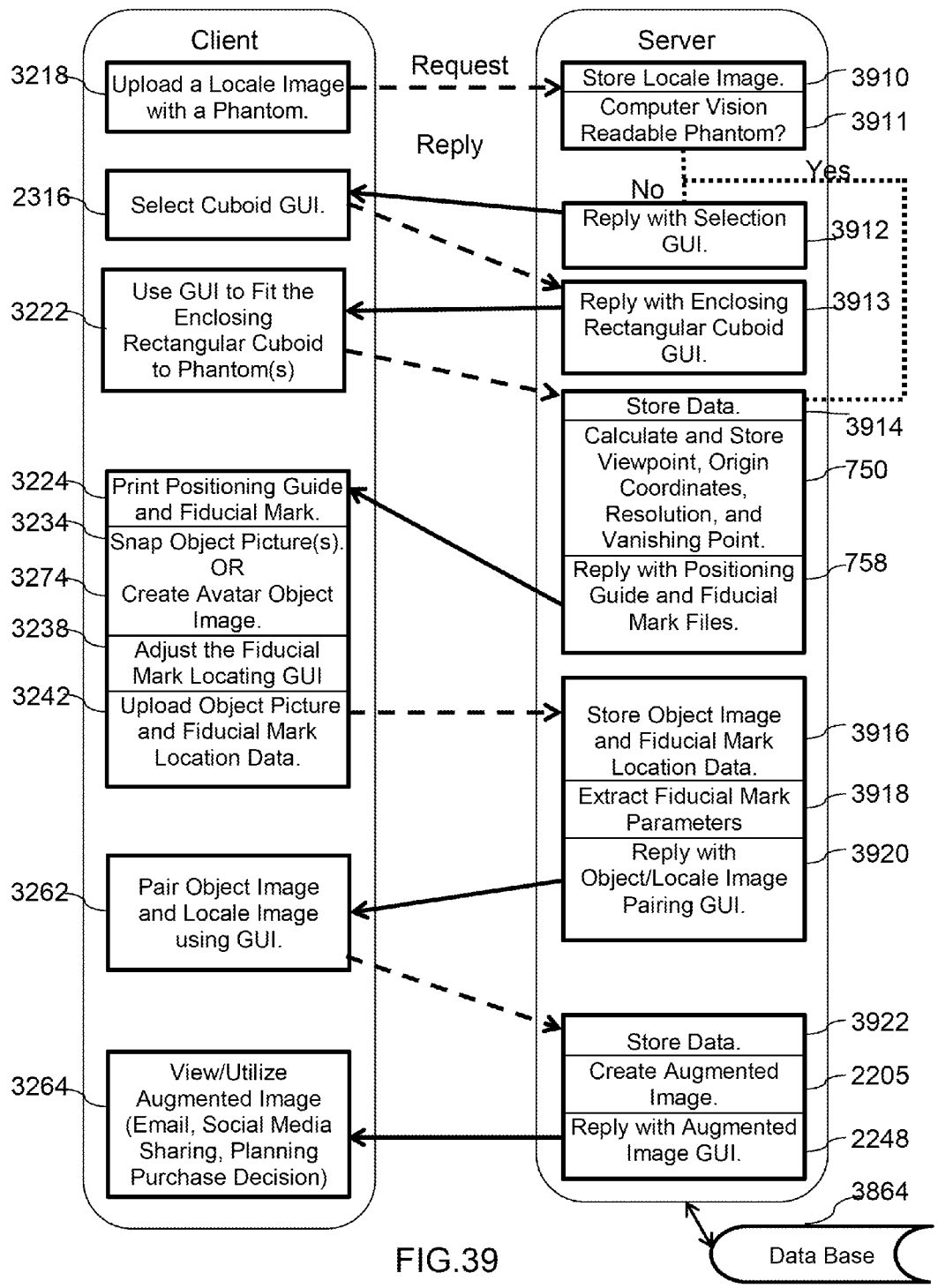

FIG. 39 shows an overview of client side and server side components for an example internet embodiment of a process for using a phantom to augment a locale image with a physical object image or an avatar object image.

Figure 40:
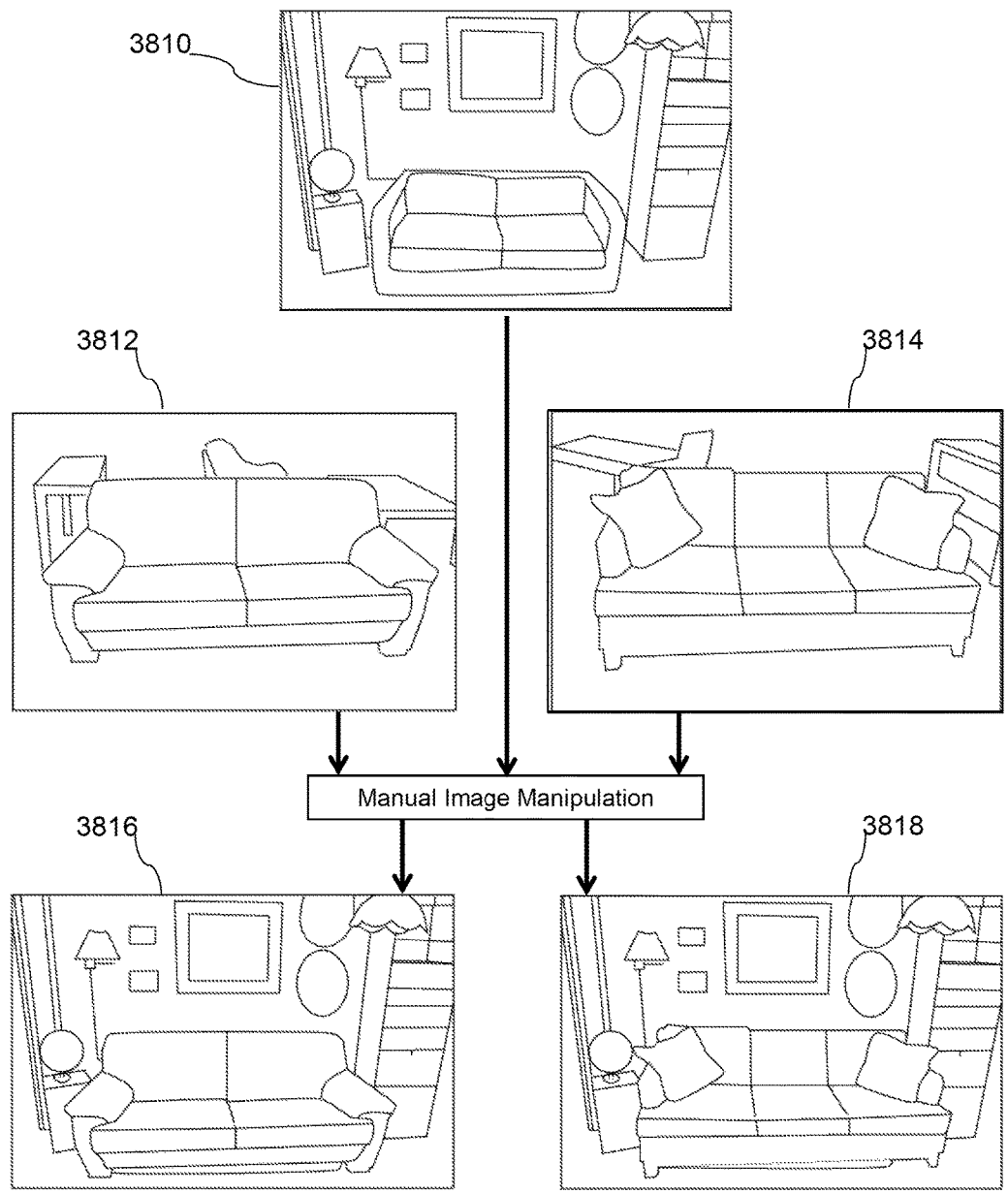

FIG. 40 shows a locale image, a first object image, and a second object image, which are used to manually create a first augmented image and a second augmented image.

Figure 41A:
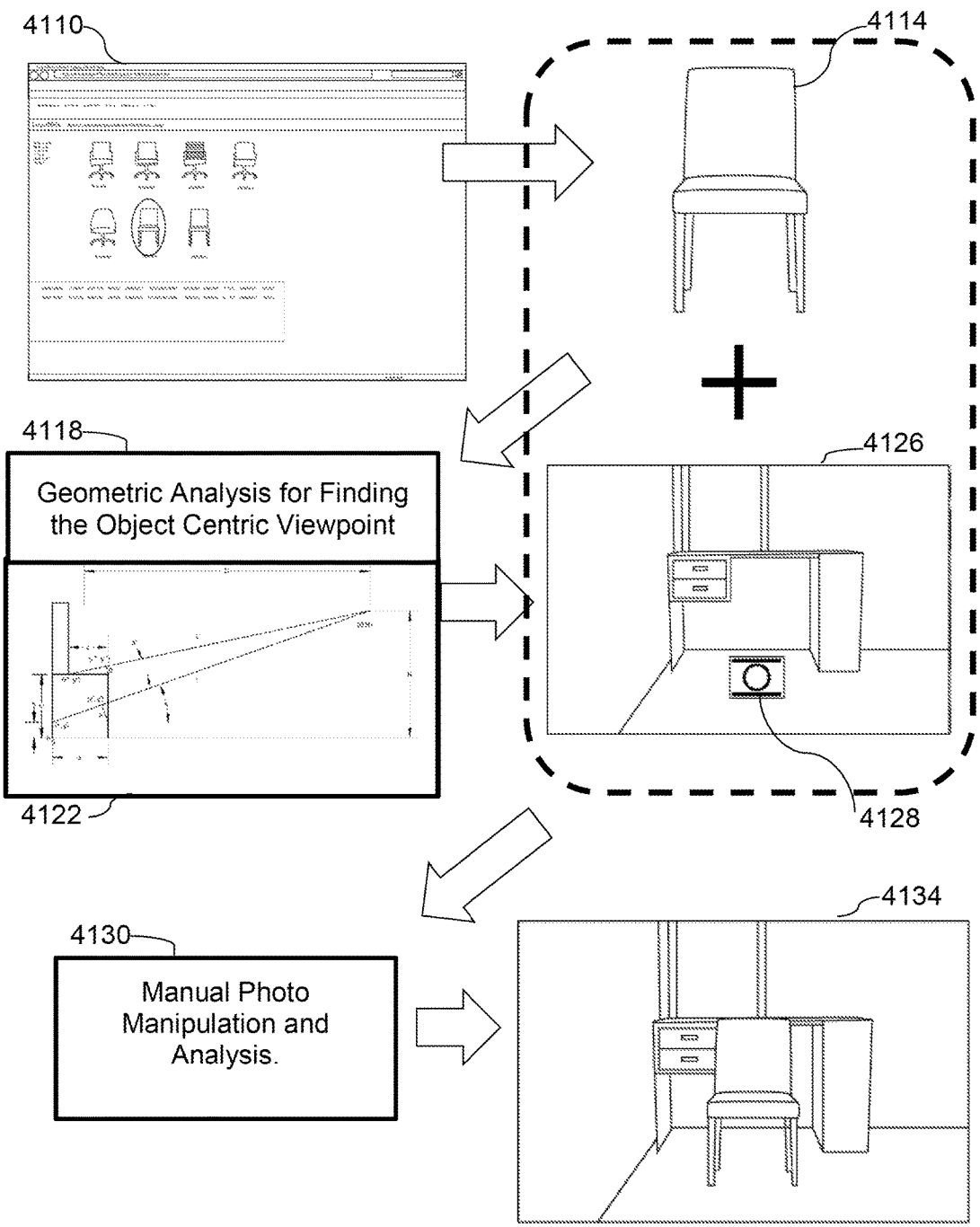

FIG. 41A shows the utility of using geometric analysis to find the object centric viewpoint of a preexisting object image in order to augment a locale image.

Figure 41B:
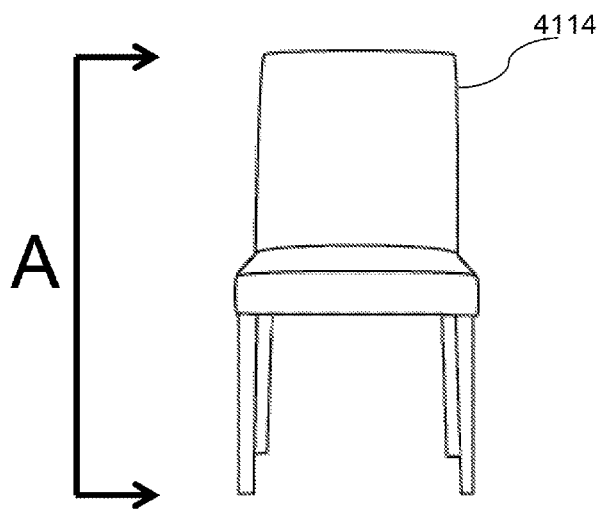

FIG. 41B shows a predetermined object image.

Figure 41C:
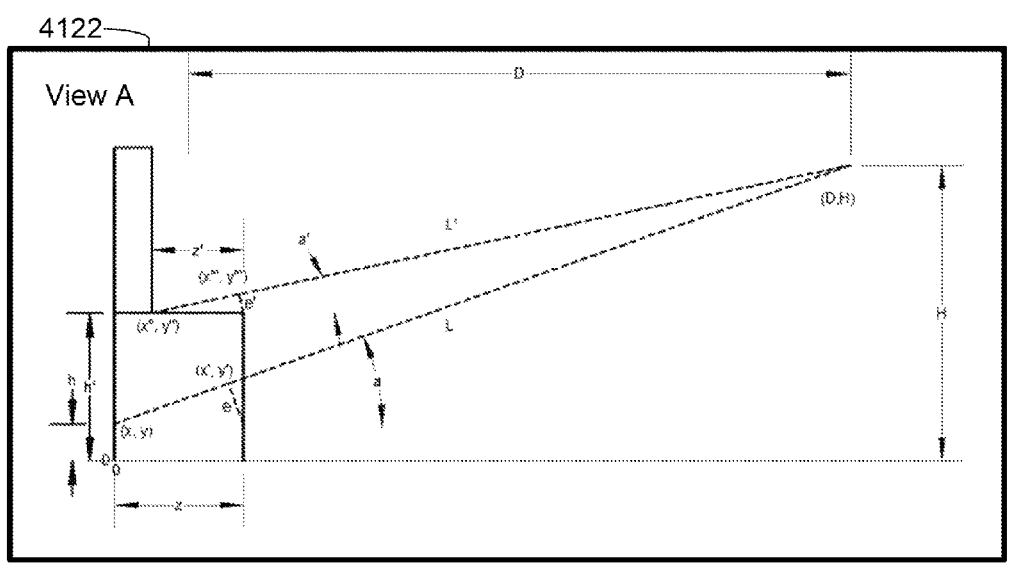

FIG. 41C shows a construction drawing for geometric analysis.

DETAILED DESCRIPTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

As used in this specification, the term "user" may be one person or more than one person.

A.1 Means for Obtaining Photographic Parameters from a Preexisting Image

In this section, examples of embodiments of a means for obtaining photographic parameters from a preexisting image are taught. Photographic parameters obtained for the preexisting object image include: the object centric viewpoint of the enclosing rectangular cuboid of an imaged object, the location of a reference point within the image that corresponds to the origin of the object centric viewpoint coordinate system, the resolution of the image at the position of the origin of the object centric viewpoint, and the position of the vanishing point for the face of the rectangular cuboid associated with the origin of the object centric viewpoint.

A.1.1 Example of First Embodiment of the Means for Obtaining Photographic Parameters from a Preexisting Image An example first embodiment of the means for obtaining photographic parameters from a preexisting image is taught here.

In an example first embodiment of the means for obtaining photographic parameters from a preexisting image, software is utilized that runs on a computer. Said software and computer-user interface methods and processes provide a user with means for obtaining: the object centric viewpoint used when a predetermined image of an object was acquired, the location of a reference point within the image that corresponds to the origin of the object centric viewpoint coordinate system, the resolution of the image at the position of the origin of the object centric viewpoint, and the position of the vanishing point for the face of the enclosing rectangular cuboid associated with the origin of the object centric viewpoint.

As used herein, the term object refers to either a single component, e.g. a chair, or a plurality of components, e.g. multiple chairs and a table.

A.1.1.1 Analytical Framework for the Object Centric Viewpoint

An object centric viewpoint references the camera's position relative to an object and the object's orientation relative to the viewpoint.

A.1.1.1.1 Coordinate Systems

Figure 1A:
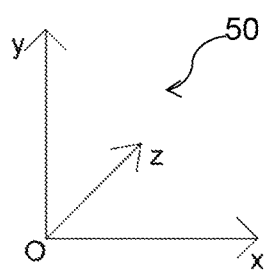
FIG. 1A shows a three dimensional Cartesian coordinate system.
Figure 1B:
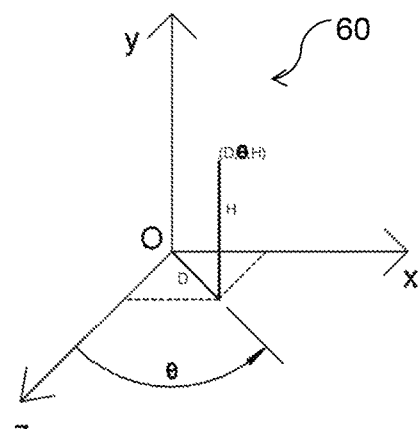
FIG. 1B shows a three dimensional cylindrical coordinate system.
Figure 1C:
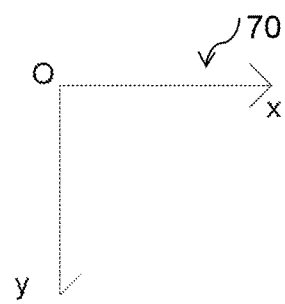
FIG. 1C shows a two dimensional Cartesian coordinate system.

Coordinate systems used in this specification are shown in FIG. 1A, FIG. 1B, and FIG. 1C.

FIG. 1A shows a three dimensional Cartesian coordinate system, 50, with orthogonal X, Y, and Z axes. A point in space is defined by the values of the X, Y, and Z coordinates as referenced to the origin, O.

FIG. 1B shows a three dimensional cylindrical coordinate system, 60, referenced to a Cartesian coordinate system. In the cylindrical coordinate system, a point in space is defined by the values of a distance, D, along a vector that originates at the origin, O, and extends from the origin, O, at an angle $\Theta$ to the Z axis, and at a height, H, above the plane formed by the X axis and the Z axis.

FIG. 1C shows a two dimensional Cartesian coordinate system, 70, with orthogonal X and Y axes. A point on the surface is defined by the values of the X and Y coordinates as referenced to the origin O. The X axis is increasing to the right. The Y axis is increasing downward.

The three dimensional Cartesian coordinate system, 50, is used to define the position of points in physical space. The three dimensional cylindrical coordinate system, 60, is used to define the position of points in physical space. The three dimensional cylindrical coordinate system is convenient to use for defining a viewpoint relative to a reference point associated with an object. The two dimensional Cartesian coordinate system, 70, is used to define the positions of points in a two dimensional image.

The selection of a particular coordinate system is one of convenience. The concepts taught in this specification apply equally to restatements of the concepts using alternative coordinate systems.

A.1.1.1.2 Rectangular Cuboid

A rectangular cuboid is a convex polyhedron bounded by six rectangular faces with each pair of adjacent faces meeting at a right angle.

Figure 2:
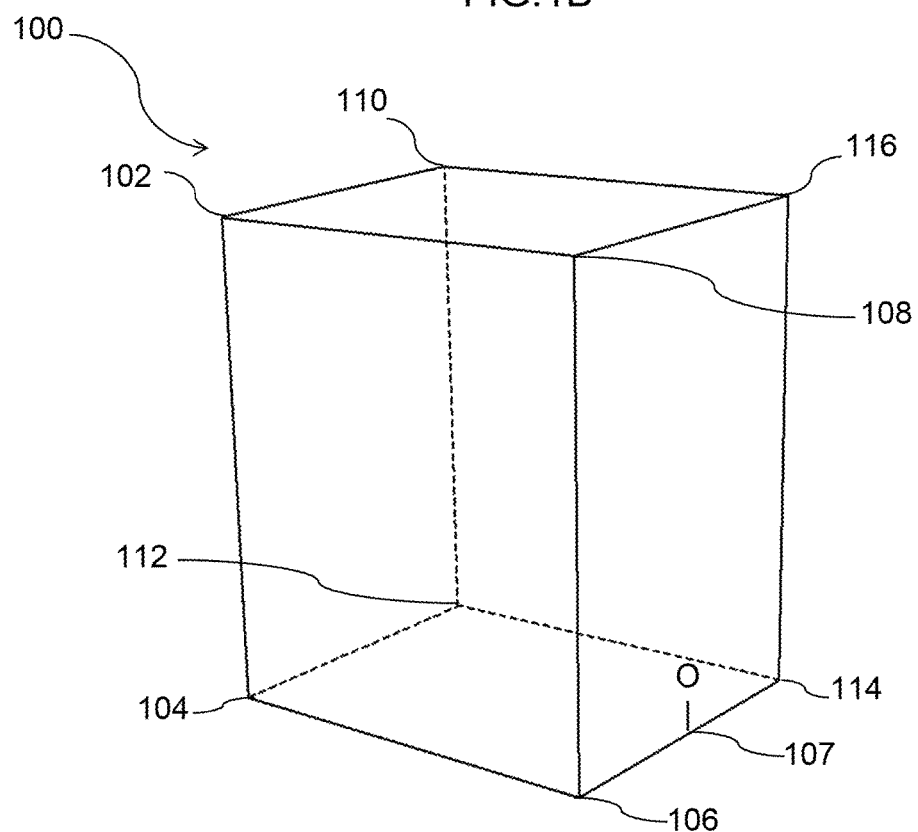
FIG. 2 shows a rectangular cuboid.

FIG. 2 shows a rectangular cuboid, 100, with vertices 102, 104, 106, 108 110, 112, 114, and 116 and edges that are delineated by bounding pairs of vertices 102-104, 102-108, 102-110, 112-104, 112-110, 112-114, 106-114, 114-116, 108-116, 108-106, 104-106, and 110-116.

The following discussion references the three dimensional Cartesian coordinate system 50 with the edge 106-114 parallel to the X axis, the edge 108-106 parallel to the Y axis, and the edge 104-106 parallel to the Z axis.

For the viewpoint used to draw the rectangular cuboid of FIG. 2, vertex 112 is "hidden" and the remaining seven vertices are "visible". For the viewpoint used to draw the rectangular cuboid of FIG. 2, edges 112-104, 112-110, and 112-114 are hidden and the remaining nine edges are visible.

The shape and appearance of a two dimensional image of a rectangular cuboid depends on the position of the viewpoint in three dimensional space, relative to the position and dimensions of the cuboid.

Figure 3:
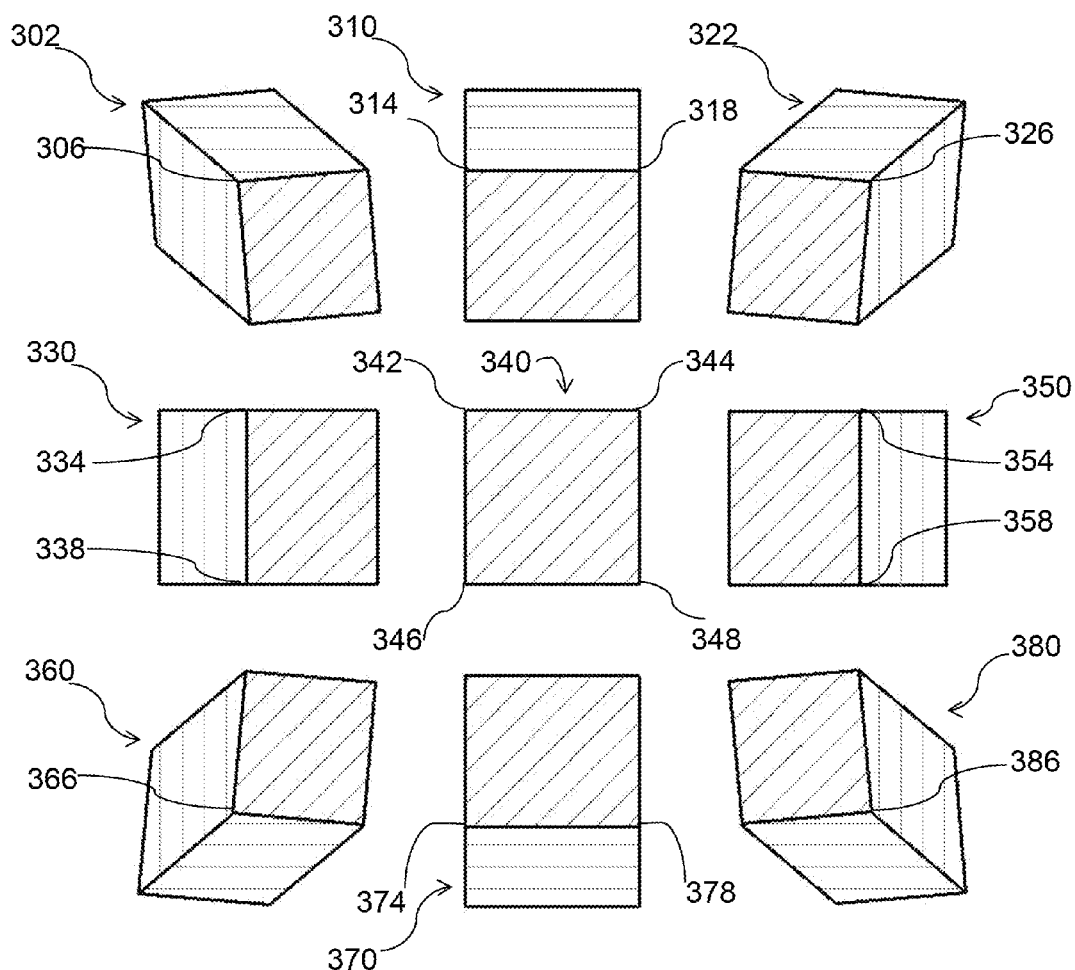
FIG. 3 shows the faces of a rectangular cuboid that are visible, as the position of the viewpoint changes.

As the position of the viewpoint changes, the faces of a rectangular cuboid that are visible are shown in FIG. 3 for nine classes of viewpoint position relative to the rectangular cuboid. The views in FIG. 3 are not drawn in perspective or to scale, as each view represents a range of viewpoints, rather than a specific viewpoint. For all views, by definition, the Z axis value of the viewpoint coordinate, $(X_{vp}, Y_{vp}, Z_{vp})$, is less than the Z axis value of one or more rectangular cuboid reference vertex/vertices coordinates $(X_{ref1}, Y_{ref1}, Z_{ref1})$, $(X_{ref2}, Y_{ref2}, Z_{ref2})$, $(X_{ref3}, Y_{ref3}, Z_{ref3})$, and $(X_{ref4}, Y_{ref4},$ $Z_{ref4}$), i.e. $Z_{vp}<Z_{ref1}$, $Z_{vp}<Z_{ref2}$, $Z_{vp}<Z_{ref3}$, and $Z_{vp}<Z_{ref4}$., where the subscript "ref" references the vertex coordinate and the subscript "vp" references the viewpoint coordinate.

In view 302: the reference vertex, 306, has coordinates $(X_{ref1}, Y_{ref1}, Z_{ref1})$ and $X_{vp}<X_{ref1}$ and $Y_{vp}>Y_{ref1}$.

In view 322: the reference vertex, 326, has coordinates $(X_{ref1}, Y_{ref1}, Z_{ref1})$ and $X_{vp}>X_{ref1}$ and $Y_{vp}>Y_{ref1}$.

In view 360: the reference vertex, 366, has coordinates $(X_{ref1}, Y_{ref1}, Z_{ref1})$ and $X_{vp}<X_{ref1}$ and $Y_{vp}<Y_{ref1}$.

In view 380: the reference vertex, 386, has coordinates $(X_{ref1}, Y_{ref1}, Z_{ref1})$ and $X_{vp}>X_{ref1}$ and $Y_{vp}<Y_{ref1}$.

In view 310: the reference vertex 314 has coordinates $(X_{ref1}, Y_{ref1}, Z_{ref1})$; the reference vertex 318 has coordinates $(X_{ref2}\ Y_{ref2}, Z_{ref2})$, and, $X_{ref2}>X_{vp}>X_{ref1}$, $Y_{vp}>Y_{ref1}$, and $Y_{vp}>Y_{ref2}$.

In view 330: the reference vertex 334 has coordinates $(X_{ref1}, Y_{ref1}, Z_{ref1})$; the reference vertex 338 has coordinates $(X_{ref2}\ Y_{ref2}, Z_{ref2})$, and, $X_{vp}<X_{ref1}$, $X_{vp}<X_{ref2}$, and $Y_{ref1}>Y_{vp}>Y_{ref2}$.

In view 350: the reference vertex 354 has coordinates $(X_{ref1}, Y_{ref1}, Z_{ref1})$; the reference vertex 358 has coordinates $(X_{ref2}\ Y_{ref2}, Z_{ref2})$, and, $X_{vp}>X_{ref1}$, $X_{vp}>X_{ref2}$, and $Y_{ref1}>Y_{vp}>Y_{ref2}$.

In view 370: the reference vertex 374 has coordinates $(X_{ref1}, Y_{ref1}, Z_{ref1})$; the reference vertex 378 has coordinates $(X_{ref2}\ Y_{ref2}, Z_{ref2})$, and, $X_{ref1}<X_{vp}<X_{ref2}, Y_{vp}<Y_{ref1}$, and $Y_{vp}<Y_{ref2}$.

In view 340: the reference vertex 342 has coordinates $(X_{ref1}, Y_{ref1}, Z_{ref1})$; the reference vertex 344 has coordinates $(X_{ref2}\ Y_{ref2}, Z_{ref2})$; the reference vertex 346 has coordinates $(X_{ref3}, Y_{ref3}, Z_{ref3})$; the reference vertex 348 has coordinates $(X_{ref4}, Y_{ref4}, Z_{ref4})$; and, $X_{ref2}>X_{vp}>X_{ref1}$, $X_{ref3}<X_{vp}<X_{ref4}$, $Y_{ref1}>Y_{vp}>Y_{ref3}$, $Y_{ref2}>Y_{vp}>Y_{ref4}$.

Accordingly, the viewpoint's position, relative to a rectangular cuboid, will determine the number and distribution of the rectangular cuboid's faces in the view that are visible. Conversely, bounds on the position of the viewpoint relative to a rectangular cuboid can be deduced from the number and distribution of the rectangular cuboid's faces in the view that are visible.

Views 302, 322, 360, and 380, have three visible faces. Views 310, 330, 350, and 370 have two visible faces. View 340 has one visible face.

Views 302, 322, 330, 350, 360, and 380, all show two sides. Views 302 and 322 also show the top, and views 360 and 380 also show the bottom. View 310 shows only one side and the top, and view 370 shows only one side and the bottom. The front-on view 340 shows exclusively one side.

The class designation for views 302, 322, 330, 350, 360, and 380 is 1S1S. The class designation for view 310 is 1S1T and for view 370 is 1S1B. Since classes 1S1T and 1S1B are mirror images of each other, for computational purposes, classes 1S1T and 1S1B can be treated equivalently. The class designation for view 340 is 1S0S.

A.1.1.1.3 Viewpoint Dependent Rectangular Cuboid Image Vertex Position

Figure 4:
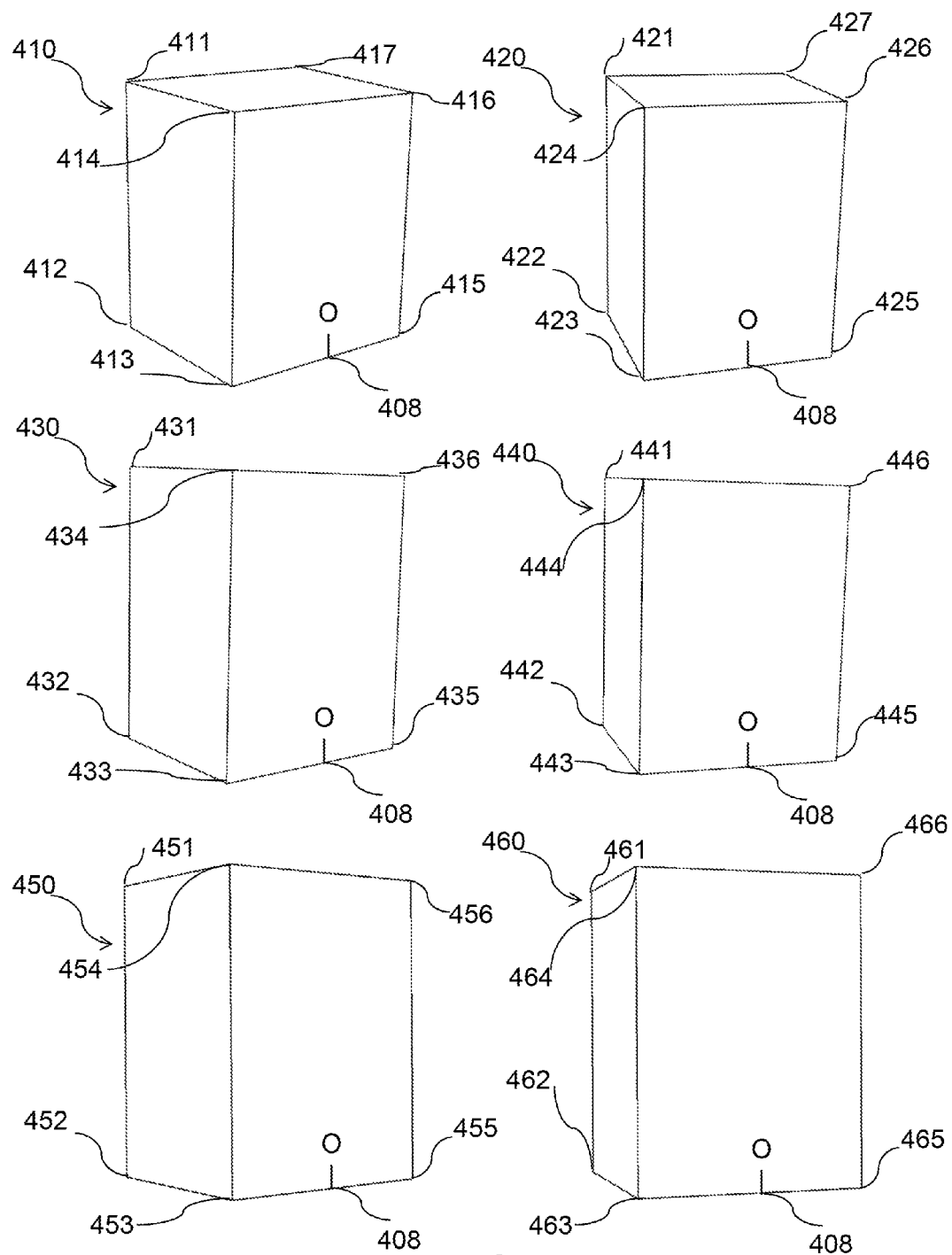
FIG. 4 shows two dimensional views of the theoretical rectangular cuboid 100 taken from six different viewpoints.

FIG. 4 shows two dimensional views, 410, 420, 430, 440, 450, and 460, of the theoretical rectangular cuboid 100 taken from six different viewpoints. The vertices of the views correspond to the vertices of the theoretical cuboid 100 depicted in FIG. 2 according to Table 1, which is shown in FIG. 5.

The cylindrical coordinate system 60 is used to describe the position of the object centric viewpoint. The coordinate system's origin, O, is located at the middle of a physical edge of the rectangular cuboid, e.g. at location 107 for the cuboid depicted in FIG. 2. In physical space, the x axis coincides with the edge bounded by vertices 106 and 114, which contains the reference point 107. The plane defined by the x axis and the y axis corresponds to the face bounded by vertices 106, 114, 116, and 108. Angle Θ is measured from the Z axis, which is orthogonal to the face bounded by vertices 106, 114, 116, and 108, and passes through the origin at 107.

In the two dimensional views of FIG. 4, the plane defined by 106, 114, 116, and 108, and the plane defined by vertices 102, 104, 106, and 108 correspond to the view of the face bounded by the corresponding view vertices as designated in Table 1. The origin of the cylindrical coordinate system, 107, is overlaid on the views for orientation purposes.

The distance D between the viewpoint and point 107 is constant for all of the views, i.e. $D_{410}=D_{420}=D_{430}=D_{440}=D_{450}=D_{460}$. For views 410, 430, and 450, 0 is greater than for views 420, 440, and 460, i.e., $\Theta_{410}=\Theta_{430}=\Theta_{450}>\Theta_{420}=\Theta_{440}=\Theta_{460}$, and the viewpoint elevation, $E_{vp}$, is the same for views 410 and 420, 430 and 440, and 450 and 460, i.e. $E_{410}=E_{420}, E_{430}=E_{440}, E_{450}=E_{460}$, and $E_{410}>E_{430}>E_{450}$ and $E_{420}>E_{440}>E_{460}$.

Viewpoint geometry factors that influence the two dimensional image distribution of a rectangular cuboid's vertices include parallax, distance, and the angle of view. These factors interact to determine the related relative positioning of the vertices of a rectangular cuboid, as well as the two dimensional appearance of any three dimensional object. Working with the geometry of a rectangular cuboid is advantageous for its relative simplicity. Mathematical methods can tap the natural rules of geometry to deduce the viewpoint from which an image of a rectangular cuboid is obtained. In this document we teach processes, means, and methods, that utilize this information about the viewpoint to match the photographic properties of images.

From a commercial perspective, working with a rectangular cuboid is particularly attractive because it's shape is the convention used to describe the size of commercial objects, which are designated by three variables: height, width, and depth, which define the enclosing rectangular cuboid of said objects. Thus, as taught here, with no need for deviation from commercial norms and common every day standards, the information needed to achieve photorealistic image augmentation is available.

A rectangular cuboid enclosing an object of any shape with a known juxtaposition to said object can be used to reduce the problem of finding the viewpoint of said object to that of finding the viewpoint relative to the enclosing rectangular cuboid, accordingly an infinite number of object shapes can be analyzed using the geometric relationships of a rectangular cuboid.

The parallax effect, shown in FIG. 6A, causes the apparent position of objects at different viewpoint distances to shift, when the viewpoint is moved laterally. When the viewpoint is at position 610, the tips of the arrow objects, 612 and 614, lie along a single chief ray, and would overlap in an image taken from viewpoint position 610. When the viewpoint is moved laterally to position 616, the tips of the arrow objects appear out of alignment. The tip 612 appears to be higher than tip 614. The magnitude of the apparent shift in position 611 can be calculated from the relationship $x=y*\sin \alpha$, where y is the length of the vector defined by points 616 and 613, x is the length of the perpendicular 611 between the vector 616-613 and the point 614, and a is the angle 615 formed by the vector 616-612 and the vector 616-614.

Image size is inversely related to the viewpoint distance. As the viewpoint distance from an object increases, the subtended angle decreases, and the image of the object becomes smaller. This geometric relationship is shown in FIG. 6B where two objects, 620 and 622, of equal physical size are at different distances from the viewpoint 618. Object 620 is closer to the viewpoint, 618, than object 622. Thus, angle 624 is larger than angle 626, causing the image of 620 to appear larger than the image of 622. The algebraic relationship is $s_1'/s_2'=d_2/d_1$, where $s_1'$ is the image size of 620, $s_2'$ is the image size of 622, $d_1$ is the distance between point 618 and 620, and $d_2$ is the distance between point 618 and the object 622.

The angle of view affects an object's image size according to the cosine of the viewpoint angle as measured from the perpendicular to the surface. This relationship is shown in FIG. 6C, where an object 634 is viewed from two different viewpoints, 630 and 632. The chief ray, 644, for viewpoint 630 is perpendicular to the surface and the chief ray, 642, for viewpoint 632 forms an angle 640 with the surface. Accordingly, the object's subtended angle 636 for viewpoint 630 is larger than the subtended angle 638 for viewpoint 632. The trigonometric relationship is $s_1'=s_2'*\cos\Theta$, where $s_1'$ is the image size at viewpoint 632, $s_2'$ is the image size at viewpoint 630, and $\Theta$ is the angle 640 that is formed by the chief rays 642 and 644.

These geometric relationships are apparent in the two dimensional images of FIG. 4, which represent two dimensional views of the rectangular cuboid 100 of FIG. 2. In all of the views shown in FIG. 4, the middle vertical edge bounded by vertices 106 and 108 is closer to the viewpoint than either vertical peripheral edge. The following example discussion utilizes the two dimensional coordinate system 70 and the cylindrical coordinate system 60.

Parallax: In views 430 and 440, the height of the viewpoint, $Y_{vp}$, equals $Y_{108}$, i.e. $Y_{vp}=Y_{108}$. Image vertices 431, 434, and 436 lie on a straight line and image vertices 441, 444, and 446, lie on a straight line. But, the Y coordinate of image vertex 433, $Y_{433}$, is greater than the Y coordinate of either image vertex 432, $Y_{432}$, or image vertex 435, $Y_{435}$, and the Y coordinate of image vertex 443, $Y_{443}$, is greater than the Y coordinate of either image vertex 442, $Y_{442}$, or image vertex 445, $Y_{445}$.

Distance: In views 450 and 460, the height of the viewpoint, $Y_{vp}$, equals half of $Y_{108}$, i.e. $Y_{vp}=0.5*Y_{108}$. The edge bounded by image vertices 106-108 is closer to the viewpoint then either edge 102-104 or edge 114-116. Thus: the length of the image edge, $L_{454-453}$, is greater than the length of the image edge, $L_{451-452}$, or the length of the image edge, $L_{455-456}$, the length of the image edge, $L_{464-463}$, is greater than the length of the image edge, $L_{461462}$, or the length of the image edge, $L_{465-466}$.

Viewpoint angle: In views 430 and 440 the length of the edge 108-116, $L_{108-116}$, corresponds to image edge length $L_{434-436}$ and image edge length $L_{444-446}$, respectively, and the length of the edge 102-108, $L_{102-108}$, corresponds to image edge length $L_{431-434}$ and image edge length $L_{441-444}$. The ratio of $L_{444-446}/L_{441-444}$ is greater than the ratio $L_{434-436}/L_{431-434}$ because the viewpoint angle, $\Theta_{vp}$, as measured from the perpendicular to edge 106-114 at the reference point 408, is greater for view 430 than for view 440.

Given the physical dimensions of a rectangular cuboid, and its appearance in a two dimensional image, these geometric relationships, which determine the imaged spatial distribution of the rectangular cuboid's vertices, and hence vertices-defined structures, can be used in software programs running on a computer to deduce the position of the viewpoint relative to the rectangular cuboid.

As is apparent from the sample images in FIG. 4, the viewpoint geometric relationships operate simultaneously on the appearance of an image of a rectangular cuboid. As presented below, analytical methods are applied that compensate for one effect when utilizing another to determine a viewpoint parameter. The degree to which a particular geometric factor influences the image position of a vertex of a rectangular cuboid changes with the viewpoint.

A.1.1.2 Methods for Obtaining the Object Centric Viewpoint of a Rectangular Cuboid Image

A.1.1.2.1 Object Centric Viewpoint

The object centric viewpoint describes a camera's position relative to an object. The cylindrical coordinate system 60, which is depicted in FIG. 1B, is convenient to use. In this document, the physical shape of an object is referenced to the enclosing rectangular cuboid of the object. The origin of the cylindrical coordinate system is assigned to a midpoint along one of the bottom most visible edges of the enclosing rectangular cuboid, e.g. edge 104-106 or edge 106-114 for the rectangular cuboid 100. Other reference points and conventions could be used without affecting the essence of the methods taught here.

A.1.1.2.2 Example First Method for Determining the Object Centric Viewpoint An example embodiment of the first method for determining the object centric viewpoint is taught here. In this description of this example embodiment of the first method for determining the object centric viewpoint, two spaces are referenced—physical space, which has three dimensions, and image space, which has two dimensions. Table 2 of FIG. 7A shows the correspondence between the relative positions of the physical vertices, 102, 104, 106, 108, 114, and 116, of the rectangular cuboid 100 and their corresponding image vertices K, L, C, D, A, and B, respectively.

FIG. 7B shows a flow diagram, 705, for a first software algorithm for finding the object centric viewpoint of an enclosing rectangular cuboid, where said first software algorithm for finding the object centric viewpoint of an enclosing rectangular cuboid runs on a computer. Input, 710, consists of the image space vertices coordinates that correspond to two adjacent sides of a rectangular cuboid and the rectangular cuboid's physical dimensions: height, $H=L_{102-104}$, width, $W=L_{106-114}$, and depth, $D=L_{104-106}$.

In step 714, the algorithm calculates the pixel length, in image space, of the rectangular cuboid's vertical edges, $L_{A-B}$, $L_{C-D}$, and $L_{L-K}$. In step 718, edges L-K, C-D, and A-B, are then fit with linear equations. Step 722 provides a correction for the interplay of the viewpoint geometric relationships that would alter the area effect of the angle of view on the apparent areas of each of the sides. In step 722, the slopes of the edges L-K, C-D, and A-B, are averaged and the so defined vectors rotated around the midpoint of each of the image edges L-K, C-D, and A-B. In step 726 these modified vectors are used to calculate the image area corresponding to side CDAB, $A_{CDAB}$, and the image area corresponding to side KLCD, $A_{KLCD}$. The so calculated areas are then used in step 730 to calculate the viewpoint angle $\Theta_{vp}'$, where, $$\Theta_{vp}'=90-a\tan((D/W)*(A_{CDAB}/A_{KLCD}))$$

$\Theta_{vp}'$ is referenced to the vertex 106, the origin used in steps 734, 738, and 742.

In step 734, $\Theta_{vp}'$ is used to calculate the separations along the Z' axis between the pairs of vertices 108 and 102, 108 and 116, 106 and 104, and 106 and 114. In step 738, vectors are fit to these pairs of projected vertices, C'L', D'K', C'A', and D'B', as projected onto the Y', Z' plane. Utilizing parallax geometry, the intersection of the vectors defined by C'L' and D'K' is found and the intersection of the vectors defined by C'A' and D'B' is found. The intersection of each vector pair approximates the location of the object centric viewpoint, and serves as a basis for a later redundancy check on the results.

In step 742 the origin for the viewpoint angle, $\Theta_{vp}'$, which is referenced to the vertex 106, is transposed to a reference point that is positioned in the middle of the edge bounded by vertices 104-106 or in the middle of the edge bounded by vertices 106-114. The particular edge that is selected corresponds to the edge for which the absolute value of $\Theta_{vp}$ is smallest. Should the absolute value of $\Theta_{vp}$ be the same for both edges, then the edge bounded by vertices 106-114 is used as the default edge.

In step 746 the calculated object centric viewpoint coordinates: distance, $D_{vp}$, angle, $\Theta_{vp}$, and height, $H_{vp}$, are checked for redundant continuity. If the redundancy test is passed, the image resolution at the origin of the object centric viewpoint coordinate system and the vanishing point of the associated rectangular cuboid side are calculated and stored in a data base in step 750 along with the origin coordinates, otherwise an error message is displayed in step 754 that refers the user to help information. In step 758 the object centric viewpoint coordinates $D_{vp}$, $\Theta_{vp}$, $H_{vp}$ are reported.

A.1.1.3 Means for Locating the Object Centric Viewpoint Origin, Associated Side Image Space Vanishing Point, and Image Resolution at the Origin

A.1.1.3.1 Example Method for Finding the Vanishing Point

An example embodiment of a method for finding the vanishing point is taught here. As shown in FIG. 8: The vanishing point 818 of the side DBAC of the image of a rectangular cuboid is defined by the intersection of vectors 814 and 810, which are fit to image vertex pairs DB and CA, respectively. The vanishing point 830 of the side KDCL of the image of a rectangular cuboid is defined by the intersection of vectors 826 and 822, which are fit to image vertex pairs DK and CL, respectively. The vanishing point associated with the side of the rectangular cuboid that is host to the object centric viewpoint origin is used in image processing to facilitate photorealistic image augmentation.

A.1.1.3.2 Method for Finding the Object Centric Viewpoint Origin

An example embodiment of a method for finding the object centric viewpoint origin is taught here. The object centric viewpoint origin is concomitant with the physical space midpoint of the bottom edge of the relevant side of the enclosing rectangular cuboid as described above.

When the origin falls along the edge CA: The image space x-coordinate, $X_{ACvpo}$, of the object centric viewpoint origin is calculated as follows:

$$X_{ACvpo}=CX+(L_{AC}-((L_{AC}/(L_{CD}/L_{AB})+1))*abs(\cos(a\tan(b_{AC})))),$$

where CX is the x coordinate of the C vertex, $L_{AC}$ is the length of the edge bounded by the vertices C and A, $L_{CD}$ is the length of the edge bounded by the vertices C and D, $L_{AB}$ is the length of the edge bounded by vertices A and B, and $b_{AC}$ is the slope of the vector fit to vertices A and C.

And, the image space y-coordinate, $Y_{ACvpo}$, of the object centric viewpoint origin is calculated as follows:

$$Y_{ACvpo}=CY+(b_{AC}*abs((X_{ACvpo}-CX))),$$

where CY is the y coordinate of the C vertex.

When the origin falls along the edge CL: The image space x-coordinate, $X_{CLvpo}$, of the object centric viewpoint origin is calculated as follows:

$$X_{CLvpo}=CX+(L_{CL}-((L_{CL}/(L_{CD}/L_{LK})+1))*abs(\cos(a\tan(b_{CL})))),$$

where $L_{CL}$ is the length of the edge bounded by the vertices C and L, $L_{LK}$ is the length of the edge bounded by vertices L and K, and $b_{CL}$ is the slope of the vector fit to vertices C and L.

And, the image space y-coordinate, $Y_{CLvpo}$, of the object centric viewpoint origin is calculated as follows:

$$Y_{CLvpo}=CY+(b_{CL}*abs((X_{CLvpo}-CX))).$$

A.1.1.3.3 Method for Finding the Image Resolution at the Object Centric Viewpoint Origin An example embodiment of a method for finding the image resolution at the object centric viewpoint origin is taught here. FIG. 9 is used to demonstrate a method for finding the image resolution at the object centric viewpoint origin. FIG. 9 shows the construction for defining an image reference vector, 910, for a sample image of a rectangular cuboid with the object centric viewpoint origin located on the edge bounded by vertices A and C. Vector 910 is bounded by the object centric viewpoint origin, 914, and the image point, 918, which corresponds to the physical midpoint of the edge bounded by vertices B and D. The image space coordinates of point 914 are designated as $X_{ACvpo}$, $Y_{ACvpo}$, and the image space coordinates of point 918 are designated as $X_{BDvpo}$, $Y_{BDvpo}$.

An analogous construction would apply for an image of a rectangular cuboid with the object centric viewpoint origin located on the edge bounded by vertices C and L; the corresponding coordinates are $X_{CLvpo}$, $Y_{CLvpo}$ and $X_{DKvpo}$, $Y_{DKvpo}$, for the origin and opposing edge respectively.

The midpoint coordinates are found using the following equations:

$$X_{BDvpo}=DX+(L_{BD}-((L_{BD}/((L_{CD}/L_{AB})+1))*abs(\cos(a\tan(b_{BD})))$$

$$Y_{BDvpo}=DY+(b_{BD}*abs((X_{BDvpo}-DX))),$$

where DX is the x coordinate of the D vertex, $L_{BD}$ is the length of the edge bounded by the vertices B and D, $b_{BD}$ is the slope of the vector fit to vertices B and D, and DY is the y coordinate of the D vertex. And, $$X_{DKvpo}=DX+(L_{DK}-((L_{DK}/((L_{CD}/L_{LK})+1))*abs(\cos(a\tan(b_{DK})))),$$

$$Y_{DKvpo}=DY+(b_{DK}*abs((X_{DKvpo}-DX))),$$

where $L_{DK}$ is the length of the edge bounded by the vertices D and K, $b_{DK}$ is the slope of the vector fit to vertices D and K, and DY is the y coordinae of the D vertex.

Given the bounding coordinates, the length of the vector 910, $L_{910}$, is calculated and the image resolution at the view point, $R_{vp}$, is calculated using:

$$R_{vp}=L_{910}/H,$$

where H is the physical height of the rectangular cuboid.

A.1.1.4 Methods for Finding the Object Centric Viewpoint, its Origin Coordinates, the Image Resolution at the Origin, and the Vanishing Point of the Host Rectangular Cuboid Face for Image Classes 1S1T and 1S1B

A.1.1.4.1 First Embodiment of the Method for Finding the Object Centric Viewpoint, its Origin Coordinates, the Image Resolution at the Origin, and the Vanishing Point of the Host Rectangular Cuboid Face for Image Classes 1S1T and 1S1B An example first embodiment of the method for finding the object centric viewpoint, its origin coordinates, the image resolution at the origin, and the vanishing point of the host rectangular cuboid face for image classes 1S1T and 1S1B is taught here.

It can be seen in FIG. 10 that a class 1S1T image, 1010, can be made equivalent to a class 1S1S rectangular cuboid image, 1030, by rotating the image by 90 degrees, 1015, using mathematical coordinate transformation methods known to those skilled in the art. FIG. 10 also shows that a class 1S1B image, 1020, can be made equivalent to a class 1S1S rectangular cuboid image, 1030, by rotating the image by 90 degrees, 1025. The direction of rotation can be either clockwise or counterclockwise.

The methods taught by the first software algorithm 705 describe a solution for finding the object centric viewpoint and the corresponding image coordinates of its origin for class 1S1S images. Following application of the mathematical coordinate transformation methods that equate class 1S1B or class 1S1T views to class 1S1S views to the coordinates of the enclosing rectangular cuboid vertices, first software algorithm methods can be used to find the object centric viewpoint in the transformed space and the corresponding image coordinates of its origin in the transformed space. After finding the object centric viewpoint parameters in transformed space using the methods delineated in steps 710-746 of the first software algorithm 705, the object centric viewpoint parameters and the image space coordinates for the vertices of the enclosing rectangular cuboid are transformed back to their original orientation, arrow 1017 for 1S1T class images and arrow 1027 for 1S1B class images. The software methods of step 750, of the first software algorithm are then used to delineate the object centric viewpoint parameters, the corresponding image coordinates of its origin, the vanishing point for the side associated with the origin, and the image resolution at the origin.

A.1.1.4.2 Second Embodiment of the Method for Finding the Object Centric Viewpoint for Image Classes 1S1T and 1S1B An example second embodiment of the method for finding the object centric viewpoint, and its origin coordinates, for image classes 1S1T and 1S1B is taught here.

FIG. 41B shows a predetermined image of an object. Side to side symmetry in the image of the object and the enclosing rectangular cuboid requires that the object centric viewpoint angle is zero. Because the object centric viewpoint angle is zero, the geometric relations can be reduced to two dimensions as shown in FIG. 41C.

FIG. 41C shows a construction drawing for an example second embodiment of class 1S1T and 1S1B object centric viewpoint and image properties solution. Drawing 4122 shows the graphical analysis of object centric viewpoint geometry for finding the object centric viewpoint of the enclosing rectangular cuboid for an object image when the object centric viewpoint angle is zero. In this construction, a chair structure is separated into two adjacent enclosing rectangular cuboids, and the lower enclosing rectangular cuboid is utilized for demonstrating the solution for finding the object centric viewpoint height, H, and distance, D. The associated identities and mathematical relationships follow:

H=Height of Camera above floor
D=Distance of Camera from object
z=Physical Depth of first object feature
z'=Physical depth of second object feature
h=Physical height of first object feature
h'=Physical height of second object feature
e=depth dependent change in the elevation perspective of the first object feature
e'=depth dependent change in the elevation perspective of the second object feature
a=angle formed by the camera chief ray L and the plane of the floor
a'=angle formed by the camera chief ray L' and the plane of the floor
(D,H)=intersection of chief ray L and chief ray L'
Equation of chief ray L: Y=h+bx where b=tan(a) and angle a=arcsin(e/z), thus, b=tan(arcsin(e/z)). For floor based features Y=bx.
Equation of chief ray L': Y'=h'+b'x where b'=tan(a') and angle a'=arcsin(e'/z'), thus, b'=tan(arcsin(e'/z')).
Solving for the intersection of L and L':

$$D=(h-h')/(b'-b)=(h-h')/(\tan(\arcsin(e'/z'))-\tan(\arcsin(e/z)))$$

$$H=h+bD \text{ or } H=h'+b'D$$

A.1.1.5 Methods for Finding the Viewpoint and Image Properties of Image Class 1S0S Class 1S0S views have only one visible side. In practice, however, the bounding vertices of one or more additional sides, although "hidden" by the theoretical rectangular cuboid, may be known. This is shown in FIG. 11, where hidden vertices 1130, 1135, 1140, and 1145 are drawn in addition to vertices 1110, 1115, 1120, and 1125.

The geometric relations discussed above can be applied to "hidden" features in the same way that they are applied to visible features to find the object centric viewpoint and spatial properties of a rectangular cuboid.

A.1.1.6 Method for Defining the Enclosing Rectangular Cuboid of an Object

An example first embodiment of the method for defining the enclosing rectangular cuboid of an object is taught here.

FIG. 12 shows screen shots, 1212, 1222, and 1232, of an example of a first embodiment of a computer user interface for defining vertices of the enclosing rectangular cuboid of an object using a predetermined two dimensional image, 1205, of the object. The predetermined image of the object 1205 is displayed on a computer screen controlled by a computer. The computer screen can be any type of computer display device, including a monitor, tablet, or smartphone.

In this first embodiment, each vertex is defined by the point of intersection of lines corresponding to the edges of a rectangular cuboid. A display of seven intersecting lines, 1210, 1220, 1230, 1240, 1250, 1260, and 1270, which represent the edges of two adjacent sides of a rectangular cuboid, is initially overlaid on the predetermined image of the object 1205 as shown in screen shot 1212. The initial arrangement of the lines may be independent of the image of the object, or the arrangement of the lines may be determined by a first image analysis software program running on a computer that extracts features of the predetermined image of the object and arranges the lines to match or approximate the enclosing rectangular cuboid.

In the computer user interface, means are provided that enable the user to rearrange the six intersections of the lines, 1215, 1225, 1235, 1245, 1255, and 1265, which correspond to the vertices of a rectangular cuboid. For computational purposes, only the positions of the vertices are needed, and for computational purposes the lines connecting the vertices are optional. Therefore, the interface could consist of just graphical points designated by a shape, e.g. a circle, representative of the vertices of the enclosing rectangular cuboid.

The intersecting lines that form the vertices act as an aid to the user in imagining the shape of the enclosing rectangular cuboid, and, thus, to positioning the vertices. A common method for moving the vertices around for displays associated with computers that have pointing devices, e.g. a mouse, touch pad, track ball, or drawing pad, is to use drag and drop program algorithms. To assist the user in identifying the intersections and to provide an indication of where to position the pointing device in order to move a particular intersection, the intersections can be surrounded by a unique shape such as a circle.

On touch screen devices such as tablet computers and smart phones, on-screen controls could be provided that would enable the user to move the vertices around without impeding the visualization of their position in the display. Multiple controls could be provided corresponding to each line intersection, or the user could activate one of the six intersections by, for example touching the screen at the location of the intersection, and using on-screen touch controls or hardware switches, e.g. volume controls, to move the selected line intersection to the desired position.

The user is instructed to form the lines into the shape corresponding to the enclosing rectangular cuboid of the object shown in the predetermined image. Screen shot 1222 shows that the enclosing rectangular cuboid vertices 1235 and 1245 have been positioned at the feet of the object 1205.

In screen shot 1232, the enclosing rectangular cuboid is defined. Now, the positions of the six intersections of the lines, 1215, 1225, 1235, 1245, 1255, and 1265, correspond to the positions of the vertices of the enclosing rectangular cuboid of the object pictured in the image.

When the user has adjusted the positions of the line intersections, he/she so indicates to the computer by an action such as clicking a button, pressing a key on the keyboard, or any other means of communication provided by the computer.

The dimensions for the enclosing rectangular cuboid are entered using an embodiment of a dimensioning computer user interface means. An embodiment of the dimensioning computer user interface means includes text boxes associated with lines corresponding to mutually perpendicular edges of the enclosing rectangular cuboid. A representative embodiment of the dimensioning computer user interface means is shown in FIG. 13 by screen shot 1312. The position of the intersecting lines correspond to the enclosing rectangular cuboid for the object of the image and the dimensions, width, 1330, depth, 1320, and height, 1340, are entered into the text boxes associated with these edges of the enclosing rectangular cuboid. The units are designated by any convenient user interface method. In the embodiment shown in screen shot 1312, the units are entered via a list box 1350.

After the user enters the data, a signal is sent to the computer by the user to store and process the data. The signal may be generated by an action such as clicking a button, pressing a key on the keyboard, or any other means of communication provided by the computer interface. In screen shot 1312, the signal is generated by the user clicking on a button 1360.

The augmentation process can be shared between users by transmitting images and associated data over the internet. Accordingly, expert users can assist novice users in creating augmented images, without the novice user learning how to define the enclosing rectangular cuboid of an object image.

A.1.2 Second Embodiment of the Means for Obtaining Photographic Parameters from a Preexisting Image An example of a second embodiment of the means for obtaining photographic parameters from a preexisting image is taught here.

In a second embodiment of the means for obtaining photographic parameters from a preexisting image the photographic parameters: the object centric viewpoint parameters, the position within the picture of a predefined location for the origin of the viewpoint coordinate system, the resolution of the image at the viewpoint coordinate system origin, and the vanishing point of the side of the enclosing rectangular cuboid hosting the viewpoint coordinate system origin are associated with the image file. Said photographic parameters are available to the originator of the image, and can be associated with the image data file, e.g. as metadata.

The availability of the photographic parameters of the predetermined object image in this manner would obviate the need for using the first means for obtaining photographic parameters from a preexisting image. Images posted on the internet could be downloaded with the attached photographic parameter data and utilized for image acquisition and augmentation.

Natural shadow or synthesized shadow image data can be associated with each object image.

A.2 Example Method and Means for Positioning a Camera

An example of an embodiment of a method and means for positioning a camera is taught here. To augment an image of a locale with a predetermined image of an object, the camera is positioned at the object centric viewpoint relative to a location within the locale that the object is to be visualized. A computer viewpoint parameter output means provides the user with the object centric viewpoint parameters, which delineate where to position the camera.

A.2.1 Example Viewpoint Guide Embodiments

An example first embodiment of the computer viewpoint parameter output means is shown in FIG. 14A. In this embodiment, a positioning guide, 1410, is employed to position a camera within a locale that, for a first location within the locale, coincides with the object centric viewpoint of the image of the object to be placed at said first location.

Embodiment 1410 of the positioning guide contains a first positioning line, 1430, that is drawn at the object centric viewpoint angle $\Theta_{vp}$ relative to the z-axis (The z-axis is not visible in the positioning guide. The z axis runs perpendicular to the x-axis positioning line 1445.), at the guide origin, 1435. The object centric viewpoint distance, 1420, height, 1422, and angle, 1426, are printed on the positioning guide. An orientation line, 1445, that is parallel to the x-axis of the object centric coordinate system, is drawn through the guide origin 1435. Instructions, 1450, explain how to use the guide to capture a picture of a region of the locale that is at the specified object centric viewpoint.

A picture, 1425, of the predetermined image corresponding to the object centric viewpoint parameters is imprinted on the positioning guide along with the file name, 1415, of the predetermined image to assist the user with associating the particular camera position with the predetermined image. A line, 1428, that corresponds to the edge of the enclosing rectangular cuboid containing the origin of the object centric viewpoint is drawn in association with the image of the object. Positioned along the line is a representation of a fiducial mark, 1427. The fiducial mark, which provides a means for equating the image properties of an image of the locale with the image properties of the predetermined image, is discussed below.

A second example embodiment of the positioning guide, 1460, is shown in FIG. 14B. All of the features of the first embodiment are included in the second embodiment. In addition, in the second embodiment of the positioning guide: a second positioning line, 1440, is drawn in a distinctive line pattern or color at the complementary object centric viewpoint angle, $-\Theta_{vp}$, and there is a flipped image of the image object, 1464, the bottom edge of the enclosing rectangular cuboid, 1468, and the representation of the fiducial mark, 1466. The camera lens nodal point is positioned along the vector extension of the second positioning line 1440 at the specified distance 1420 and specified elevation 1422. The second positioning line, 1440, is used when the user would like to view a symmetrical object within the locale from the complementary direction. When the camera is positioned along the second vector extension of the second positioning line, the image of the object is flipped horizontally, using image editing software, before using the image of the object to augment the image of the locale. The second embodiment of the positioning guide provides a user convenience feature, as the same result could be obtained by horizontally flipping the image of the object, prior to using the computer user interface for defining the enclosing rectangular cuboid of the object.

A third example embodiment of the positioning guide, 1470, is shown in FIG. 14C. In embodiment 1470, an angular array of positioning lines for positive viewpoint angles 1474 and for negative viewpoint angles 1478 is shown radiating from the origin 1435. The orientation line, 1445, which contains the origin, is placed within the locale so as to align with the bottom edge of the enclosing rectangular cuboid. When using positioning guide embodiment 1470, the viewpoint parameters: angle, distance, and elevation are provided in a separate computer output 1480 such as a printed table or list, as indicated by embodiment 1480.

A.3 Method and Means for Calibrating a Locale Picture

A method and means for calibration a locale image is used to quantify the locale image properties that can be equated to object image properties.

An example embodiment of a means for calibrating a locale image includes use of a fiducial mark embodiment. The fiducial mark embodiment is used to provide a basis for equating a plane within the locale picture with a plane corresponding to one of the faces of the enclosing rectangular cuboid. The fiducial mark facilitates computer image analysis of locale pictures. Calculated data derived from the appearance of the image of the fiducial mark include: the vanishing point of the locale image in the plane of the fiducial mark, the resolution of the locale image at identifiable points, the coordinates within the locale picture that correspond to the origin of the object centric viewpoint, and a white balance reference. The spatial image properties, including the vanishing point, resolution, and image coordinates, are derived from the known physical distribution of fiducial mark features and the distribution within the locale image of said corresponding fiducial mark features.

More than one fiducial mark can be placed within a scene at a time. Each fiducial mark location and orientation corresponds to an object image's object centric viewpoint, with the fiducial mark placed in a known relationship to the origin of the object centric viewpoint. In subsequent image augmentation processing, the locale image is paired with an object image for each fiducial mark.

A preferred distribution of features includes four points arranged according to the vertices of a rectangle. A first fiducial mark embodiment, 1510, is shown in FIG. 15A. The first fiducial mark embodiment has four vertices, 1512, 1514, 1516, and 1518, which correspond to the outer corners of a black rectangle having outer edges, 1522, 1524, 1526, and 1528, and inner edges, 1532, 1534, 1536, and 1538. The pattern is printed in high contrast on white paper. A high contrast pattern assists with visualizing the location of the vertices as does the fact that the location of the vertices can be determined from the intersection of adjacent sides of the rectangle.

First fiducial mark embodiment 1510 also incorporates a black circle bounded by an inner circle edge, 1544, an outer circle edge, 1542, that are centered on the center of the surrounding rectangle. A circle is a preferred embodiment for a fiducial mark since the effect of angular viewing on the appearance of the circle is to distort the circle into an approximate ellipse. The orientation of the axes and the ratio of the major and minor axes of the approximate ellipse can be used to ascertain the angle of view using mathematical relationships known to those skilled in the art. This information can be used in conjunction with the concomitant distortion in the image position of the vertices to support continuity checking when extracting the position of features of the fiducial mark.

The preferred size of a fiducial mark varies with its use. Accordingly, it is preferable for the fiducial mark to have markings that serve to distinguish one set of parameters from another. Preferably these markings will be both computer vision readable and human vision readable markings.

Fiducial mark embodiments 1510, 1530, and 1550 have markings that can be used to associate fiducial mark dimensions with a particular embodiment. In second fiducial mark embodiment 1530, the marking consists of a black square element, 1535, that is contiguous with the inner edges 1534 and 1536 of the rectangle. In third fiducial mark embodiment 1550, the marking consists of two black square elements. Element, 1535, is contiguous with the inner edges 1534 and 1536, and element 1555 is contiguous with the inner edges 1538 and 1536 of the rectangle. The absence of a marking in first fiducial mark embodiment 1510 serves the same purpose as the number and distribution of markings, when present. The number and distribution of the identity markings can be varied in order to accommodate a large number of fiducial mark parameter sets.

The dimensions of the fiducial mark corresponding to a particular embodiment are stored in a computer data base or otherwise made available to a means of analyzing the fiducial mark image, where an example embodiment of said means is a fiducial mark analysis program running on a computer that quantifies an image based on the appearance of the fiducial mark image.

A.4 Example Process for Acquiring a Locale Picture

An example embodiment of the process for acquiring a locale picture is taught here.

The computer viewpoint parameter output means in the form of a positioning guide embodiment is placed at a first location within the locale at which the user wishes to view the predetermined image of the object of interest. For example, when using positioning guide embodiment 1460, the orientation line 1445 is placed within the locale in alignment with the x-axis of the object centric viewpoint coordinate system, which corresponds to a designated edge of the object's enclosing rectangular cuboid, as related in the positioning guide by element 1428. As shown in FIG. 17, which depicts the orientation of a camera, 1712, within a locale using the positioning guide 1615, the camera lens nodal point is positioned along the vector extension of the first positioning line 1430 at the specified distance, D, 1420, and specified height, H, 1422.

FIG. 16 shows a picture, 1610, of an embodiment of the positioning guide, 1615, and an embodiment of a fiducial mark, 1620, positioned for facilitating the acquisition of an image of the locale. The fiducial mark is placed within the scene in a known orientation to the positioning guide. As shown in FIG. 16, a preferable orientation for the fiducial mark is orthogonal to the positioning guide with the bottom edge of the material, upon which the fiducial mark is printed, aligned with the positioning guide's x-axis positioning line 1445. A center indicator, 1625, on the fiducial mark is preferably aligned with the origin of the object centric viewpoint coordinate system, 1435, as designated on the positioning guide.

FIG. 17 shows the positioning of the fiducial mark, 1620, the positioning guide, 1615, and the camera, 1712, when taking a picture of a locale. After positioning the camera, the positioning guide is preferably removed from the scene prior to snapping a first locale picture. Removing the positioning guide simplifies image augmentation procedures and enhances the photorealism of an augmented image. Removing the fiducial mark from the scene prior to taking a second locale picture, under the same imaging conditions, will enhance the photorealism of an augmented image. As discussed below, quantitative information obtained via the fiducial mark analysis program from the first locale picture is applied to the second locale picture, when augmenting the second locale picture.

A fiducial mark locating means either in the form of a fiducial mark denoting graphical user interface run on a computer display device or in the form of a computer fiducial mark image analysis program is utilized for expediting the extraction of spatial and colorimetric data from an image of the fiducial mark.

Screen shots 1810 and 1830 shown in FIG. 18A show the use of a first fiducial mark locating means embodiment. This first fiducial mark locating means embodiment utilizes a fiducial mark denoting graphical user interface. The interface presents the user with the first locale picture, 1805, which contains an image of the fiducial mark, 1820, and a display of four graphical points, 1812, 1814, 1816, and 1818, that are demarcated with surrounding regions showing where the points are located and the region of the screen associating a pointing device control region with each graphical point. The points may optionally be connected by lines for visualization and orientation purposes. The initial arrangement of the graphical points may be independent of the local image, or it may be determined by an automated image analysis of the first locale picture and in particular the location and dimensions of the fiducial mark and its pattern.

Means are provided in the user interface that enable the user to rearrange the graphical points so that their positions correspond to the coordinates associated with specified features on the fiducial mark. In this embodiment the features correspond to the vertices 1822, 1824, 1826, and 1828, of the image of the fiducial mark 1820. For computational purposes only the positions of the vertices are needed. The lines connecting the graphical points aid the user in positioning the graphical points on the vertices. A common method for moving the graphical points around for displays associated with computers that have pointing devices, e.g. a mouse, touch pad, ball, or drawing pad, is to use drag and drop program algorithms.

On touch screen devices such as tablet computers and smart phones, on-screen or hardware controls are provided that enable the user to move the graphical points on the screen without obstructing the view of their position in the display. Multiple controls could be provided corresponding to each graphical point, or the user could activate a specific graphical point by, for example, touching the screen at the location of the graphical point, and using on-screen touch controls or hardware switches, e.g. volume controls, to move the selected line intersection to the desired position.

Screen shot 1830 shows the appearance of the screen after the user has positioned the graphical points 1812, 1814, 1816, and 1818 on the vertices of the image of the fiducial mark. Accuracy of placement of the graphical points can be increased by providing zoom controls to increase the display area associated with the image of the fiducial mark.

After the graphical points are positioned, the user sends a signal to the computer, which stores the coordinates for input into software running on a computer.

Screen shots 1850 and 1870 shown in FIG. 18B show the use of a second embodiment of said fiducial mark locating means. This second embodiment of the fiducial mark locating means provides a graphical user interface that enables the user to specify a starting point for an image analysis of the image of the fiducial mark. The first locale picture, 1845, is presented on the display device along with a graphical point that is surrounded by an active region designated by a symbol, 1852. The graphical point and associated symbol can be positioned by the user using a computer pointing interface device. In a first configuration, the graphical point is positioned with a drag and drop interface. In a second configuration, appropriate to touch screen devices such as tablet computers and smart phones, on-screen controls or hardware controls are provided that enable the user to move the graphical point on the screen without obscuring the user's view.

The initial position of the graphical point may be independent of the picture, or it may be determined by computer image analysis of the first locale picture and in particular the location of the image of the fiducial mark. The user is instructed to position the graphical point and associated symbol 1852 in a specified region of the image of the fiducial mark 1854, e.g. within the circle region of the image of the fiducial mark, as shown in screen shot 1870.

After the graphical point is positioned, the user sends a signal to the computer, which stores the coordinates for input into a second image analysis software program running on a computer that extracts features of the image of the fiducial mark. The second image analysis software program uses methods known to those skilled in the art to extract the image coordinates corresponding to salient features of the fiducial mark. As an example, for fiducial mark embodiment 1510, salient image fiducial mark features include the image coordinates corresponding to the center of the circle 1544, and the four vertices, 1512, 1514, 1516, and 1518.

Redundant paths to calculating image fiducial mark features support error checking in the second image analysis software program. For example, using embodiment 1510 of the fiducial mark, the center of the circle can be determined from the locus of image points corresponding to the inner edge of the circle 1544, the locus of image points corresponding to the outer edge of the circle 1542, the intersection of the diagonal vector defined by vertices 1512 and 1516 and the diagonal vector defined by vertices 1514 and 1518. When the coordinates for the center of the circle determined by all of these methods coincide, the accuracy of the calculation based on the feature extraction performed by the second image analysis software program is confirmed.

When the coordinates for the center of the circle determined by all of these methods do not coincide by some predetermined amount the user receives an error message. Optionally, the user is presented with a different user interface for denoting the salient features of the fiducial mark such as the first embodiment of the first fiducial mark locating means as shown in screen shots 1810 and 1830, which does not necessarily rely on automated image analysis software for salient fiducial mark image feature extraction.

A fiducial mark analysis program, using the geometric relationships of the salient fiducial mark image features and the known physical dimensions of the fiducial mark features, calculates the image space coordinates of the origin of the object centric viewpoint, the resolution of the image at known locations, and the vanishing point of the fiducial mark image.

FIG. 19 shows a fourth fiducial mark embodiment, 1910. This fourth fiducial mark embodiment has four vertices, 1512, 1514, 1516, and 1518, which correspond to the corners of a rectangle. The pattern is printed in high contrast on white paper. The fourth fiducial mark embodiment 1910 also incorporates a black circle bounded by an inner circle edge, 1544, an outer circle edge, 1542, that are centered on the center of the vertices 1512, 1514, 1516, and 1518.

An image, 2010, of the fourth fiducial mark embodiment is shown in FIG. 20A. The construction lines demonstrate calculations made by the fiducial mark analysis program. Input to the program consists of the image space coordinates of the points 2012, 2014, 2016, and 2018, which correspond to the four vertices, 1512, 1514, 1516, and 1518, respectively, and the physical dimensions of the fiducial mark embodiment for the four vertices referenced to a specified point on the fiducial mark, which in use corresponds to the origin of the object centric viewpoint. The midpoint of the bottom edge of the printed page, 1625, can serve as a reference point, which has a corresponding image point 2026. The image space coordinates of image point 2026 are calculated from the image resolution of the vector extending between image point 2022 and image point 2024 and the known physical separation between the bottom edge of the material on which the fiducial mark is printed and the placement of element 1526 on the sheet of material. Image point 2022 corresponds to the midpoint of the fiducial mark's outer edge 1522 and image point 2026 corresponds to the midpoint of the fiducial mark's outer edge 1526. The resolution of the image at image point 2026 is calculated from the pixel length of the vector bounded by image point 2022 and image point 2024 and the known physical separation between outer edge 1522 and outer edge 1526.

Also shown in FIG. 20A are construction lines demonstrating different ways in which to find the center of the fiducial mark. Line 2032 is defined by the coordinates of image point 2012 and image point 2016. Line 2034 is defined by the coordinates of image point 2018 and image point 2014. The intersection of line 2032 and line 2034 corresponds to the center of the fiducial mark.

Line 2036 is an axis of the image ellipse that corresponds to the fiducial mark circle. Line 2038 is the other axis of the image ellipse that corresponds to the fiducial mark circle. The axes of the ellipse intersect at a point that corresponds to the center of the fiducial mark. Optionally, the orientation and ratio of the axes can be used to confirm that the image of the fiducial mark was obtained from a direction that is consistent with a specified viewpoint.

FIG. 20B shows an image, 2050, of the fourth fiducial mark embodiment. The image space coordinates of the points 2052, 2054, 2056, and 2058, correspond to the four vertices, 1512, 1514, 1516, and 1518. Vector 2062 is defined by image points 2052 and 2054. Vector 2064 is defined by image points 2058 and 2056. The intersection, 2066, of vectors 2062 and 2064 is the vanishing point of the fiducial mark image. Vector 2070 connects the vanishing point with the center of the fiducial mark. The slope of the vector 2070 provides a reference for the tilt of the image.

The white region of the fiducial mark provides a colorimetric reference to adjust the white balance of either the picture of the object or the picture of the locale so that the two images have matching colorimetric properties.

After a first locale image is obtained with the fiducial mark in place, optionally a second matching locale image is obtained under the identical imaging conditions. The spatial and colorimetric analyses described above are performed on the first locale image utilizing the fiducial mark image. Then, the second matching locale image is processed as indicated by the image analysis of the first locale image so as to match the image of the object that is being utilized to create the augmented image.

An optional viewpoint parameter assignment user interface enables the user to delineate the viewpoint parameters used to acquire the locale images. The association of the object centric viewpoint parameters with a locale image, both enables filtering of images when pairing object images with locale images, and provides a basis for error checking image pairing.

FIG. 21A shows a first embodiment, 2130, of the optional viewpoint parameter assignment user interface. Embodiment 2130 provides four input means, 2132, 2134, 2136, and 2138, in which the user can designate values for the three viewpoint parameter variables, D, $\Theta$, H, and their units, with a concomitant display of the locale image, 2142. An onscreen button, 2140, or other hardware input means, such as a keyboard, provides a means for the user to designate that the data has been entered.

FIG. 21B shows a second embodiment, 2150, of the viewpoint parameter assignment user interface, which provides a graphical user interface for assigning the viewpoint parameters of an object image to a locale image. An array of object images, 2152, which were previously stored by the user in the program's data base, is displayed on the screen in conjunction with an image of the locale image, 2156, to which viewpoint parameters are being assigned. When the user designates a particular object image in the array, the image is displayed in an enlarged window, 2154. A switch 2158 enables a user to set a software flag that changes the sign of the otherwise assigned viewpoint angle. This is a convenience feature for facilitating the use of a single object image for horizontally flipped object images. When all selections have been made by the user, a button, 2160, or alternative hardware input means is used to transfer the user selections to a software algorithm that enters the assigned viewpoint parameters in a data base in such a manner as to link them to the locale image.

A.5 Example Method for Augmenting a Locale Image with an Object Image

An example embodiment of a method for augmenting a locale image with an object image is taught here. A first component of the example method for augmenting a locale image with an object image includes an object image and locale image paring means. A second component of the example method for augmenting a locale image with an object image includes an image augmentation software algorithm.

A.5.1 Example Means for Paring Images

An example embodiment of the object image and locale image paring means provides a graphical user interface that enables the user to view a selection of object images and a selection of locale images and conveniently enables the user to pair object images having a first object centric viewpoint with locale images having a matching first object centric viewpoint at a known reference point in the image, where said known reference point in the locale image corresponds to the origin of the first object centric viewpoint. A locale image may have one or more paired object images and an object image may have one or more paired locale images.

FIG. 22 shows a screen shot of an embodiment of the object image and locale image paring means, 2110. An array of object images, 2114, and an array of locale images, 2116, display images with known object centric viewpoints. When the focus of the computer user interface is placed on an image of a specific object image within the array of object images, the image of the object is displayed in a viewing window, 2112. When the focus of the computer user interface is placed on an image of a specific locale within the array of locale images, the image of the locale is displayed in a viewing window, 2118. In this embodiment, filters, 2111 and 2117, are provided such that the content of the object image array can be restricted or not to images matching the viewpoint parameters associated with the selected locale image. In this embodiment, filters, 2113 and 2115, are provided such that the content of the locale image array can be restricted or not to images matching the viewpoint parameters associated with the selected object image. In other embodiments, additional filters including, date, image size, color, location, etc. are optionally provided to enhance the usability of the object image and locale image paring means.

Data identifying images that are paired is saved, e.g. by clicking button 2119, to a data base that supports subsequent data base access to the images, derivative images, and parameters associated with the images including the object centric viewpoint origin coordinates, origin resolution, vanishing point coordinates, and colorimetric reference. Another button, 2120, signals the software algorithm running on the computer to both save the pairing data and execute an image augmentation process.

An example of a second embodiment of the object image and locale image paring means is optionally provided through a computer matching algorithm running on a computer that searches a data base for object images with specified object centric viewpoints and searches a data base for locale images with matching object centric viewpoints, based on a user controlled filtering threshold for criteria matching between object centric viewpoints of object images and locale images. The computer matching algorithm presents, via the computer display, one or more sets of matching images to the user according to image selection filters that are specified by the user.

A.5.2 Example Software Methods for Merging Images

An example embodiment of a software method running on a computer for merging a locale image with an object image is taught here. An embodiment of an image augmentation software algorithm running on a computer merges an object image with a locale image. A flow diagram, 2205, for an example embodiment of the image augmentation software algorithm is shown in FIG. 23. A variety of embodiments of the image augmentation software algorithm could be utilized to produce the same augmented image or a comparable augmented image.

In the example embodiment depicted by flow diagram 2205, input, 2210, includes: an object image that is associated with data about the image, as for example derived from the object's enclosing rectangular cuboid, including: the image coordinates corresponding to the object centric viewpoint origin, the resolution of the image at the image point corresponding to the object centric viewpoint origin, and the image space coordinates of the vanishing point of the side of the enclosing rectangular cuboid containing the coordinates corresponding to the object centric viewpoint origin.

Input further includes a locale image that is associated with data derived from the locale image's fiducial mark, including: the image coordinates corresponding to the object centric viewpoint origin, the resolution of the image at the image point corresponding to the object centric viewpoint origin, the image space coordinates of the vanishing point of the fiducial mark, and white balance colorimetric data.

In regard to the object image: The pixels corresponding to the object and the pixels corresponding to the shadow of the object are on a predictable background, such as a contrasting uniformly colored field, which can be distinguished from the object and shadow pixels.

In step 2218, a shadow extraction software algorithm, using image processing techniques known to those skilled in the art, extracts any shadow that is present from the object image to create a bit map of the object's shadow.

In step 2222, an object isolation software algorithm, using image processing techniques known to those skilled in the art, converts the object image's background to transparent pixels by adjusting the background's alpha pixel variable.

In step 2226, the resolution of the object image at the image point corresponding to the object centric viewpoint origin is compared to the resolution of the locale image at the locale image point corresponding to the object centric viewpoint origin. If said object image resolution is greater than said locale image resolution, step 2232 reduces the object image size so that the resolution of the object image at the image point corresponding to the object centric viewpoint origin equals the resolution of the locale image at the locale image point corresponding to the object centric viewpoint origin. If said object image resolution is less than said locale image resolution, step 2230 reduces the locale image size so that the resolution of the locale image at the image point corresponding to the object centric viewpoint origin equals the resolution of the object image at the object image point corresponding to the object centric viewpoint origin.

Step 2234 is optionally requested by the user by setting a software switch with values: "no shadow", "original shadow (if available)", or "synthesized shadow". When "no shadow" is requested, no image processing occurs in step 2234. When "original shadow (if available)" is requested, the shadow image, if any, extracted in step 2218 is processed in the same manner as the object image was processed in steps 2222 and 2232, and then merged with the object image as a variably transparent darkened area. When "synthesized shadow" is requested, the object image is analyzed in conjunction with the processed positions of the vertices of the enclosing rectangular cuboid, and a variably transparent darkened area is applied to the region juxtaposed to the bottom of the object as so defined.

In step 2238, the effect of differential camera tilt between the object image and locale image is mitigated. A first reference vector, e.g. construction 2070 (FIG. 20B), connecting an image point corresponding to the center of the fiducial mark and the vanishing point is derived for the locale image. A second reference vector connecting a deduced image point corresponding to the center of the fiducial mark and the vanishing point is derived for the object image. The slopes of the two vectors are compared. Any difference between the slope of the first reference vector and the slope of the second reference vector is optionally corrected by rotating the object image around the point corresponding to the origin of the object centric viewpoint, or optionally rotating the locale image around the corresponding point.

Step 2242 is optionally requested by the user by setting a software switch with values: "No color correction", "White Balance Correction", and "Grayscale". When "No color correction" is requested, no image processing occurs in step 2242. When "White Balance Correction" is requested, a colorimetric analysis compares white areas of the fiducial mark to either specified white areas in the object, or a default white reference value. Differences between the object image white reference and the fiducial mark white reference are filtered and then applied as a correction factor to the locale image. When "Grayscale" is requested, a color object image is converted to a grayscale image and a color locale image is converted to a grayscale image.

In step 2246, the processed image of the object is merged with the processed image of the locale using software methods known to those skilled in the art.

In step 2248, the augmented image is saved to a data base or other storage area on a computer and then displayed for the user to evaluate, share, or otherwise utilize.

Means is provided for viewing and comparing augmented images. FIG. 24 shows an embodiment of said means for viewing and comparing augmented images in the form of a graphical user interface, 2170, for viewing and comparing augmented images. Augmented images previously saved by a user are displayed in a left array 2176 and in a right array 2178. The left array 2176 is associated with a left display panel, 2172 and the right array 2178 is associated with a right display panel, 2174. The user selects which picture to display in the right display panel and which picture to display in the left display panel by using a computer interface pointing means or touch screen means to select an image in the associated array. An alternative embodiment would have only a single array of augmented images, e.g. the left array 2176 in conjunction with a means for dragging an image from the array to one or the other of the display panels or otherwise indicating, such as by a software or hardware switch that the selected image is to be displayed in the so chosen display panel.

A.6 Example Process for Augmenting a Locale Image with a Predetermined Object Image An example embodiment of a process for augmenting a locale image with a predetermined object image is taught here. The example process for augmenting a locale image with a predetermined object image uses the methods and means described above. The software algorithms supporting the process for augmenting a locale image with a predetermined object image run on a standalone computer or via a client-server relationship via the internet or local area network. When accessed via the internet, the software algorithms display the associated user interfaces in a general purpose internet browser program or in a special purpose browser program with the supporting software algorithms running on an internet server. The type of computer utilized by the user is unrestricted, including: desktop, laptop, notebook, mobile, tablet, and smartphone devices.

FIG. 25, which delineates an embodiment of the process for augmenting a locale image with a predetermined object image, lists the work flow in the steps and step components performed by a user to create an augmented image from a predetermined object image and a locale image acquired by the user. The user steps are:

Step 1, 2310, Obtain Predetermined Object Image and Properties, is comprised of path 2312 or path 2327. Path 2312 is comprised of: step component 2314, selecting and uploading an image of an object, step component 2316, using the computer user interface for selecting a computer user interface for defining vertices of the enclosing rectangular cuboid of the object, e.g. graphical user interface embodiment shown in screen shot 3600 (FIG. 36), step component 2318, using the computer user interface for defining the vertices of the enclosing rectangular cuboid of the object, step component 2322, using the dimensioning computer user interface means to specify the dimensions of the object, and step component 2326, printing the resulting positioning guide and fiducial mark. Path 2327 is comprised of: step component 2328, selecting and uploading an image of an object that has attached object centric viewpoint parameters, object centric viewpoint origin coordinates, resolution at the object centric viewpoint origin, the related vanishing point coordinates or, alternatively, the dimensions and vertex coordinates of the enclosing rectangular cuboid, and step component 2326.

Step 2, 2330, Acquiring a Locale Picture, is comprised of: step component 2334, placing the computer viewpoint parameter output means and locale image calibration means within the locale, step component 2338, positioning the camera according to the computer viewpoint parameter output means, step component 2342, optionally removing the computer viewpoint parameter output means, step component 2346, acquiring a first locale picture, step component 2350, optionally removing the locale image calibration means, and step component 2354, optionally acquiring a second locale picture.

Step 3, 2360, Creating an Augmented Image, is comprised of: step component 2364, inputting the first locale picture, step component 2368, optionally inputting the second locale picture, step component 2372, using the fiducial mark locating means, step component 2376, using the object image and locale image paring means, and step component 2380, viewing, evaluating, sharing, or otherwise utilizing the augmented image.

FIG. 26 shows a pictorial summary for the user steps 2310, 2330, and 2360, performed using specific example embodiments of the methods and means delineated in FIG.

25. Step 1, 2310, is performed by the embodiment depicted in screen shot 1312 of the computer user interface for defining the enclosing rectangular cuboid of an object. Step 2, 2330, is performed using the first embodiment of the computer viewpoint parameter output means 1410 to position the camera at the object centric viewpoint within the locale, and the first fiducial mark embodiment 1510 is used to calibrate the locale image in the plane of the fiducial mark. Step 3, 2360, is performed with the second embodiment of the fiducial mark locating means as depicted in screen shot 1870 followed by use of the embodiment of the object image and locale image paring means, depicted in screen shot 2110. The paired object image and locale image are then processed by an embodiment of the image augmentation software algorithm 2205, which is not visible to the user and is not shown in FIG. 26.

After the augmented image is displayed, or otherwise output, the user utilizes it (2370) for whatever purpose the user has, e.g. comparing alternative arrangements of the locale furnishings around the object, comparing alternative objects within the locale, social media sharing, etc. In FIG. 26, the user is using an embodiment of the means for viewing and comparing augmented images in the form of a graphical user interface as depicted in screen shot 2170.

A.7 Example Process for Defining and Calibrating a Locale Image and Matching an Object Image An example embodiment of a process for defining and calibrating a locale image and matching an object image is taught here. The process for defining and calibrating a locale image and matching an object image utilizes a three dimensional image calibration means at one or more specified locations within the scene. An example embodiment of the three dimensional image calibration means utilizes a three dimensional phantom.

A.7.1 Example Means for Defining and Calibrating a Locale Image

An example embodiment of a means for defining and calibrating a locale image is taught here.

An example embodiment of a means for defining and calibrating a locale image is a rectangular cuboid phantom. The rectangular cuboid phantom is an object in the form of a rectangular cuboid with known dimensions. The rectangular cuboid phantom provides a means for determining the object centric viewpoint for a location within a locale. The rectangular cuboid phantom contains identifiable points that are arranged according to a rectangular cuboid with known dimensions.

FIG. 27A shows an example first embodiment of the rectangular cuboid phantom, 2708, which can be fabricated from any appropriately sized rectangular cuboid object, e.g. a box such as commonly found in office supply stores, retail stores, and as used for packaging. This first embodiment of the rectangular cuboid phantom is readily available to consumers, and dimensions for the box are readily obtained using a conventional ruler. Visible reference vertices, 2710, 2712, 2714, 2716, 2718, 2720, and 2722, are formed by the corners of the box.

A computer vision readable rectangular cuboid phantom with computer vision identifiable vertices would expedite the extraction of the rectangular cuboid phantom data, reduce labor, and reduce the chance of human error when carrying out the analysis. Software algorithms capable of extracting the image coordinates of appropriately designed rectangular cuboid phantoms are readily developed by those skilled in the art of image analysis and processing. FIG. 27B shows an embodiment, 2730, of a computer vision readable rectangular cuboid phantom. This rectangular cuboid phantom embodiment has distinctive markings, e.g. luminescent points or lights at each of the vertices, 2732, 2734, 2736, 2738, 2740, 2742, and 2744. The distinctive markings can emit light of the same spectral wavelength or of distinctive distinguishing spectral wavelengths.

A.7.2 Example Method for Using a Physical Rectangular Cuboid Phantom

An example embodiment of a method for using a physical rectangular cuboid phantom is taught here.

FIG. 28 shows a locale picture 2810 with a version of the first embodiment of the rectangular cuboid phantom, 2812, within the locale. One of the sides of the rectangular cuboid phantom is concomitant with a side of the enclosing rectangular cuboid of an object; an image of the object will be placed within the locale image such that the origin of the object centric viewpoint for the object image and the origin of the object centric viewpoint of the rectangular cuboid phantom 2812 are concomitant.

FIG. 29 shows an enlargement, 2910, of that section of the picture 2810 containing the image of the rectangular cuboid phantom 2812 within the computer user interface for defining the enclosing rectangular cuboid of an object and its dimensions. Six vertices 2814, 2816, 2818, 2820, 2822, and 2824, of the phantom are marked and the width, 2830, depth, 2832, and height, 2834, dimensions specified along with their units, 2836. These data are input into the first software algorithm, e.g. 705, to calculate the object centric viewpoint parameters of the rectangular cuboid phantom.

A computer vision readable phantom would lessen or eliminate the need for the computer user interface for defining the enclosing rectangular cuboid and its dimensioning—when there is data base storage of the phantom's dimensions. A cube is a preferred shape as its symmetrical sides reduce data entry and positioning use errors.

FIG. 30 shows output of the first software algorithm 705 embodied as a positioning guide, 3012, that is positioned in juxtaposition to a fiducial mark, 3014, both of which are positioned in association with an object, 3016, an image of which will be used to augment either the first locale image containing the phantom 2812, or a second locale image identical to the first locale image, except for the absence of the phantom. The positioning guide is used to position the camera. The fiducial mark image parameters, as discussed above, are used as input to the fiducial mark analysis program to position, size, and orient the object image to the locale image or vice versa.

The object image 3016 is paired with the locale image 2810 and the associated data are input into the image augmentation software algorithm to produce the augmented image 3110, shown in FIG. 31. In augmented image 3110, the phantom is removed by utilizing a second locale image that is identical to the first locale image, except that the rectangular cuboid phantom is removed. The data derived from the first locale image is then applied to the second locale image when augmenting the second locale image with the object image, 3016.

A.7.3 Method for Obtaining a Matching Object Image with a Physical Object

An example of an embodiment of a method for obtaining a matching object image with a physical object is taught here. FIG. 32A, which delineates an example first embodiment of the process for using a rectangular cuboid phantom to augment a locale image with an object image lists the work flow in the steps and step components performed by one or more users to create an augmented image from a locale image with a rectangular cuboid phantom and an object image. The user steps are:

Step 1, 3210, Acquire Image of Locale with Phantom, is comprised of: step component 3212, placing one or more rectangular cuboid phantoms within a locale, step component 3214, snapping a first locale picture, step component 3216, optionally snapping a second locale picture that is identical to the first locale picture except that the rectangular cuboid(s) is/are removed from the scene of the locale, step component 3218, input the first locale picture, step component 3220, optionally input the second locale picture, step component 3222, use the computer user interface for defining the enclosing rectangular cuboid of an object to extract data from the image of each of the rectangular cuboid phantoms, and step component 3224, for each image of each rectangular cuboid, printing the resulting positioning guide.

Step 2, 3230, Acquire an Object Picture, is comprised of: step component 3232, aligning the computer viewpoint parameter output means, fiducial mark, and object and positioning the camera accordingly for each image of a rectangular cuboid phantom, step component 3234, snapping a first picture of the object, step component 3236, optionally snapping a second picture of the object identical to the first picture of the object, except that the computer viewpoint parameter output means and fiducial mark are removed from the scene, step component 3238, adjust the fiducial mark locating computer user interface, step component 3240, process the object image so that the object is isolated and displayed on a uniform contrasting background, and step component 3242, uploading the processed object image.

Step 3, 3260, Create the Augmented Picture, is comprised of: step component 3262, pairing an object image with a locale picture for processing with the image augmentation software algorithm, and step component 3264, viewing, evaluating, sharing, or otherwise utilizing the augmented image.

A.7.4 Example Method for Obtaining a Matching Object Image with an Avatar Object An example of an embodiment of a method for obtaining a matching object image with an avatar object is taught here. FIG. 32B, which delineates a second embodiment of the process for using a rectangular cuboid phantom to augment a locale image with an object image lists the work flow in the steps and step components performed by one or more users to create an augmented image from a locale image with a rectangular cuboid phantom and an avatar object image. The user steps are:

Step 1, 3210, Acquire Image of Locale with Phantom, is discussed above.

Step 2, 3270, Acquire an Object Picture, is comprised of: step component 3272, orienting an avatar object in a three dimensional computer aided design (3DCAD) program so that it is being viewed from the object centric viewpoint and aligning an avatar fiducial mark for each image of a rectangular cuboid phantom, step component 3274, outputting a first picture of the object and avatar fiducial mark, step component 3276, optionally outputting a second picture of the avatar object that is identical to the first picture of the avatar object, except that the avatar fiducial mark is removed from the scene, step component 3278, as needed, process the avatar object image so that the avatar object is isolated and displayed on a uniform contrasting background, and step component 3280, upload the processed avatar object image.

Step 3, 3260, Create the Augmented Picture, is discussed above.

A.8 Dynamic Use of the Processes, Methods, and Means Taught for Creating an Augmenting Image Reference to "camera" in this specification is to any digital image capturing device, or a device who's output can be digitized, such as digital cameras, video cameras, stereo cameras, smartphone cameras, tablet cameras, computer cameras, etc.

The cumulative data base of object images, enclosing rectangular cuboid parameters, object image photographic parameters, locale images, and locale image calibration means provides a base upon which automated image analysis means can be performed. For example one embodiment would be in the application of artificial intelligence, which would use statistical models to derive photographic parameters from images to improve image analysis accuracy and reduce the need for user input.

The augmentation processes presented in the above examples explain the augmentation processes for one image or video frame at a time. This is not a limitation, as the same techniques can be applied to multiple images; hence, augmented video is supported.

Heads up displays provide a means for applying the image augmentation techniques taught here to real time augmented reality viewer experiences.

A.9 Internet Means for Remote Product Visualization

A commercially effective internet means is hereby provided for a first user, e.g. a consumer, to make a request to a second user, e.g. a retailor, for product visualization within a locale of importance to the first user. FIG. 33A shows the data flow for a first embodiment, 3310, of the telecommunication exchange between the first user, 3312, and the second user, 3316. The first user initiates an electronic transmission, 3314, that includes a first locale picture with a rectangular cuboid phantom embodiment or the object centric viewpoint parameters, corresponding image object centric viewpoint origin coordinates, resolution, and vanishing point data, and optionally a second locale picture without the phantom embodiment, to the second user. The second user utilizes information contained in transmission 3314 to obtain a first object image with a fiducial mark, and optionally a second object image without a fiducial mark, and processes the selected locale image and selected object image into an augmented image, which shows the object within the first user's locale image. The second user then transmits the augmented image to the second user for utilization by the second user.

FIG. 33B shows the data flow for a second embodiment, 3340, of the telecommunication exchange between the first user, 3342, and the second user, 3346. The first user initiates an electronic transmission, 3344, that includes the object centric viewpoint parameters, corresponding image object centric viewpoint origin coordinates, resolution, and vanishing point data. The second user utilizes information contained in transmission 3344 to obtain a first object image with a fiducial mark, and optionally a second object image without a fiducial mark. The second user then transmits, 3348, the object image and fiducial mark image data including the image coordinates corresponding to the origin of the object centric viewpoint, the resolution, the vanishing point coordinates, and the colorimetric data. The first user then uses the data transmitted to create an augmented image, which shows the object within the first user's locale image.

Embodiment 3310, places more responsibility on the second user, while embodiment 3340, allows the first user to maintain control of the image of their locale.

The image analysis process can be automated by using computer vision readable embodiments of the rectangular cuboid phantoms and fiducial marks. The object image acquisition process can be automated by controlling the positioning of the camera via robotic means. Now therefore it is evident that the above methods and means for augmenting an image can support a remote customized show room capability. Moreover the same methods and means can be used to create a web site where consumers can post locale images and have vendors offer product solutions that can be visualized within the consumer's environment as captured by the locale pictures.

A.10 Example Process for Using a Rectangular Cuboid Phantom Avatar to Augment an Image of a Virtual Locale with an Object Image An example of an embodiment of a process for using a rectangular cuboid phantom avatar to augment an image of a virtual locale with an object image is taught here.

A.10.1 Method for Using a Virtual Rectangular Cuboid Phantom

An example of an embodiment of a method for using a virtual rectangular cuboid phantom is taught here.

Three dimensional computer aided design (3DCAD) programs create virtual three dimensional models of environments wherein each virtual item (avatar), in the virtual space is modeled in three dimensions. 3DCAD programs offer the benefit of plasticity during the design process, but currently there is a labor and accuracy barrier to the representation of preexisting physical items as avatars. Many 3DCAD programs provide for the insertion of a two dimensional image into the virtual space.

FIG. 34, provides a work flow example of an embodiment of the process for using a rectangular cuboid phantom avatar to augment an image of a virtual locale with an object image. The steps and step components are performed by one or more users to create an augmented image from a virtual space locale image with a rectangular cuboid phantom avatar and a matched object image. The user steps are:

Step 1, 3410, Acquire Image of Virtual Space with Phantom, is comprised of: step component 3412, placing one or more rectangular cuboid phantom avatars within a virtual locale, step component 3414, acquire a first virtual locale picture, step component 3416, optionally acquire a second virtual locale picture that is identical to the first virtual locale picture except that the rectangular cuboid phantom avatar is removed from the scene of the virtual locale, step component 3418, input the first virtual space picture, step component 3420, optionally input the second virtual space picture, step component 3422, use the computer user interface for defining the enclosing rectangular cuboid of an object to extract data from the image of the rectangular cuboid phantom avatar, and step component 3424, for each image of each rectangular cuboid phantom avatar, printing the resulting positioning guide.

Step 2, 3430, Acquire Object Picture, is comprised of: step components 3232, 3234, 3236, 3240, and 3242, which are discussed above.

Step 3A, 3460, Create Augmented Picture, is comprised of: step component 3462, pairing an object image with a virtual locale picture for processing with the image augmentation software algorithm, and step component 3264, viewing, evaluating, sharing, or otherwise utilizing the augmented image.

Step 3B, 3470, Insert Object Image Into Virtual Space, supports an alternative use of the object image, and provides for a process for using a rectangular cuboid phantom avatar to augment a virtual space with an object image. Step 3B is comprised of: step component 3474, uploading the object image into the 3DCAD model. For photorealistic viewing the 3DCAD model is set to the view used when acquiring the first picture of the virtual space. The object image is scaled using the known resolution of the image at the origin of the object centric viewpoint and the scaling tools provided by the 3DCAD program. In step component 3478, the augmented 3DCAD model is utilized by the user for viewing, evaluating, or sharing, etc.

A.11 Example Alternative Embodiments of the Computer User Interface for Defining Vertices of the Enclosing Rectangular Cuboid of an Object FIG. 35A shows screen shot, 3500, of an example second embodiment of the computer user interface for defining vertices of the enclosing rectangular cuboid of an object using a predetermined two dimensional image. In said second embodiment, seven vertices 1215, 1225, 1235, 1245, 1255, 1265, and 3510, are defined in conjunction with the nine connecting optional lines, 1210, 1220, 1230, 1240, 1250, 1260, 1270, 3511, and 3513. Relative to the first embodiment of the computer user interface for defining vertices of the enclosing rectangular cuboid of an object using a predetermined two dimensional image, an advantage of the second embodiment, which defines the seventh vertex, 3510, is that this information can be used to perform redundant calculations regarding the object centric viewpoint parameters, and therefor provides a means for performing error checking and increasing accuracy. Another advantage is that the perceptual completeness of the enclosing rectangular cuboid can provide additional spatial cues to the user and therefor can increase the accuracy with which all the vertices of the enclosing rectangular cuboid are delineated. A disadvantage of the second embodiment is that the user must position an additional point on the computer display.

FIG. 35B shows screen shot, 3520, of an example third embodiment of the computer user interface for defining vertices of the enclosing rectangular cuboid of an object using a predetermined two dimensional image. In said third embodiment, eight vertices, 1215, 1225, 1235, 1245, 1255, 1265, 3510, and 3525 are defined in conjunction with the twelve connecting optional lines, 1210, 1220, 1230, 1240, 1250, 1260, 1270, 3511, 3513, 3527, 3529, and 3531. Relative to the second embodiment of the computer user interface for defining vertices of the enclosing rectangular cuboid of an object using a predetermined two dimensional image, an advantage of the third embodiment, which defines the eighth vertex, 3525, is that this information can be used to perform redundant calculations regarding the object centric viewpoint parameters, and therefor provides a means for performing error checking and increasing accuracy. Another advantage is that the perceptual completeness of the enclosing rectangular cuboid can provide additional spatial cues to the user and therefor can increase the accuracy with which all the vertices of the enclosing rectangular cuboid are delineated. A disadvantage of the third embodiment is that the user must position additional points on the computer display. When a region of the enclosing rectangular cuboid is not visible, means are provided in the interface, such as software switches, that enable the user to elect to not adjust the markers corresponding to those vertices. The third embodiment is helpful for defining the enclosing rectangular cuboid of objects when the images are image class 1S0S and image class 1S1T images.

FIG. 35C shows a screen shot, 3540, of an example fourth embodiment of the computer user interface for defining vertices of the enclosing rectangular cuboid of an object using a predetermined two dimensional image. In said fourth embodiment, four vertices, 1215, 1225, 1235, and 1265, are defined in conjunction with the four connecting optional lines, 1210, 1220, 1230, and 1270. The vertices identified with the fourth embodiment delineate a quadrilateral, i.e. a single side of the enclosing rectangular cuboid. This simplified embodiment is appropriate for use when, for computational purposes, the object can be considered flat or when the object centric viewpoint is such that only a single face of the enclosing rectangular cuboid can be delineated in the image of the object.

FIG. 35D shows a screen shot, 3560, of an example fifth embodiment of the computer user interface for defining vertices of the enclosing rectangular cuboid of an object using a predetermined two dimensional image. In said fifth embodiment, four vertices, 1215, 1225, 1235, and 1265, are defined in conjunction with the four connecting optional lines, 1210, 1220, 1230, and 1270. In addition, a slider, 3562, and pointer, 3564, are provided in the interface. The position of the pointer 3564, is set by the user to correspond to the user's perception of the camera height as judged from the appearance of the object in the image. The position of the pointer on the slider thereby provides information about the height of the camera that can be used for error checking and to improve the accuracy of the object centric viewpoint calculation. This user interface is well suited to images of objects that have depth, but in which only four visible vertices of the enclosing rectangular cuboid are visible.

A.12 Example Means for Selecting Computer User Interface for Defining Vertices of the Enclosing Rectangular Cuboid of an Object An example of an embodiment of a means for selecting a computer user interface for defining vertices of the enclosing rectangular cuboid of an object is taught here.

FIG. 36 shows a screen shot, 3600, of an embodiment of a means for selecting a computer user interface for defining vertices of the enclosing rectangular cuboid of an object. The image of the object is displayed in a region 3620 of the display. Selection switches in the form of computer user interface buttons, 3610, 3612, 3614, 3616, and 3618, are displayed. When the user hovers the focus of a pointing device over a button, sample images corresponding to that button's computer user interface for defining vertices of the enclosing rectangular cuboid are displayed to assist the user in making the appropriate selection. Computer user interface button 3610 corresponds to the second embodiment of the computer user interface for defining vertices of the enclosing rectangular cuboid of an object using a predetermined two dimensional image. Computer user interface button 3612 corresponds to the third embodiment of the computer user interface for defining vertices of the enclosing rectangular cuboid of an object using a predetermined two dimensional image. Computer user interface button 3614 corresponds to a subset of the third embodiment of the computer user interface for defining vertices of the enclosing rectangular cuboid of an object using a predetermined two dimensional image in which only visible vertices are presented to the user. Computer user interface button 3616 corresponds to the first embodiment of the computer user interface for defining vertices of the enclosing rectangular cuboid of an object using a predetermined two dimensional image. Computer user interface button 3618 corresponds to the fourth embodiment of the computer user interface for defining vertices of the enclosing rectangular cuboid of an object using a predetermined two dimensional image, which is the special case for when the object is computationally flat or when only a single face of the object is visible in the image.

When the user activates one of the user interface buttons, the program opens the corresponding embodiment of the computer user interface for defining vertices of the enclosing rectangular cuboid of an object.

A.13 Example Software Algorithm for Selecting a Software Algorithm for Finding the Object Centric Viewpoint of an Enclosing Rectangular Cuboid An example of an embodiment of a software algorithm for selecting a software algorithm for finding the object centric viewpoint of an enclosing rectangular cuboid is taught here.

FIG. 37 shows a flow diagram, 3700, describing an embodiment of a switching software algorithm running on a computer that selects an algorithm for finding the object centric viewpoint of an enclosing rectangular cuboid that is consistent with the computer user interface used to delineate the vertices of the enclosing rectangular cuboid of the object.

In step 3710, program flow is distributed according to the button identifier input with the data.

Button identifiers associated with buttons 3610 and 3616 cause the program to proceed to step 3712, which is a direct link to step 710 (FIG. 7B) of the first software algorithm for finding the object centric viewpoint of an enclosing rectangular cuboid.

Button identifiers associated with buttons 3612 and 3614 cause the program to proceed to step 3714, which transforms the data by 90 degrees. Step 3716 inputs the transformed data into step 710 (FIG. 7B) of the first software algorithm for finding the object centric viewpoint of an enclosing rectangular cuboid, which runs through step 746. If the redundancy test is passed, then step 3718 transposes the three dimensional object centric viewpoint solution by −90 degrees and performs a reverse transform of the image data so that the origin of the object centric viewpoint origin is located at the middle of the reference edge of the enclosing rectangular cuboid. Steps 750 and 758 run as described above. If the redundancy test in step 746 is not passed, program flow proceeds to step 754.

The button identifier associated with button 3618 causes the program to proceed to step 3730, which inputs the image coordinates of the four vertices and the physical height and width dimensions. In step 3732, the input data are used in conjunction with the viewpoint distance geometric relationship and the angle of view geometric relationship to find the object centric viewpoint vector. Since the object is computationally being treated as a plane, the viewpoint distance is not unique and the viewpoint coordinate data reported in step 3734 can include a plurality of sets of heights, and distances, all of which lie on the viewpoint vector.

A.14 Example Methods for Internet Operation

Examples of embodiments of methods for internet operation are taught here.

Advantages of having an internet based process for augmenting an image of a locale are that the user has expedient access to a wide range of objects and object images, and that the process for creating an augmented image can be executed on a low powered computer such as a mobile computing device, e.g. smartphone, tablet, notebooks, etc. Object, locale, and augmented images can be shared over the internet among a full range of shareholders, e.g. customers, salespersons, manufacturers, service providers, e.g. interior decorators, designers, and architects. Sources of images can be linked to internet cloud based data bases containing retailer and manufacturer catalogues and consumer and business generated images of homes, offices, and businesses. The expedient availability of resource images and augmented images provides for enhanced virtual space decision making in support of purchasing and planning decisions. The internet also supports image sharing through social medial sharing via large user networks, e.g. Facebook, Google+, Yahoo Groups, Twitter, and other social and photo sharing sites.

Increasingly, retailers are adopting tablet computers for sales personnel, and store representatives. Given the existence of mobile computing, the processes taught here provide the ability to create augmented images from business and consumer images of their locations, with in-store or catalogue based pictures, providing an enhanced shopping experience. The processes taught here, can support a consumer taking a picture of a location on a smartphone. Transferring the digital image of the location from a user device, e.g. a smartphone or tablet, to a business device, e.g., an in-store device, e.g. a smartphone, tablet, or desk top computer, and having a sales person, store representative, manufacturing representative, distributor representative, or service provider augment the consumer's location picture with photorealistic product images. Accordingly, it can be seen that the processes taught here could serve to create a custom virtual showroom experience for the customer.

Additionally the processes taught here could serve to enhance the mobile and desktop computing experience on smartphones, tablets and desktop computers by providing a bridge between the physical world and the virtual environment in areas including, gaming, travel, urban navigation, and other circumstances wherein the user is relating a physical environment to virtual objects, such as avatars.

Additionally the processes taught here could serve to augment the appearance of the human body, considered a scene, with virtual objects placed within it or upon it, e.g. clothing, tattoos, hairstyles, glasses, or jewelry.

A.14.1 Internet Methods for Using a Predetermined Object Image to Create an Augmented Image An example of an embodiment of internet methods for using a predetermined object image to create an augmented image is taught here.

FIG. 38 shows an overview of the client side and server side components for an internet embodiment of the process for augmenting a locale image with a predetermined object image. Dashed arrows indicate client initiated requests and solid arrows indicate server replies. Client side components 2314, 2316, 2318, 2322, 2326, 2346, 2364, 2372, 2376, and 2380, have been described above. Each of the client side components produces a request to the server. The server acts on each request and provides a reply to the client in the form of a web page, which can include a graphical user interface.

The server side components are as follows:

Component 3840 stores the object image and identifying information in a data base.

Component 3842 sends a reply to the client with a web page that contains a graphical user interface for selecting a computer user interface for defining vertices of the enclosing rectangular cuboid of the object.

Component 3844 matches the user request to a web page containing the specified computer user interface for defining the vertices of the enclosing rectangular cuboid of the object and sends a reply containing said graphical user interface to the client.

Component 3846 stores the data provided in the request from the client in the data base.

Component 3848 sends a reply to the client with a web page containing the dimensioning computer user interface means for specifying the dimensions of the object.

Component 3850 stores the data provided in the request from the client in the data base.

Components 750 and 758 are described above.

Component 3852 stores the locale image(s) in the data base along with identifying information.

Component 3854 sends a reply to the client in the form of a web page that contains the graphical user interface embodiment of the fiducial mark locating means.

Component 3856 stores the data provided in the request from the client in the data base.

Component 3858 sends a reply to the client in the form of a web page that contains a graphical user interface embodiment for the object image and locale image paring means.

Component 3860 stores the data provided in the request from the client in the data base.

Components 2205 and 2248 are described above.

Component 3864 is a data base that provides persistent storage.

A.14.2 Example Internet Methods for Using a Phantom to Augment a Locale Image with a Physical Object Image or an Avatar Object Image An example of an embodiment of internet methods for using a phantom to augment a locale image with a physical object image or an avatar object image is taught here.

FIG. 39 shows an overview of the client side and server side components for an internet embodiment of the process for using a phantom to augment a locale image with a physical object image or an avatar object image. In this section's discussion, unless otherwise indicated, "object image" refers to either a physical object image or an avatar object image. Dashed arrows indicate client initiated requests and solid arrows indicate server replies. Client side components 3218, 2316, 3222, 3224, 3234, 3274, 3238, 3242, 3262, and 3264, have been described above. Each of the client side components produces a request to the server. The server acts on each request and provides a reply to the client in the form of a web page, which can include a graphical user interface.

The server side components are as follows:

Component 3910 stores the locale image and identifying information in a data base.

Component 3911 searches the locale image for a computer readable phantom image. If the phantom image is not identified as a computer readable phantom, component 3912 sends a reply to the client with a web page that contains a graphical user interface for selecting a computer user interface for defining vertices of the enclosing rectangular cuboid of the object.

Component 3913 matches the user request to a web page containing the specified computer user interface for defining the vertices of the enclosing rectangular cuboid of the object and sends a reply containing said graphical user interface to the client.

Component 3914 either stores the results of the computer vision analysis of the phantom image, if the phantom image is identified as a computer readable phantom, or component 3914 stores the data provided in the request from client component 3222 in the data base.

Components 750 and 758 are described above.

Component 3916 stores the object image, identifying information, and fiducial mark location data in a data base.

Component 3918 extracts the fiducial mark image parameters.

Component 3920 sends a reply to the client in the form of a web page that contains a graphical user interface embodiment for the object image and locale image paring means.

Component 3922 stores the data provided in the request from the client in the data base.

Components 2205 and 2248 are described above.

Component 3864, data base, is described above.

Operation

A.15 First Utility Example

In early 2007, the inventors were in the process of redecorating their home, and processes taught herein were applied to assist with that task.

The inventors' goal was to redecorate a room by replacing select pieces of furniture, while retaining many surrounding furnishings. Computer aided design programs could not efficiently serve the purpose of envisioning the change in appearance of the space, since there were no preexisting avatars to use for modeling the existing furnishings. For some of the furnishings that were to be replaced, they purchased, on a trial basis, select pieces, transported them to the locale, rearranged the existing furniture accordingly, and made an accept/reject decision. When rejected, each furnishing was transported back to the respective retailer, which incurred a restocking and financial transaction cost when returning the earlier payment. This process is very time consuming, labor intensive, impractical, given transportation time and cost, and not feasible with large furnishings, e.g. sofas, or with custom made items.

Accordingly, when purchasing a sofa, the inventors undertook to approximate and emulate the first embodiment of the process for using a rectangular cuboid phantom to augment a locale image with an object image. The object centric viewpoint was approximated by body posture and positioning. The image of the preexisting sofa in situ served as a reference for scaling the locale image with the object image. They had control over camera position for both the locale image and the object images. Image manipulation was performed using commercially available software that supported layers. Object image isolation was performed manually, as was image scaling, positioning, and vanishing point alignment.

FIG. 40 shows the locale image, 3810, a first object image, 3812, and a second object image, 3814. In 2007, using professional grade image editing software capable of layering images, augmented images were produced based on the qualitative image acquisition processes described above. A first augmented image, 3816, and a second augmented image, 3818, augmented with the respective object images 3812 and 3814 are shown next to each other for comparison purposes. The augmented images were used to assist in making a decorating and purchase decision.

The technologic steps involved in moving from acquiring and processing the locale and object images to arrive at the augmented images was strenuous and time consuming; and, the result is compromised by lack of fidelity between the object centric viewpoints and lighting differences between the showroom and the locale. This experience reinforced the fact that manual image manipulation is a major barrier to lay persons being able to produce photorealistic augmented images.

Impediments to producing the augmented images 3816 and 3818 include: the cost of hardware and software capable of supporting sophisticated image manipulation, the learning time needed in order to use sophisticated image editing software, and lack of quantitative guidance during the image acquisition process. The first embodiment of the process for using a rectangular cuboid phantom to augment a locale image with an object image addresses these factors by providing a simple user interface to gather data for generating quantitative instructions for the image acquisition process and automating the image processing task. In so doing, the means and methods taught here bring the benefits of quality image augmentation and, thus, augmented reality within the reach of the lay consumer.

By accessing the first embodiment's algorithms through the internet, consumer hardware and software costs are reduced, mobile computing technology can be supported and utilized, and the consumer's images can be used to generate augmented images within the retail environment, where purchase decisions are made.

A.16 Second Utility Example

A little later in 2007, the inventors reduced to practice the analysis of viewpoint geometry for finding the object centric viewpoint of the enclosing rectangular cuboid for an object image derived from an online retail catalog. The steps that were involved are shown in FIG. 41A. In step 4110, an image of a chair is identified that may look appropriate in the inventor's office, and for which the object centric viewpoint angle can be appreciated to equal zero. In step 4114 the catalog image is downloaded along with its dimensions, which included its overall height as well as a secondary height, the height of the seat, in conjunction with its width and depth. Since the object centric viewpoint angle is known to be zero, the viewpoint geometry could be reduced to two dimensions as shown in step 4118 by drawing 4122.

The mathematical analysis described for the second embodiment of class 1S1T and 1S1B object centric viewpoint and image properties solution was performed to find the object centric viewpoint of the enclosing rectangular cuboid; an image, 4126, was obtained of the locale with a fiducial mark located at a known position relative to the origin of the object centric viewpoint, 4128. The image of the object 4114 and the image of the locale were then scaled according to the calculations and the image of the object was added to the image of the locale using professional image manipulation software.

In addition to demonstrating the concept of quantitative image augmentation, when the image of the object is predetermined, for the case where the viewpoint angle is known to be zero and the positions of eight vertices of the enclosing rectangular cuboid are known, this exercise again reinforced the need for automated image processing, as taught in this specification, to support lay use of these powerful visualization processes.

A.17 Third Utility Example

The augmented images displayed in screen shot 2170 demonstrate the advantages of the processes taught here for augmenting an image of a locale with a predetermined object image. The lawn bench image in the augmented image in display panel 2172 and the lawn bench image in the augmented image in display panel 2174 were derived from on line retail catalogs. Only minutes of effort were required to create these augmented images using the processes taught in this specification following the steps of defining the enclosing rectangular cuboid of the imaged object, securing the locale image using the computer generated positioning guide and fiducial mark, and pairing the locale image with the object image for automated processing of the images to produce the augmented images.

Accordingly, the processes taught here will serve to enable lay persons, who are not necessarily skilled in the art of image editing, to reap the benefits of photorealistic image augmentation.

A.18 Fourth Utility Example

There is significant time and skill associated with building 3DCAD environments. Attempts to blend 3DCAD models with two dimensional photographs of environments have been frustrated. Tools and technologic knowhow needed to merge 3DCAD models with two dimensional images and to envision two dimensional images, in a photorealistic fashion, within 3DCAD models, are taught here. There is also a derived need for bridging the gap between two dimensional photography and three dimensional virtual modeling so that two dimensional views of 3DCAD objects can be used to augment two dimensional images of physical space and photographs of physical objects can be merged into 3DCAD views. As taught in this specification, the methods, procedures, and means disclosed herein provide a bridge between 3DCAD virtual space, the real world, and two dimensional imaging.

The foregoing description of the embodiments of the present means and processes are presented for the purposes of illustration and description. They are not intended to be exhaustive or to limit the present means and processes to the precise form disclosed. Many modifications and variations are possible in light of the above teaching. It is intended that the scope of the present means and processes be limited not by this detailed description, but rather by the claims of this application. As will be understood by those familiar with the art, the present means and processes may be embodied in other specific forms without departing from the spirit or essential characteristics thereof. Likewise, the particular naming and division of the modules, routines, features, attributes, methodologies and other aspects are not mandatory or significant, and the mechanisms that implement the present means and processes or their features may have different names, divisions and/or formats.

We claim:

1. Method for creating an augmented image utilizing a preexisting object image of an object including:
   (a) gathering data about one or more preexisting object images and one or more of the objects pictured in each of said preexisting object images;
   (b) deducing for each of said objects as captured within each of said preexisting object images a set of object image photographic parameters which include a set of object centric viewpoint parameters;
   (c) providing to a first user, who is associated with one or more locales, a positioning guide to position a camera based on each of said set of object centric viewpoint parameters for each of said preexisting object images;
   (d) gathering at least one locale image of one or more of the locales associated with said first user, wherein at least one said locale image contains at least one fiducial mark image to calibrate the locale image at one or more locations within the locale, wherein each of the locations within the locale are photographed with a camera substantially positioned at a position specified by at least one said set of object centric viewpoint parameters provided to said first user;
   (e) deducing, at one or more of said locations within each of said locale images, a set of locale image photographic parameters, utilizing the fiducial mark image corresponding to each location;
   (f) pairing each of said preexisting object images with one or more of the locale images based on said set of object centric viewpoint parameters associated with each of said preexisting object images and one or more of said locale images to provide at least one set of object centric viewpoint paired images;
   (g) processing each object image and each locale image in said set of object centric viewpoint paired images to produce one or more matched processed object images and one or more matched processed locale images; and
   (h) merging at least one of said matched processed object images with at least one of said matched processed locale images to generate at least one augmented image;
   whereby at least one said object can be visualized within at least one locale in a photorealistic fashion.

2. The method of claim 1 further including:
   (a) providing one or more graphical user interfaces running on a computing device;
   (b) obtaining from one or more said graphical user interfaces running on a computing device data about the preexisting object image; and
   (c) gathering a set of object dimensions for each object.

3. The method of claim 2 wherein one or more of the graphical user interfaces running on a computing device aids the first user or a second user in fitting an enclosing rectangular cuboid to at least one said object as said object is pictured in at least one of said preexisting object images.

4. The method of claim 3 further including:
   (a) fitting said enclosing rectangular cuboid wherein said enclosing rectangular cuboid has a plurality of visible vertices wherein each visible vertex has a position described by a pair of vertex coordinate values;
   (b) recording said vertex coordinate values for each said vertex; and
   (c) associating a spatial distribution between the positions of at least two vertices with at least one member of said set of object dimensions.

5. The method of claim 1 further including using an object isolation software algorithm as part of the processing applied to each of said preexisting object images for merging the object image with the matched locale image.

6. The method of claim 1 wherein said processing of each of said object images and each of said locale images in the set of object centric viewpoint paired images produces one or more matched processed object images and one or more matched processed locale images further includes:

(a) processing each said preexisting object image and/or processing each said locale image to produce one or more resolution matched object images and one or more resolution matched locale images;
(b) positioning each of said resolution matched object images relative to a reference point within each of said resolution matched locale images;
(c) extracting an object image vanishing point data set from the set of object image photographic parameters;
(d) extracting a locale image vanishing point data set from the set of locale photographic parameters;
(e) calculating one or more image rotation adjustments from the object image vanishing point data and the locale image vanishing point data; and
(f) rotating the resolution matched object image and/or rotating the resolution matched locale image around the reference point;
whereby scale, camera tilt, and position are adjusted for in the resulting augmented image.

7. The method of claim 6 further including: making a colorimetric adjustment to each of said preexisting object images and/or each of said locale images based on a color reference in each of said preexisting object images and each of said locale images;
whereby the object image appears to have been photographed under substantially equivalent lighting conditions as used to obtain the locale image.

8. The method of claim 1 further including, associating a shadow effect with each of said matched processed object images.

9. The method of claim 1 further including:
(a) providing at least one positioning guide to said first user; and
(b) informing said first user in the use of said positioning guide;
whereby the positioning guide facilitates the first user substantially placing the camera at the object centric viewpoint of at least one fiducial mark located within the locale of the first user.

10. The method of claim 1 further including providing instruction to the first user for positioning at least one fiducial mark within at least one of the locales, which are associated with the first user.

11. The method of claim 1 further including providing a graphical user interface running on a computing device for pairing said preexisting object images and said locale images based on their object centric view point parameter values.

12. The method of claim 1 further including providing a graphical user interface running on a computing device to display one or more of said augmented images to aid one or more users in viewing one or more of said augmented images and/or comparing a plurality of said augmented images.

13. Apparatus for creating an augmented image utilizing a preexisting object image of an object including:
(a) a first graphical user interface running on a computing device to obtain one or more preexisting object images and a set of photographic parameters for each of said preexisting object images wherein each of the sets of photographic parameters includes a set of object centric viewpoint parameters;
(b) a positioning guide to position a camera within at least one locale based on at least one of the sets of object centric viewpoint parameters to capture at least one locale image containing a fiducial mark image to calibrate said locale image; and
(c) an image augmentation software algorithm to augment at least one of said locale images with at least one of said preexisting object images, including: a second graphical user interface running on a computing device to pair at least one of said preexisting object images with at least one of said locale images to produce a pair of images with matching sets of object centric viewpoint parameters, an image processing algorithm to process each of the images in said pair of images to obtain substantially matching photographic parameters for both a processed object image and a processed locale image, and an image merging algorithm to merge said processed object image with said processed locale image;
whereby at least one augmented image is created that shows the object of the preexisting object image displayed within at least one locale in a substantially photorealistic fashion.

14. The apparatus of claim 13 further including a third graphical user interface running on a computing device to:
(a) gather data about at least one of said preexisting object images, and
(b) gather data about the object pictured in each of said preexisting object images.

15. The apparatus of claim 14 wherein the third graphical user interface running on a computing device to gather data about at least one of said preexisting object images includes controls for fitting a rectangular cuboid to the image of the object.

16. The apparatus of claim 13 further including, an object isolation software algorithm to isolate object image pixels from surrounding pixels and converting the surrounding object image pixels into transparent pixels.

* * * * *